US008836888B2

(12) United States Patent
Minikey, Jr. et al.

(10) Patent No.: US 8,836,888 B2
(45) Date of Patent: Sep. 16, 2014

(54) MODULAR LIGHT SOURCE/ELECTRONICS AND AUTOMOTIVE REARVIEW ASSEMBLIES USING THE SAME

(75) Inventors: Danny L. Minikey, Jr., Fenwick, MI (US); Ethan J. Lee, Byron Center, MI (US); John A. VanderPloeg, Zeeland, MI (US); William L. Tonar, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 653 days.

(21) Appl. No.: 12/964,521

(22) Filed: Dec. 9, 2010

(65) Prior Publication Data

US 2011/0141381 A1 Jun. 16, 2011

Related U.S. Application Data

(60) Provisional application No. 61/286,452, filed on Dec. 15, 2009.

(51) Int. Cl.
*G02F 1/1335* (2006.01)
*B60R 1/08* (2006.01)
*B60R 1/12* (2006.01)

(52) U.S. Cl.
CPC ............... *B60R 1/12* (2013.01); *B60R 1/1207* (2013.01); *B60R 1/088* (2013.01); *B60R 2001/1215* (2013.01); *B60R 2001/1284* (2013.01); *B60R 2001/1223* (2013.01)
USPC .................. 349/61; 349/11; 349/65

(58) Field of Classification Search
None
See application file for complete search history.

(56) References Cited

U.S. PATENT DOCUMENTS

| | | | | |
|---|---|---|---|---|
| 5,568,316 A | * | 10/1996 | Schrenk et al. | 359/584 |
| 5,825,527 A | | 10/1998 | Forgette et al. | |
| 5,883,605 A | | 3/1999 | Knapp et al. | |
| 6,170,956 B1 | | 1/2001 | Rumsey et al. | |
| 6,271,901 B1 | * | 8/2001 | Ide et al. | 349/96 |
| 6,346,698 B1 | | 2/2002 | Turnbull et al. | |
| 6,407,468 B1 | | 6/2002 | LeVesque et al. | |
| 6,420,800 B1 | | 7/2002 | LeVesque et al. | |
| 6,552,326 B2 | | 4/2003 | Turnbull | |
| 6,737,630 B2 | | 5/2004 | Turnbull | |
| 6,870,655 B1 | | 3/2005 | Northman et al. | |
| 7,001,058 B2 | * | 2/2006 | Inditsky | 362/610 |
| 7,188,988 B2 | * | 3/2007 | Koganezawa | 362/616 |
| 7,193,248 B2 | * | 3/2007 | Weindorf et al. | 257/100 |
| 7,221,363 B2 | | 5/2007 | Roberts et al. | |
| 7,423,708 B2 | * | 9/2008 | Weber et al. | 349/96 |
| 7,898,614 B2 | * | 3/2011 | Mishima et al. | 349/65 |
| 7,932,969 B2 | * | 4/2011 | Hong | 349/69 |
| 8,085,359 B2 | * | 12/2011 | Olson et al. | 349/65 |
| 2004/0151007 A1 | * | 8/2004 | Chuang | 362/561 |
| 2006/0033865 A1 | * | 2/2006 | Tanaka et al. | 349/113 |
| 2007/0139584 A1 | * | 6/2007 | Jin et al. | 349/74 |
| 2008/0068520 A1 | | 3/2008 | Minikey et al. | |

(Continued)

*Primary Examiner* — Richard Kim
(74) *Attorney, Agent, or Firm* — Price Henveld LLP; Scott P. Ryan

(57) ABSTRACT

A vehicular rearview assembly comprising a light source illuminating the mirror system within the housing of the assembly. The light source is a layered structure including generally co-extensive optical elements such as a light-guiding element that accepts light from light emitters and distributes this light along an area that is not transverse with respect to a display of the assembly. Light distributed and outcoupled through the light-guiding element illuminates the whole display, while radiation from other emitters may traverse the light-guiding element in order to highlight respectively corresponding segments of the display. The display may be configured in a spatially-segmented fashion to increase brightness of displayed indicia.

24 Claims, 38 Drawing Sheets

(56) References Cited

U.S. PATENT DOCUMENTS

| | | |
|---|---|---|
| 2009/0096937 A1 | 4/2009 | Bauer et al. |
| 2009/0201137 A1* | 8/2009 | Weller et al. ............... 340/425.5 |
| 2009/0290369 A1* | 11/2009 | Schofield et al. ............. 362/494 |
| 2010/0045899 A1 | 2/2010 | Ockerse |
| 2010/0201896 A1 | 8/2010 | Ostreko et al. |

* cited by examiner

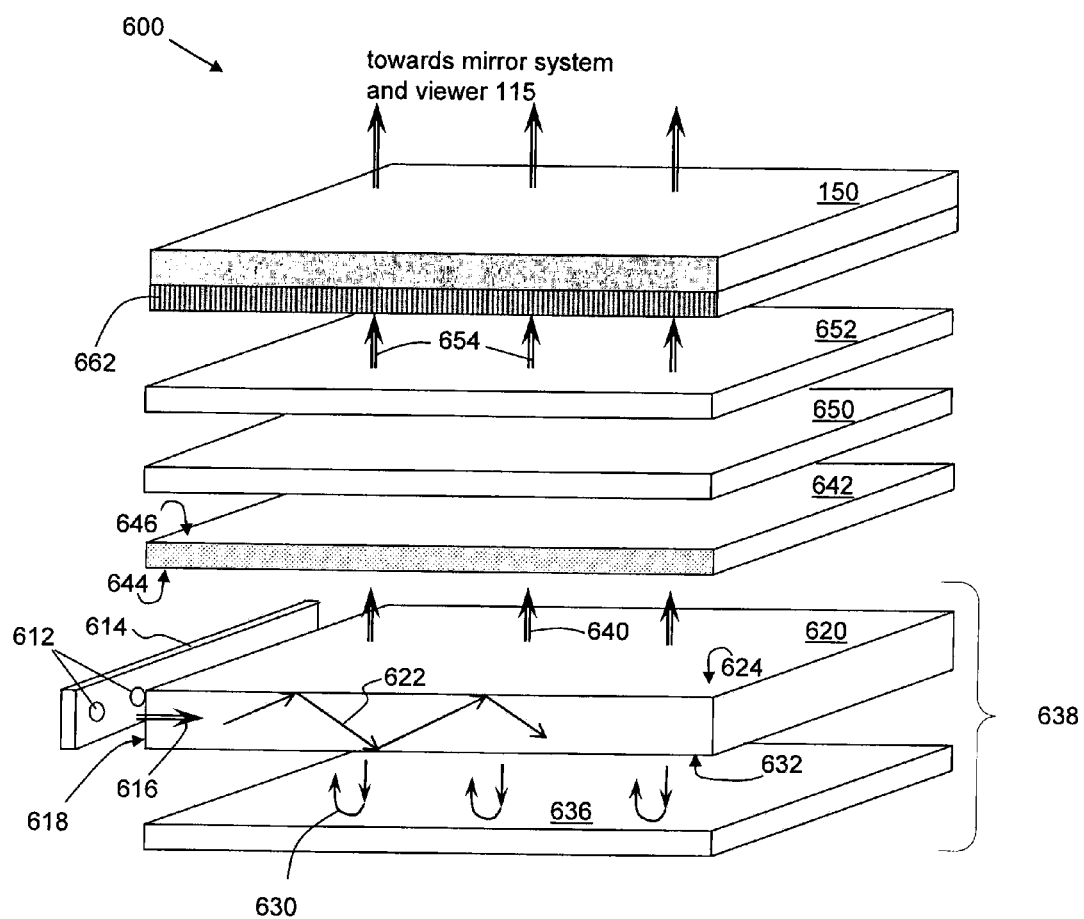
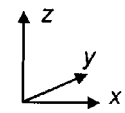
FIG. 6(A)

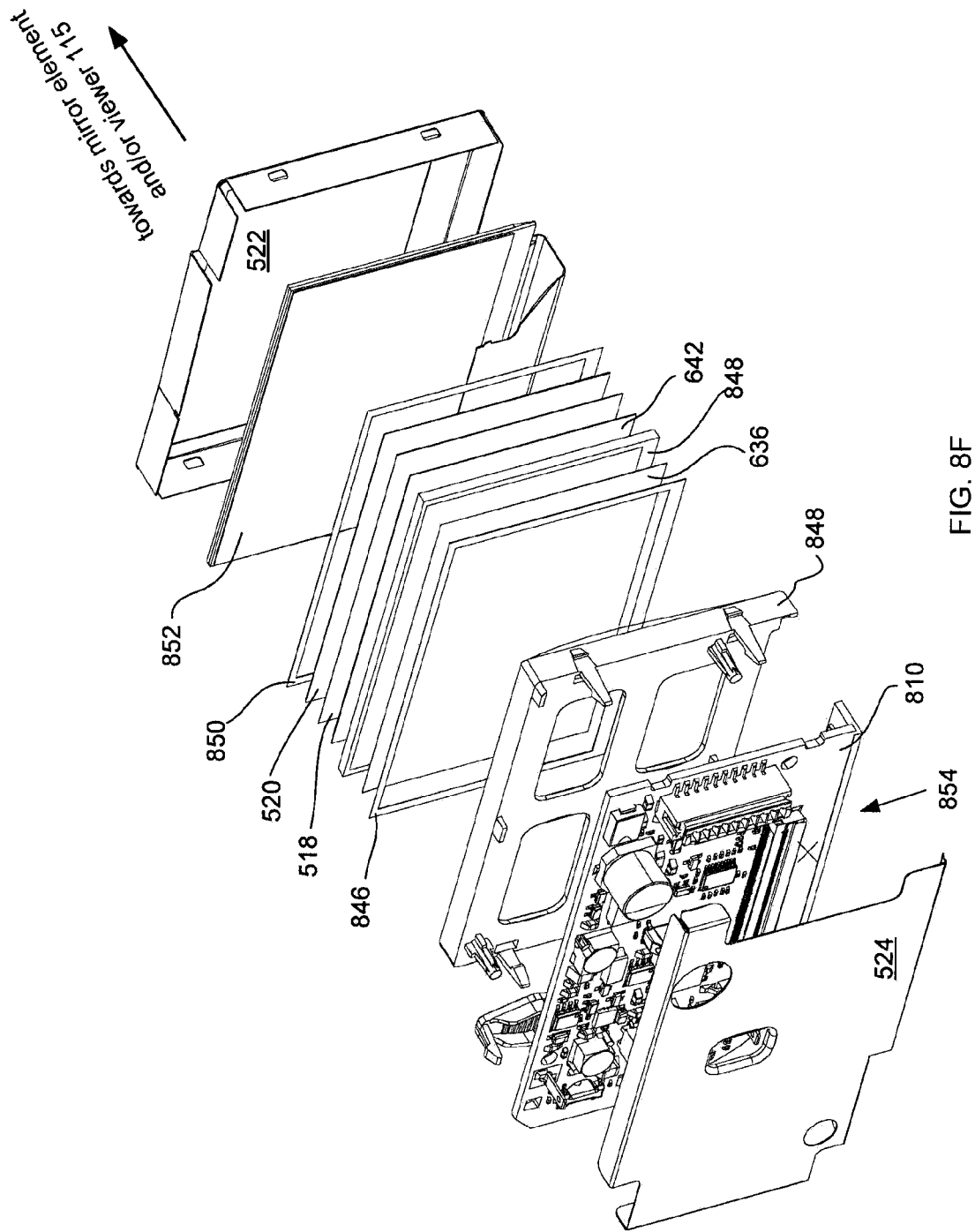

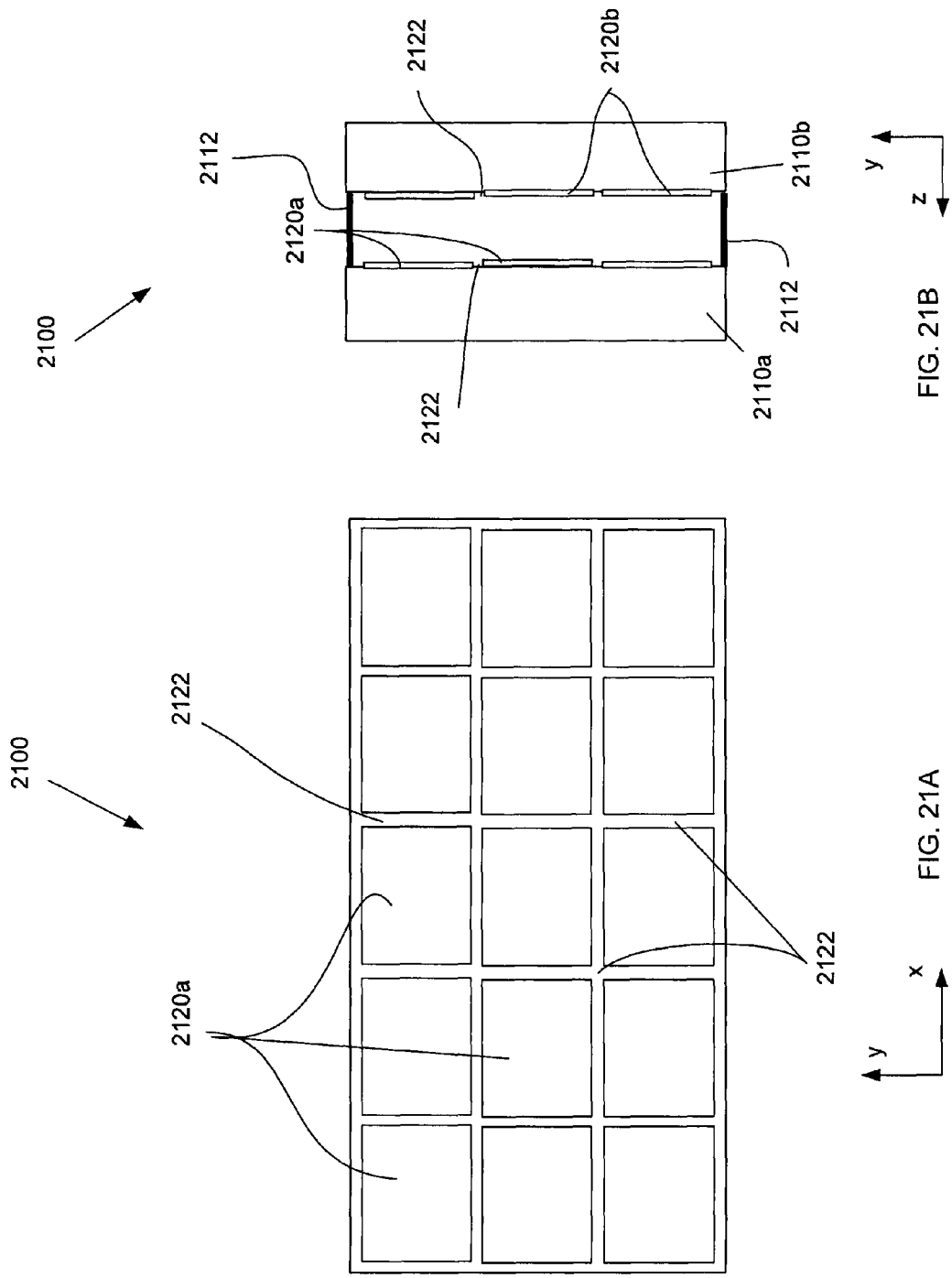

MODULAR LIGHT SOURCE/ELECTRONICS AND AUTOMOTIVE REARVIEW ASSEMBLIES USING THE SAME

CROSS-REFERENCE TO RELATED APPLICATIONS

This application claims the benefit of and priority from the U.S. Provisional Patent Application Ser. No. 61/286,452 filed on Dec. 15, 2009, which is incorporated herein by reference in its entirety.

TECHNICAL FIELD

The present invention relates to modular light sources/ electronics and automotive rearview assemblies, and, more particularly, to an automotive rearview mirror assembly employing light emitters that deliver light from the edge of the module.

BACKGROUND ART

Vehicular rearview mirror assemblies have proven to be a convenient location for providing drivers with useful information. For example, a video display disposed behind a rearview mirror, but visible through a portion of the mirror, may supply the driver with a video image of the scene to the rear of the vehicle where the driver's view may otherwise be obstructed. Similarly, an information display may offer the driver such vehicle-telemetry information as vehicle speed, engine status, oil level and temperature, for example, or any other information of interest. Integration of backup displays or other displays behind the mirror element in an automotive rearview mirror assembly is generally preferred over placing them adjacent to the mirror element, that would increase the area of the overall mirror assembly and impair the driver's view through the windshield.

Displays that have been, or might be, used in automotive applications employ various principles such as vacuum fluorescence (VF), electromechanics (EM), light emitting or organic light emitting diodes (LED or OLED), plasma display panels (PDP), microelectromechanical systems (MEMS), electroluminescence (EL), projection (the projection systems include but are not limited to DLP and LCOS), or liquid crystal technology (used in liquid crystal displays, or LCDs), to name just a few. High-resolution LCDs capable of delivering color images, for example, may be mass-produced reliably and at low cost. LCDs are also noteworthy in that the liquid crystal medium changes its polarizing properties under the influence of the applied electric field and the light emanating from an LCD is polarized.

LCDs used in applications such as LCD-based television or a computer display are conventionally illuminated with light emitters that light up the LCD from the side or back of the display panel. A conventional type of emitters used with LCDs has been a cold cathode fluorescent lamp (CCFL). Increasingly, however, light-emitting diodes (LEDs) are becoming the predominant backlighting technology of choice. Recent advances in LED technology, packaging, and materials have provided dramatic increases in LED brightness which, in turn, has led to the use of the LED in all types of lighting applications, including LCD backlights. Over the last several years, small color back-lit LCDs have been integrated into an ever-broadening range of products, including vehicular rearview mirror assemblies that utilize auto-dimming electro-optical mirrors or regular prismatic mirrors. A related light source subsystem for illumination of a display in a rearview automotive mirror typically includes an array of high-brightness white LEDs emitting light in the direction of the LCD, a diffuser that spatially redistributes the emitted light on its way to the LCD, and an electronic driver that provides a regulated constant current to drive the LEDs. The size of the display will often determine the number of LEDs required for illuminating of the LCD. In at least one embodiment the LEDs have a minimal shift in color over drive current, thereby, the LEDs are powered via an analog signal to reduce the amount of radiated emissions.

One of challenges presented by the use of display technology in an automotive context is that of providing the driver with preferably spatially uniform luminance sufficient to see the display clearly, especially under daunting conditions of ambient light, while, at the same time, providing a clear and undistorted reflected view of the rear and peripheral scene to the driver. Since automotive reflectors serve a crucial safety function in identifying objects otherwise outside of the driver's field of view, they must critically preserve image quality.

Applications illustrating various types of automotive mirror displays are disclosed in commonly assigned U.S. Pat. Nos. 6,870,655; 6,737,630; 6,572,233; 6,552,326; 6,420,800; 6,407,468; 6,346,698; 6,170,956; 5,883,605; and 5,825,527, U.S. patent application Ser. No. 12/367,143 entitled "A Vehicular Rearview Mirror Assembly Including Integrated Backlighting for a Liquid Crystal Display (LCD)," U.S. patent application Ser. No. 12/193,426 entitled "Vehicle Rearview Assembly Including A Display for Displaying Video Captured by a Camera and User Instructions," U.S. patent application Ser. No. 12/196,476 entitled "Discrete LED Backlight Control for a Reduced Power LCD Display System," and U.S. patent application Ser. No. 12/570,585 entitled "Multi-display mirror system and method for expanded view around the vehicle." Various types of displays used in conjunction with the rearview automotive mirrors are known in the art such as alphanumeric displays, graphical displays, video displays such as rear camera display (RCD), and combinations thereof. These displays are discussed, for example, in U.S. Pat. No. 7,221,363, and in U.S. Patent Publications Nos. 2008/0068520. Aggregately, the above-mentioned patent documents are referred to hereinafter as "Our Prior Applications". The disclosure of each of abovementioned patent documents is incorporated herein by reference in its entirety.

SUMMARY OF THE INVENTION

Embodiments of the present invention provide for an automotive rearview assembly including a housing and a transflective electrochromic (EC) mirror element, which may contains an optically anisotropic layer and is disposed inside the housing. The assembly, in addition, contains a light source disposed within the housing behind the mirror element with respect to the front of the assembly. The light source includes a first light emitter adapted to emit light along a first axis into a lightguide with first and second light-guiding surfaces that channels the coupled light and outcouple the channeled light through the first light-guiding surface; and a liquid-crystal display (LCD) disposed between the first light-guiding surface and the EC mirror element, the LCD having a liquid-crystal (LC) layer oriented to be substantially parallel to the first light-guiding surface. In one embodiment, the first axis is substantially parallel to the first light-guiding surface. The lightguide may be configured to have an elbow adapted to accept light emitted by the first light emitter. The lightguide may be further configured to outcouple the channeled light at a rate that is substantially independent of a location along the extent. In addition, the light source may further include a first reflective polarizer layer disposed within the light source adjacent to the LCD. In a specific embodiment, the transmission axis of the first reflective polarizer layer is aligned with a vector of polarization of light traversing the LCD. The second reflective polarizer may beaded to the assembly and placed between the light source and the EC mirror element. At least one of the first and second reflective polarizers may include an optically anisotropic plastic layer or, in the alternative, a wire-grid layer.

An assembly may further include at least one of an interior illumination assembly, a voice activated system, a trainable transceiver, a microphone, a compass system, a digital sound processing system, a highway toll booth interface, a telemetry system, a moisture sensor, a global positioning system, a vehicle vision system, a wireless communication interface, a camera, a transflective reflector, a navigation system, a turn signal, and an adaptive cruise control system. In a specific configuration, the light source may additionally include a segmented LC-cell in optical communication with the LCD, the segmented LC-cell being disposed between the LCD and the EC mirror element.

Embodiments of the invention also provide for an automotive rearview assembly that includes a housing, a mirror element disposed within the housing, and a light source disposed within the housing behind the mirror element with respect to the front. In one embodiment, the mirror element may include an electrochromic (EC) element. The light source includes at least a plurality of light emitters configured to form an array of emitters adapted to emit light along corresponding parallel axes that define a light-emitting plane and a lightguide in optical communication with the array of emitters and configured to outcouple light channeled by the lightguide through its first light-guiding surface. The rate of light outcoupling, in one embodiment, may be substantially independent from the location of the outcoupling point along the lightguide. The lightguide may be shaped to include an elbow adapted to accept light emitted by the array of emitters.

In addition, the light source incorporates an LCD having an LC layer disposed between the lightguide and the mirror element and parallel to the light-emitting plane. The assembly also has a light-source electronic circuitry adapted to provide power to and control an operation of the light emitters and the LCD, the light-source electronic circuitry disposed on an electronic printed circuit board (PCB) that is positioned on the side of the second light-guiding surface such that an area of projection of the electronic PCB onto the light-emitting plane does not differ from an area of projection of the LCD onto the light-emitting plane by more than about fifty percent.

Furthermore, the assembly may include a mirror element circuitry disposed on the electronic PCB and adapted to provide power to and control an operation of the mirror element, and have the array of emitters located on an emitter PCB that is operationally connected to and positioned transversely to the electronic PCB. In a specific embodiment, the light source further includes a segmented LC-cell in optical communication with the LCD, the segmented LC-cell being disposed between the LCD and the mirror element.

Moreover, embodiments of the invention provide for an automotive rearview assembly having a housing, an EC mirror element disposed within the housing, and a light source disposed within the housing behind the EC mirror element with respect to the front of the assembly, where the light source includes not only (i) a plurality of light emitters configured to form an array of emitters and further configured to emit light along corresponding axes that define a light-emitting plane; (ii) a lightguide having an extent and first and second light-guiding surfaces, the lightguide being in optical communication with the array of emitters and adapted to outcouple light channeled by the lightguide through the first light-guiding surface; and (iii) an LCD having an LC layer disposed between the lightguide and the EC mirror element in parallel to the light-emitting plane, but also (iv) a reflector positioned adjacent to a second light-guiding surface; and (v) a reflective polarizer disposed between the lightguide and the EC mirror element, the reflective polarizer being in optical communication with the reflector. The transmission axis of the reflective polarizer may be aligned in a specific embodiment, along a vector of polarization of light traversing the LCD.

In one embodiment, the light source may further include a segmented LC-cell disposed between the LCD and the mirror element in optical communication with the LCD.

Yet another embodiment provides for an automotive rearview assembly having a housing; a mirror element secured within the housing; and a light source disposed within the housing behind the mirror element with respect to the front of the assembly. The light source of the embodiment includes a first light emitter configured to emit light along a first axis; a lightguide that is in optical communication with the first light emitter so as to channel the light emitted by this emitter along the extent of the lightguide between lightguide's first and second light-guiding surfaces and to outcouple the channeled light channeled through the first light-guiding surface; and an LCD disposed between the first light-guiding surface and the mirror element, the LCD having a LC layer oriented parallel to the first light-guiding surface.

The light source may additionally include a reflector positioned adjacent to a second light-guiding surface, the reflector being in optical communication with the LCD, a second light emitter configured to emit light at least a portion of which is also coupled into and channeled by the lightguide, and, in a specific embodiment, a segmented LC-cell disposed between the LCD and the mirror element so as to be in optical communication with the LCD. Alternatively or in addition, the lightguide may be shaped so as to have an elbow adapted to accept light emitted by the at least one of the first and second emitters.

BRIEF DESCRIPTION OF THE DRAWINGS

The invention will be more fully understood by referring to the following Detailed Description in conjunction with the Drawings, in which like elements and components are denoted with like labels or indicators and of which:

FIGS. 3(A-D) show embodiments of a rearview mirror assembly.

FIGS. 6(A-C) schematically illustrate, in exploded views, embodiments of a light source of the present invention. FIG.

6A: an embodiment containing a diffuser and two one-dimensional apodizers.

FIGS. 7(A-C) illustrate the use of alternative embodiments of lightguiding portion of the invention.

FIGS. 8(A-G) provide embodiments related to electronic device containing a light source of the invention. FIG. 8F: an exploded perspective view, from the back, of the embodiment of FIG. 8B.

FIGS. 9(E, F): an APBF-containing laminate is integrated in a prism-mirror element containing a gap.

FIGS. 21(A, B) illustrate a segmented LC-cell for use with a light-source in accordance with an embodiment of the present invention.

DETAILED DESCRIPTION OF SPECIFIC EMBODIMENTS

Definitions

Figure 1:
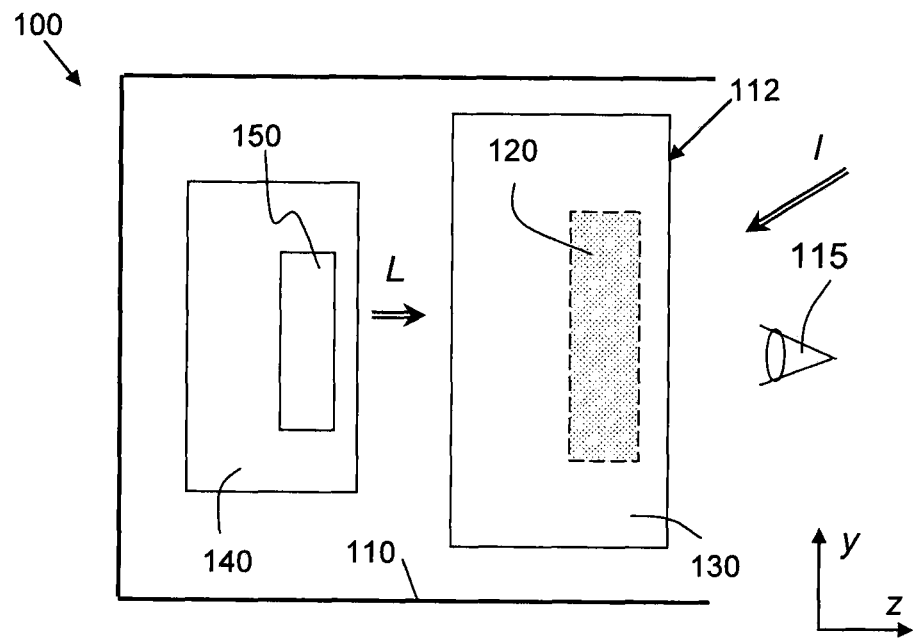
FIG. 1 illustrates schematically an embodiment of an automotive rearview mirror assembly.

As used in this description and the accompanying claims, the following terms shall have the meanings indicated, unless the context requires otherwise:

A "first polarization" and a "second polarization opposite the first polarization" generally refer to two different polarizations. In a particular case, the first and the second polarizations may be orthogonal polarizations (such as two linear polarizations represented by mutually perpendicular vectors, or left and right circular or elliptical polarizations).

A "light source" generally refers to a device serving as a source of illumination inclusive of optical elements that may gate or shape the illumination. Thus, for example, an LCD or any other display illuminated with the light from a light emitter is included within the meaning of a "light source". A light source may be used, e.g., for display of information, video images, or for illumination of an object.

A "stand-alone" element of a mirror assembly is an element that, upon being fabricated, does not include any elements of the mirror assembly that serve purposes other than the purpose of the stand-alone element. No component of a stand-alone laminate of the mirror assembly may be a structural element of any other subset of the mirror assembly. A stand-alone laminate, when fabricated, can be inserted into the mirror assembly and removed from it without disturbing the performance of the remaining elements of the assembly. In comparison, a laminate may integrate another element of the mirror assembly: e.g., a substrate for a mirror component may be simultaneously utilized as a substrate for the laminate, thus becoming one of the compound material components of the laminate.

"Apodization" refers to purposeful change of the intensity profile of a generally non-uniform illumination in an optical system. Accordingly, the apodization element or apodizer refers to an optical component performing such a change.

Generally, a "diffuser" is defined as an optical device that redistributes light incident upon a diffuser in such a fashion that the light emerges, after the interaction with the diffuser, at various angles. The function of a diffuser is to increase spatial uniformity of, or "homogenize", the light distribution. For example, an optical diffuser functions to provide a uniform surface distribution of light for a LCD with the use of light traversing the diffuser.

A "depolarize" is an optical structure that effectively changes a state of polarization of polarized light transmitted or reflected by the depolarizer into a different polarization state such that differences between the fundamental polarization components of incident polarized light are reduced after passing through or reflecting from said polarizer. One example of a depolarizer for present purposes would be an ideal depolarizer that scrambles the polarization of light and outputs randomly polarized light whatever the input. A practical depolarizer of this type typically produces pseudo-random output polarization. For example, an element that randomizes the phase difference between the s and p components of incident linearly polarized light passing through such element provides one example of a depolarizer. Another example of a depolarizer for present purposes would be a phase retarder converting linearly polarized light into elliptically polarized light such as, e.g., light polarized circularly, or into randomly polarized light. The addition of a depolarizer to the mirror assembly may result in a more uniform distribution of intensity with a tilt angle in both reflectance and transmittance when a viewer wears polarizing sunglasses. In addition, the presence of such depolarizer minimizes certain artifacts that appear in reflected and transmitted images.

The term "opaque" is applied in the following relative sense. "Opaque" refers to an optical element or material that is not appreciably transparent or translucent at wavelengths in question and thus does not allow light at such wavelengths to pass through. In the context of a mirror for viewing reflected and displayed images, for example, a portion or area of the mirror that does not transmit any significant amount of light may be characterized as opaque. If a light source such as a display device were positioned behind such portion of the mirror, then the viewer located in front of the mirror would not be able to see a substantial amount of light from the light source. The amount of light blocking or residual level of transmittance required for a region to be characterized as opaque will vary with application, and pertinent ranges are defined below. In various embodiments of the invention, an opaque area may have transmittance below 5 percent, preferably below 2.5 percent, more preferably below 1 percent and most preferably below 0.5 percent. Reflectance of the opaque area of the mirror generally remains significant, and the viewer will be able to see the ambient light reflected by the opaque area.

"Transflective" generally refers to an optical configuration that reflects at least a portion of light incident from at least one side, and transmits at least a portion of light incident from at least one side. In particular, "transflective" describes an optical element or component that has a useful non-zero level of transmittance and also has a useful, non-zero level of reflectance in a specified spectral region. In the context of an image-forming reflector, such as a mirror for viewing reflected images, for example, the viewer in front of the mirror may not only observe an image of the ambient objects, formed in reflection from such transflective area but also receive information contained in the displayed image delivered with light from the light source located behind the transflective area of the mirror.

Terms "multi-zone" mirror element and "multi-region" mirror element or reflector refer to an image-forming reflector or mirror having at least two optically different zones, i.e. at least two continuous stretches or regions within which specific distinctive optical characteristics exist or are established. A mirror having both opaque and transflective areas provides an example of a multi-zone mirror element. The term "area" is used herein interchangeably with "zone" and refers to a region, the projection of which is contiguous in some plane.

Two or more zones or areas are substantially coextensive, in a chosen surface, if projections of these zones onto such surface have substantially equal bounds.

In the context of thin-film coatings, a term "graded layer" refers to tapering of the thickness of a coating layer relative to the surface of a supporting base. (A supporting base may include a substrate and a base layer deposited thereon. A base layer in turn may include any transparent covering or coating such as a plastic film or one or more thin film layers.) For example, a graded layer deposited on a substrate has a thickness gradient, and a slope of the upper surface of such layer, corresponding to the rate of thickness change with distance. The thickness gradient may be expressed in various ways, e.g., in percent per distance. Consequently, a graded layer may have a portion of its upper surface (opposite to the lower surface facing the supporting base) that is inclined with respect to the lower surface or the surface of the supporting base.

A surface is considered inclined with respect to a reference surface if it forms an angle, with the reference surface, that is neither zero nor ninety degrees. For example, a dihedral angle formed by a reference plane and a plane inclined with respect to the reference plane differs from either zero or ninety degrees. An inclined surface is sloping or slanting with respect to a reference surface.

The spectrum of light reflected (and that of light transmitted) by an embodiment of the mirror system of the invention can be tuned or modified by adjusting the thickness of the reflectance-enhancing layers. The peak reflectance will vary with optical design wavelength and this will result in a change in color gamut of the reflected (and transmitted) light. In discussing color distributions (i.e., spectra of light), it is useful to refer to the Commission Internationale de l'Eclairage's (CIE) 1976 CIELAB Chromaticity Diagram (commonly referred to the L*a*b* chart or quantification scheme). The technology of color is relatively complex, but a fairly comprehensive discussion is given by F. W. Billmeyer and M. Saltzman in *Principles of Color Technology*, $2^{nd}$ Edition, J. Wiley and Sons Inc. (1981). The present disclosure, as it relates to color technology and uses appropriate terminology, generally follows that discussion. According to the L*a*b* quantification scheme, L* represents brightness, a* is a color coordinate that denotes the color gamut ranging from red (positive a*) to green (negative a*), and b* is a color coordinate that denotes the color gamut ranging from yellow and blue (positive and negative values of b*, respectively). As used in this application, Y (sometimes also referred to as Cap Y), represents the overall reflectance. For example, absorption spectra of an electrochromic medium, as measured at any particular voltage applied to the medium, may be converted to a three-number designation corresponding to a set of L*a*b* values. To calculate a set of color coordinates, such as L*a*b* values, from the spectral transmission or reflectance, two additional parameters are required. One is the spectral power distribution of the source or illuminant. The present disclosure uses CIE Standard Illuminant A to simulate light from automobile headlamps and uses CIE Standard Illuminant $D_{65}$ to simulate daylight. The second parameter is the spectral response of the observer. Many of the examples below refer to a value Y from the 1964 CIE Standard since it corresponds more closely to the spectral reflectance than L*. The value of "color magnitude", or C*, is defined as $C^* = \sqrt{(a^*)^2 + (b^*)^2}$ and provides a measure for quantifying color neutrality. The metric of "color difference", or $\Delta C^*$ is defined as $\Delta C^* = \sqrt{(a^* - a^{*\prime})^2 + (b^* - b^{*\prime})^2}$, where (a*, b*) and (a*', b*') describe color of light obtained in two different measurements. Additional CIELAB metric is defined as $\Delta E^* = (\Delta a^{*2} + \Delta b^{*2} + \Delta L^{*2})^{1/2}$. The color values described herein are based, unless stated otherwise, on the CIE Standard D65 illuminant and the 10-degree observer.

"Contrast" generally refers to a ratio of light intensity of a signal of interest to the light intensity of the background. In context of a mirror having a display device disposed behind the mirror, for example, the contrast of light generated by the display and reaching the viewer through the mirror may be determined by the ratio of the display light intensity reaching the viewer to that of the intensity of ambient light reflected by the mirror.

Both the irradiance and the intensity of light are defined according to optical conventions. Specifically, intensity refers to radiant or luminous power per unit solid angle, while irradiance denotes radiant power per unit area.

As broadly used and described herein, the reference to an electrode or layer as being "carried" on or applied to a surface of an element, refers to both electrodes or layers that are disposed directly on the surface of an element or disposed on another coating, layer or layers that are disposed directly on the surface of the element.

Numbering of Structural Surfaces.

In describing the order of elements or components in embodiments of a vehicular rearview assembly or a sub-set of a vehicular rearview assembly, the following convention will be generally followed herein, unless stated otherwise. The order in which the surfaces of sequentially positioned structural elements of the assembly (such as substrates made of glass or other translucent material) are viewed is the order in which these surfaces are referred to as the first surface, the second surface, the third surface, and other surfaces if present referred to in ascending order. Generally, therefore, surfaces of the structural elements (such as substrates) of an embodiment of the invention are numerically labeled starting with a surface that corresponds to the front portion of a rearview assembly and that is proximal to the observer or user of the assembly and ending with a surface that corresponds to the back portion of an assembly and that is distal to the user. Accordingly, the term "behind" refers to a position, in space, following something else and suggests that one element or thing is at the back of another as viewed from the front of the rearview assembly. Similarly, the term "in front of" refers to a forward place or position, with respect to a particular element as viewed from the front of the assembly.

The following disclosure describes embodiments of the invention with reference to the corresponding drawings, in which like numbers represent the same or similar elements wherever possible. In the drawings, the depicted structural elements are not to scale and certain components are enlarged relative to the other components for purposes of emphasis and understanding. References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Types of automotive rearview mirror assemblies that contain a display and to which embodiments of the present invention may advantageously be applied include, without limitation, a mirror assembly incorporating transflective elements (i.e. elements that are partially transmissive and partially reflective), a mirror assembly including prismatic reflective elements, and a mirror assembly incorporating an electrochromic mirror element. Transflective optics may be, without limitation, partially transmissive, directionally transmissive, multichroic, or polarization-sensitive. Various rearview mirror structures and related methods of fabrication have been addressed, for example, in U.S. Pat. Nos. 5,818,625; 6,166,848; 6,356,376; 6,700,692; 7,009,751; 7,042,616; 7,221,363; 7,372,611; 7,502,156; U.S. Patent Publications Nos. 2008/0068520, 2008/0030836, 2008/0302657, 2008/0310005, and 2007/0201122, and U.S. patent application Ser. No. 12/496,620 filed Jul. 1, 2009 and Ser. No. 12/629,757 filed Dec. 2, 2009, the disclosure of each of which is incorporated herein by reference in its entirety, and which are collectively referred to herein as "Our Prior Applications." Displays and transflective optics may be incorporated in various vehicle locations, not only in rearview mirrors (interior or exterior to the vehicle) and sideview mirrors. For example, displays and transflective optics may be contained in sun visors, instrument panels, dashboards, overhead consoles and the like. The rearview mirror assemblies may comprise surfaces of various geometries such as, by way of non-limiting example, planar, cylindrical, convex, aspheric, prismatic, other complex surfaces, or combinations thereof.

As schematically illustrated in FIG. 1 in side view, an embodiment 100 of a typical automotive rearview mirror assembly may include a housing 110 with a mirror system 112 containing a mirror element or subassembly 120 and optional auxiliary optics 130 such as, e.g., various filters affecting characteristics of light disposed within the housing. The mirror element 120 may include an electro-optic element or, e.g., a prismatic element. The mirror system 112 is often used in conjunction with an electronic device 140 that facilitates the control of the assembly 100 and may include a light emitter (not shown), electronics (not shown) that manages operation of the light emitter and/or the mirror system 120, a display 150 such as an LCD that is illuminated with light generated by the light emitter, and additional circuitry. In some embodiments, the electronic device 140 may include a light-detecting optical components such optical sensors for receiving light through the mirror system 112. Light from the light emitters is delivered through the LCD as light input L to the mirror system 112, and further through the mirror system 112 towards a driver/viewer 115 to produce a displayed image visible to the viewer on at least a portion of the front surface of the mirror system. Generally, the electronic device 140 is disposed within the housing 110 as a stand-alone component behind the mirror system 112 with respect to the viewer 115, that is separated from the mirror system by a gap. Alternatively, a component of the electronic device 140, e.g., the display 150, may be positioned in physical contact (not shown) with the mirror system 112. Quite often contrast of a displayed image, perceived by the driver 115 through the mirror system 112 against a background of ambient light I reflected by the mirror system, may remain quite low, particularly when the ambient light I is plentiful.

Figure 2:
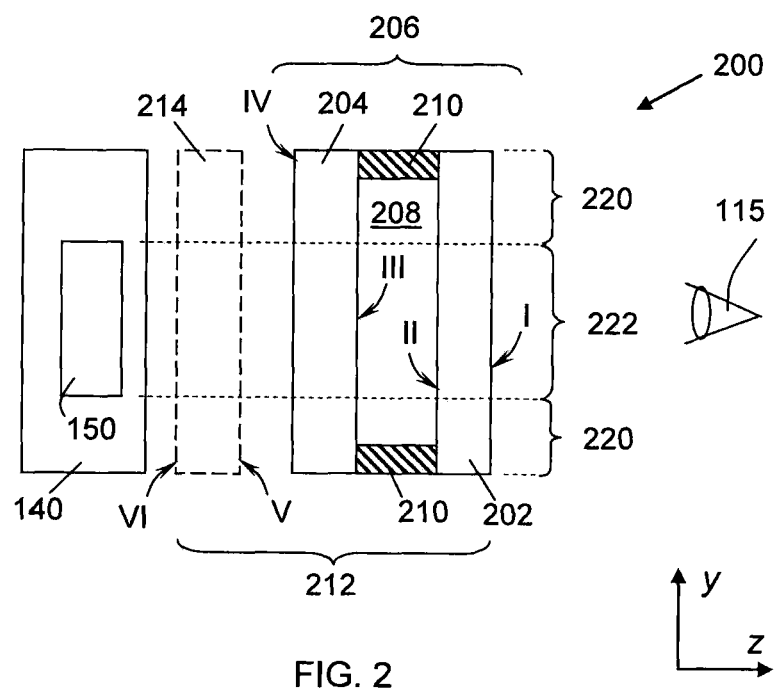
FIG. 2 shows an embodiment of an automotive rearview mirror assembly employing an EC-mirror element.

One known embodiment of the rearview mirror assembly, for example, employs an electrochromic (EC) mirror element with a 3.5" LCD rear camera display (RCD) positioned behind the mirror element so as to project a displayed image through the mirror element towards the driver of the vehicle. The EC element may be incorporated in an inside or an outside mirror assembly. An EC-mirror assembly used inside the vehicle is usually adapted to be installed on a motor vehicle in a conventional manner so as to face the rear of the vehicle and to be viewed by the driver. The substrates of the EC-mirror element may be made of any material that is transparent to the visible light and that has sufficient strength to be able to operate in conditions with varying temperatures and pressures, commonly found in the automotive environment. FIG. 2 provides additional details by schematically showing, as an illustration, a specific example of an embodiment 200 employing a multi-zone rearview EC-mirror element. As shown, the assembly 200 includes several glass substrates. For the purposes of this disclosure and the appended claims, a lite of glass such as a substrate 202 that is positioned in front of the driver/viewer 115, is referred to as the front substrate (or a first substrate), while a next-in-line substrate, 204, is referred to as the second substrate. The front surface of the front substrate 202 that is proximal and closest to the viewer 115, is referred to as the "first surface" (or surface I). A rear, or distal with respect to the viewer 115, surface of the first lite 202 is referred to as the "second surface" (or surface II) and the front surface of the second substrate or the 204 is referred to as the "third surface" (or surface III). A rear, or distal with respect to the viewer 115, surface of the second lite 204 is referred to as the "fourth surface" (or surface IV). As shown, a rearview EC-element 206 is formed by the lites 202 and 204. An EC-medium 208 is disposed within a sealed chamber defined by surfaces II and III and a peripheral seal 210. In a particular embodiment of the mirror element used in a commercial product, a reflective coating including a stack of thin-film layers may be disposed on the third and/or fourth surface of the mirror element. A EC-mirror system 212 may include, in addition to the EC-element 206, auxiliary lites of glass (such as a lite 214 shown in a dashed line) and auxiliary coatings and filtering optics (not shown). Examples of such embodiments containing additional lites of glass are provided, for example, in the U.S. patent application Ser. No. 12/629,757 filed on Dec. 2, 2009 and now published as U.S. 2010/0110553, and Ser. No. 12/774,721 filed on May 5, 2010 and now published as U.S. 2010/0277786. Each of these patent documents is incorporated herein by reference in its entirety. As disclosed in these applications, mirror elements and systems employed in automotive rearview mirror assemblies may further benefit from the use of anisotropic polymer-based films (APBFs.) In case when more than two lites of glass are used in a rearview mirror element system, surfaces of additional lites of glass are numbered accordingly, from the viewer 115 towards the outermost rear surface. For example, as shown in FIG. 2 in Roman numerals, the front surface of the additional (third) lite of glass 214 is denoted as surface V, while the rear surface of third lite of glass 214 is denoted as surface VI. In an alternative embodiment, a wire-grid polarizing element may be used instead of an APBF.

The embodiment 200 further includes an electronic device 140 that contains the display 150 such as an RCD is schematically shown to be positioned behind the EC-mirror system 212. For simplicity of illustration, various conductive layers, generally provided on the inside surfaces of the transparent substrates 202 and 204 (i.e., surfaces II and III), as well as auxiliary reflective, opaque, and semi-transparent coatings that facilitate the desired optical characteristics of the mirror, are not shown in FIG. 2. For example, a typical EC-mirror element 206 includes conductive layers, disposed on facing each other surfaces of the first and second lites, that are connected to electronic circuitry contained within the device 140 that controls the transmission of the EC-medium 208. As shown, the EC-mirror system 212 has an opaque zone 220 and a transflective zone 222 opposite the display 150. Generally, a mirror system of the invention may also include a transition region or zone (not shown) that separates the transflective and opaque zones and that may be formed by grading or tailoring of material or mechanical properties of thin-film layers used in creating the thin-film coatings of the mirror system. Detailed description of multi-zone mirror elements is provided, e.g., in U.S. patent application Ser. No. 12/370,909, now published as U.S. 2009/207513 and further referred to hereinafter as "Multi-Zone Mirror Application." The disclosure of this patent application is incorporated herein by reference in its entirety.

Figure 3A:
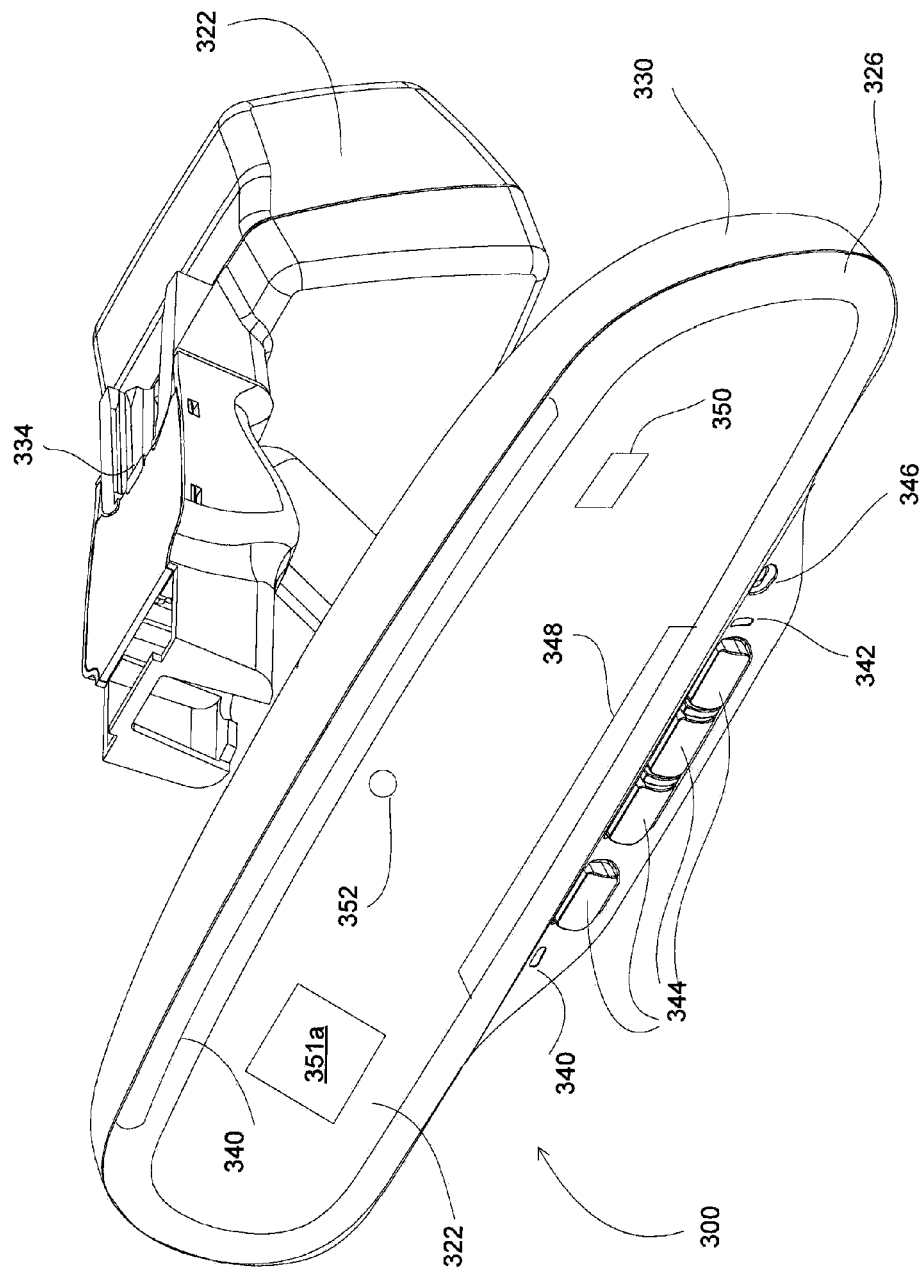
FIG. 3A: an embodiment of an inside rearview mirror assembly in front perspective view.
Figure 3B:
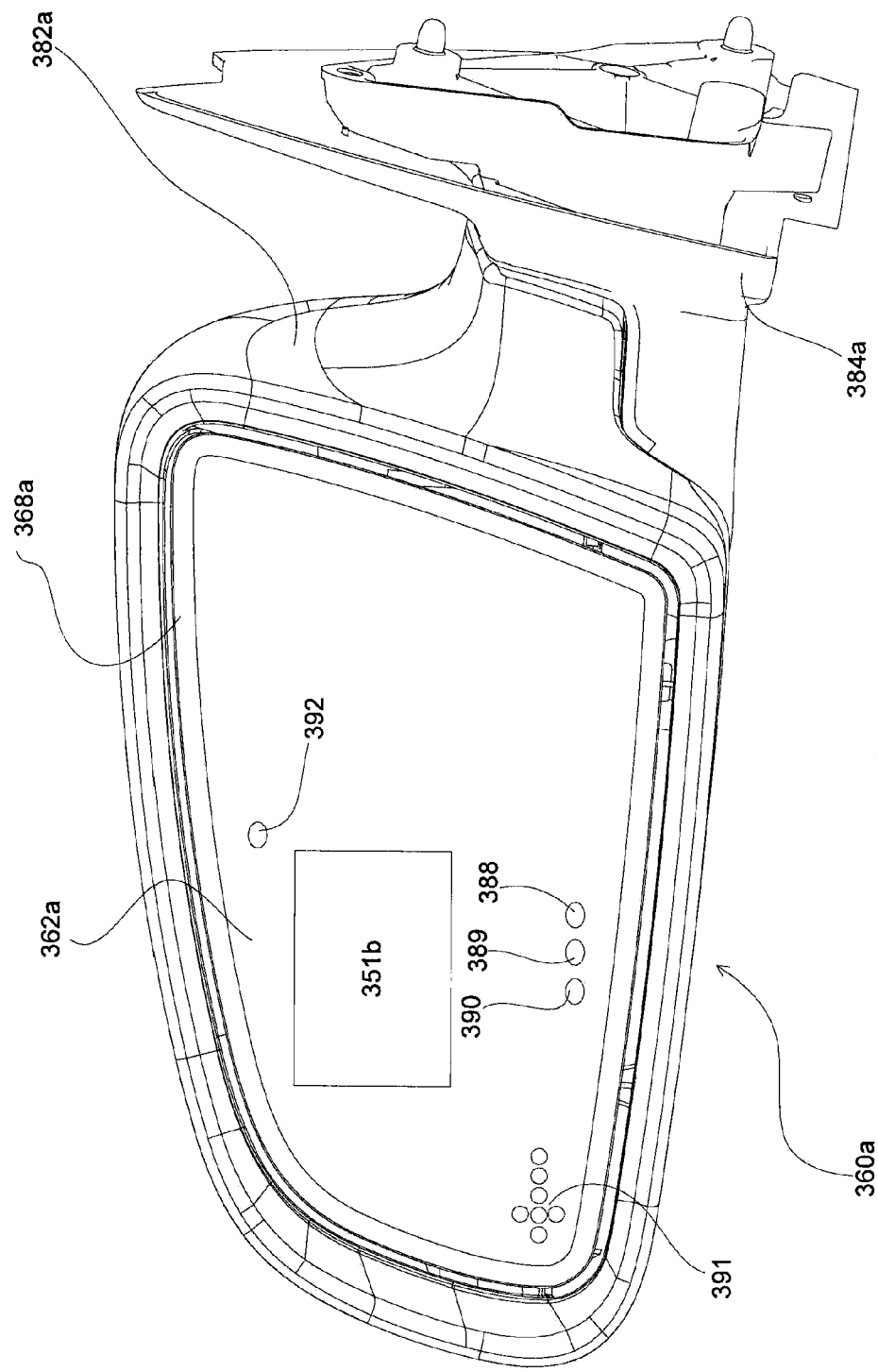
FIG. 3B: an outside rearview mirror assembly in front perspective view.

The embodiment 200 or any other embodiment of a mirror system for use in a vehicular rearview mirror assembly may be further disposed within a rearview mirror assembly such as an exemplary inside rearview mirror assembly 300 shown in FIG. 3A or an exemplary outside rearview mirror assembly shown in FIG. 3B, both shown in perspective views. The mirror assembly 300 is shown as viewed looking at the first surface 322 (surface I), with a bezel 326 positioned between a viewer and a primary seal material (not shown). In configuration of FIGS. 3(A,B), the embodiment 200 is positioned within a movable housing 330 and optionally combined with a stationary housing 332 on a mounting structure 334. A first indicator 340, a second indicator 342, an operator interface 344, and a first photo sensor 346 are located in a chin portion of the movable housing 330. Information displays 348, 350, 351a and a second photo sensor 352 are incorporated within the assembly behind the mirror element with respect to the viewer. As described in Our Prior Applications, it is preferable to have devices 348, 350, 351a, 352 at least partially covert. In at least one embodiment, a rearview mirror assembly may additionally include at least one illumination assembly or a light source with a printed circuit board, and at least one microphone. It should be understood that embodiments of the present invention may also be individually or collectively incorporated in either electro-optic mirrors, prism mirrors, rearview assemblies or windows in a multitude of combinations.

Figure 3C:
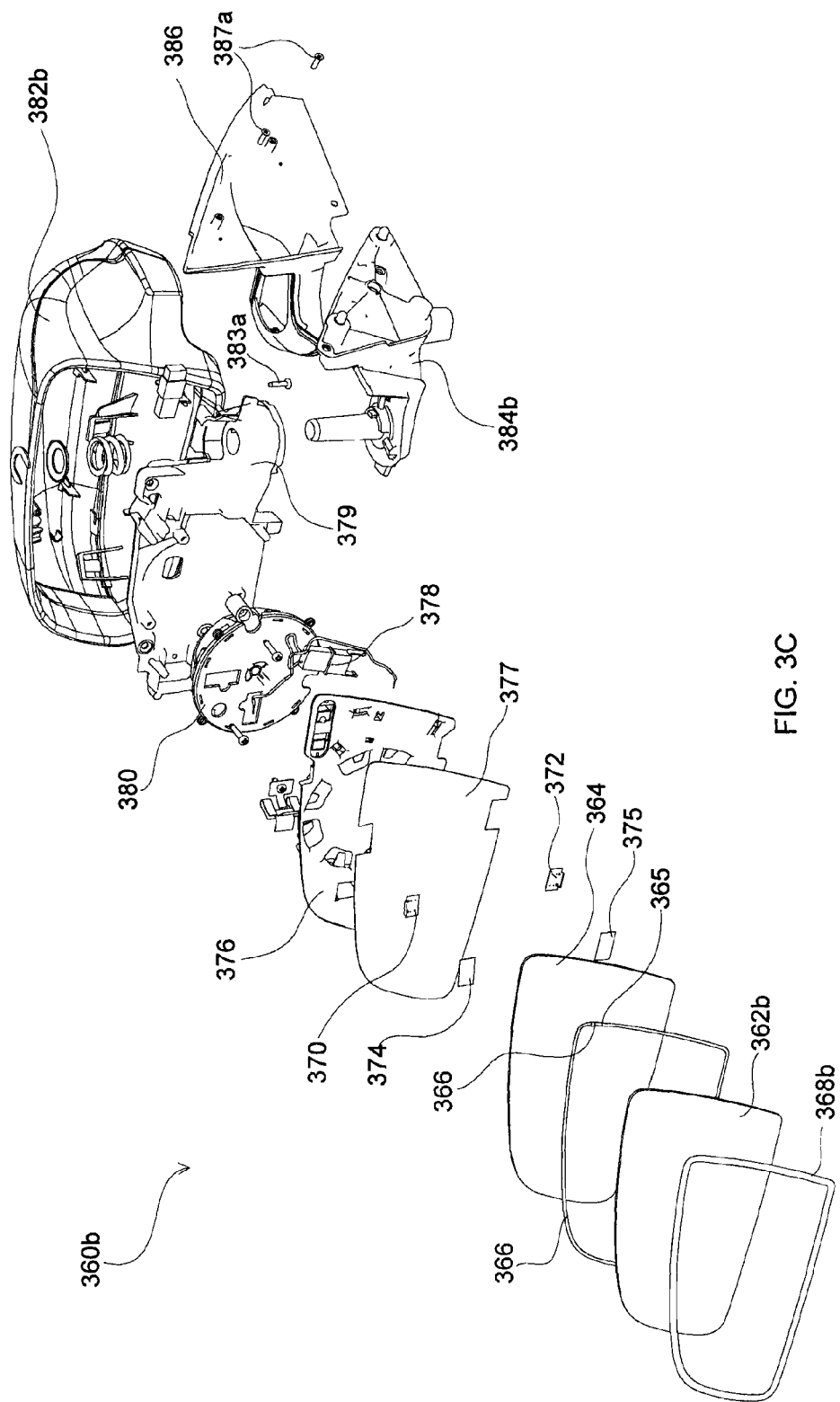
FIG. 3C: the assembly of FIG. 3B in exploded view.

Turning now to FIGS. 3B and 3C, various components of an embodiment of an outside rearview mirror assembly 360a, 360b are depicted. Just like the exemplary embodiment of the inside rearview mirror assembly, described in reference to FIG. 3A, the electro-optic mirror element of the outside mirror assembly may comprise a first substrate 362a, 362b secured in a spaced apart relationship with a second substrate 364 via a primary seal 366 to form a chamber therebetween. At least a portion of the primary seal is left void to form at least one chamber fill port 365. An electro-optic medium is enclosed in the chamber and the fill port(s) are sealingly closed via a plug material. Preferably, the plug material is a UV curable epoxy or acrylic material. Also shown is a spectral filter material 368a, 368b located near the periphery of the element. Electrical clips 370, 372 are preferably secured to the element, respectively, via first adhesive material 374, 375. The element is secured to a carrier plate 376 via second adhesive material 377. Electrical connections from the outside rearview mirror to other components of the controlled vehicle are preferably made via a connector 378. The carrier is attached to an associated housing mount 379 via a positioner 380. Preferably, the housing mount is engaged with a housing 382a, 382b and secured via at least one fastener 383a. Preferably the housing mount comprises a swivel portion configured to engage a swivel mount 384a, 384b. The swivel mount is preferably configured to engage a vehicle mount 386 via at least one fastener 387a. With further reference to FIG. 3(B), the outside rearview mirror assembly 360a is oriented such that a view of the first substrate 362a is shown with the spectral filter material 368a positioned between the viewer and the primary seal material (not shown). Various auxiliary information devices such as, e.g., an information display 351b, a blind spot indicator 388, a keyhole illuminator 389, a puddle light 390, a turn signal 391, a photo sensor 392 may be incorporated within the rearview mirror assembly such that they are positioned behind the element with respect to the viewer. Some of auxiliary devices, in particular the devices 388 through 392 are configured in combination with the mirror element to be at least partially covert as discussed in detail within various patent documents incorporated by reference herein. Additional details of all these components and devices and their interconnections and operation are provided in Our Prior Applications. Although the foregoing discussion was presented with respect to an EC-mirror element such as the mirror element 206 of FIG. 2 (or the mirror system such as the mirror system 212 that includes such an element), it will be understood that the use of any element—whether an electro-optic, or a simple prismatic element, or a flat, convex, or concave element—is contemplated in conjunction with embodiments of the present invention. Several examples of such elements are discussed later herein with reference to FIGS. 9 through 12. In addition or alternatively, the rearview mirror assembly may include at least one additional device such as, without limitation, an interior illumination assembly, a voice activated system, a trainable transceiver, a microphone, a compass system, a digital sound processing system, a highway toll booth interface, a telemetry system, a moisture sensor, a global positioning system, a vehicle vision system, a wireless communication interface, a camera, a transflective reflector, a navigation system, a turn signal, and an adaptive cruise control system. These systems may be integrated, at least in part, in a common control with information displays and/or may share components with the information displays. In addition, the status of these systems and/or the devices controlled thereby may be displayed on the associated information displays.

Figure 3D:
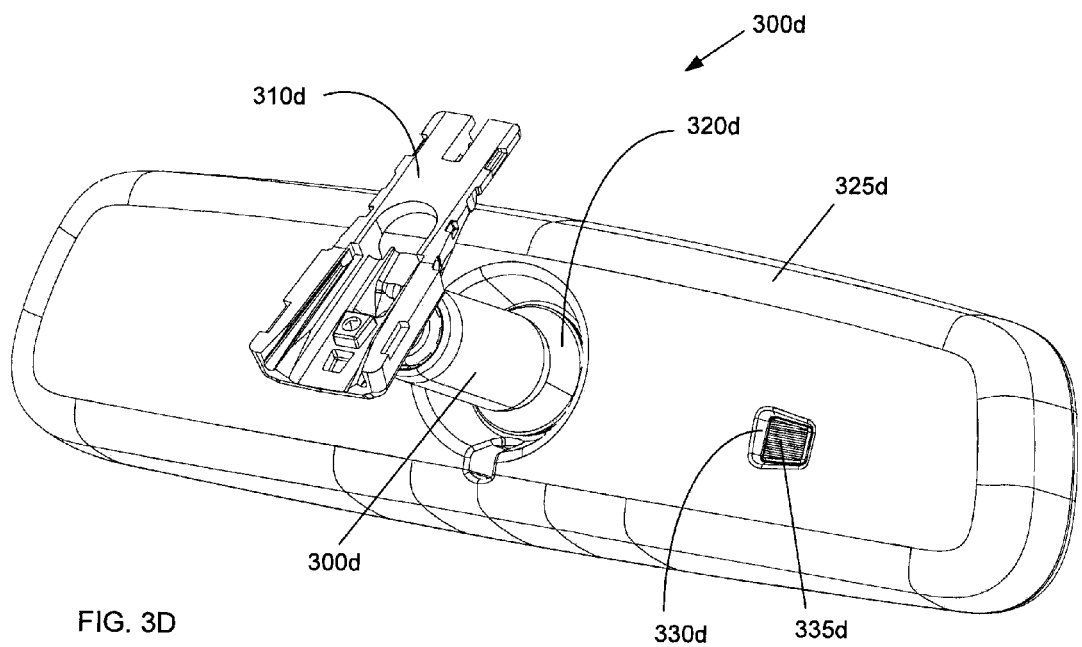
FIG. 3D: a portion of the assembly of FIG. 3A in rear perspective view.
Figure 15A:
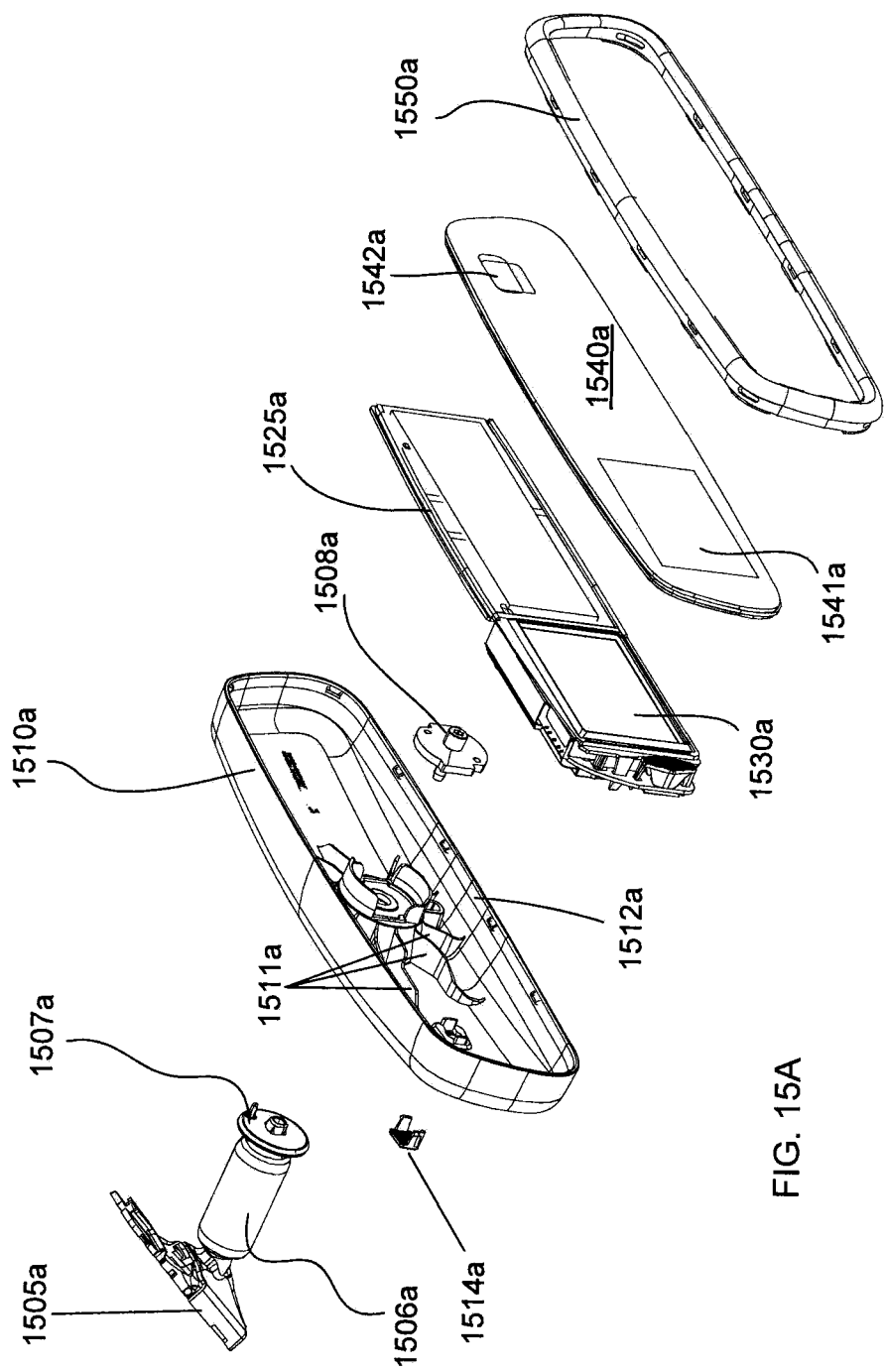
FIGS. 15(A, B) show front and back exploded perspective views of an embodiment of an assembly of the invention.

FIG. 3D depicts a perspective view of the rear of a rearview assembly 300d. It should be understood that this illustration may be the rear view of any of the front views described herein, such as that of FIG. 3A and FIG. 15A. As shown, the assembly comprises a windshield mount 310d, a stem 315d and a housing 325d pivotally connected to the rearview assembly mounting structure via mount connector 320d. In at least one embodiment the housing 325d comprises an aperture 330d providing a field of view for an associated ambient light sensor (not shown). In a related embodiment, a secondary optic 335d is provided for modifying the field of view. As described elsewhere herein, alternate embodiments of the present invention do not incorporate an ambient light sensor, therefore, no aperture or secondary optic is required.

Figure 4:
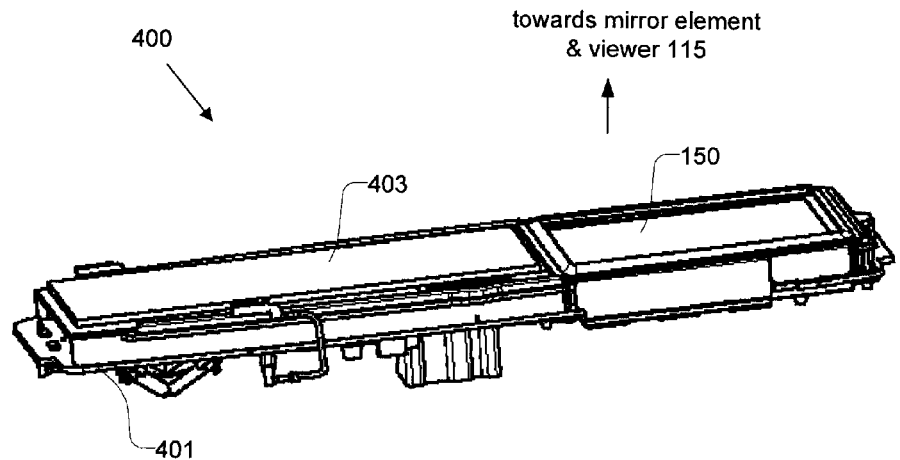
FIG. 4 is a top perspective view of a related embodiment of an electronic device used within the rearview mirror assembly.

As shown in FIG. 4, and in further reference to FIG. 1, a circuit board assembly 400 of a related embodiment of the electronic device 140 including the LCD 150 is presented in perspective view. The circuit board assembly 400 includes a printed circuit board 401 that may be disposed under a support plate 403 and that extends underneath the LCD 150. The support plate 403 provides structural support to the mirror element 206 (not shown). The circuit board 401 structurally carries and supports light emitters such as LEDs used for illumination of the LCD 150, the electronics controlling the operations of the light emitters, additional circuitry responsible for operation of various sensors as well as that associated with the mirror element. The LCD 150 may be mounted to the circuit board 401 without the use of any external daughter-board or a similar component. It will be recognized that the extent of the circuit board 401 is significantly larger than that of the LCD 150 (i.e., the "foot-print" of the circuit board may be several times that of the LCD 150.)

Figure 5A:
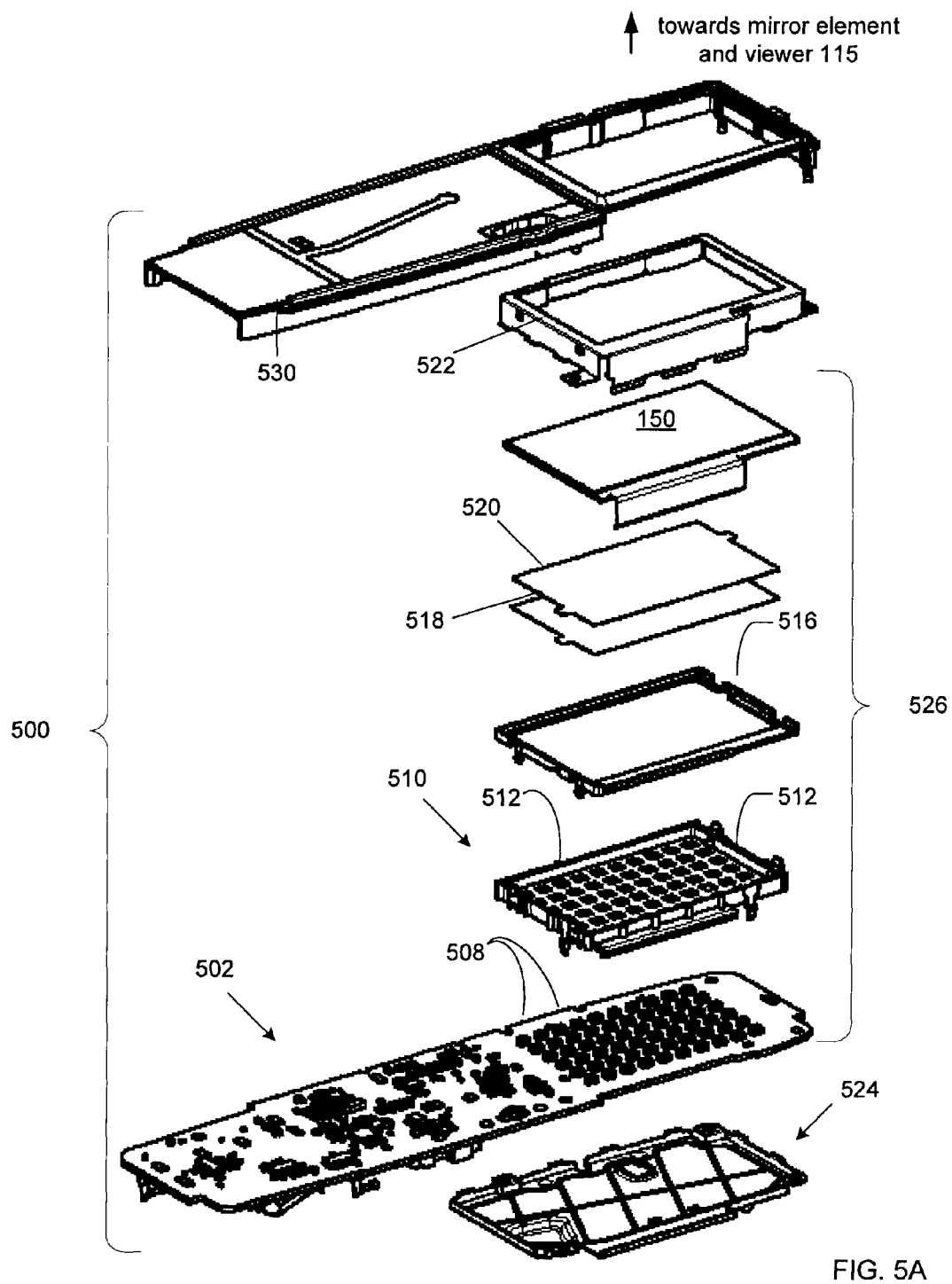
FIG. 5A is a top exploded view of the related embodiment of FIG. 4.

Illumination of a display disposed behind a mirror system in a vehicular rearview assembly typically utilizes an array of powerful LEDs. FIG. 5A provides an exploded view 500 illustrating one embodiment of the electronic device 140 as disclosed in detail in the U.S. patent application Ser. No. 12/367,143. A printed circuit board 502 is used for mounting various electronic components including a matrix 508 of LEDs, various sensors such as a glare light sensor, and connectors that provide power to the electronic components and the LCD 150. A reflector 510 is configured to fit over the LEDs 508 and includes a matrix of reflective cavities 512 corresponding to the matrix of the LEDs 508. The reflector 510 is appropriately positioned so as to allow each of the LEDs 508 to protrude into a corresponding cavity 512 of the reflector through a corresponding aperture (not shown) of the cavity. Each of the cavities 512 is appropriately shaped and configured to redirect the maximum amount of light emitted by a corresponding LED towards the LCD, in a predetermined spatial pattern. A diffuser 516 is disposed adjacent to the reflector 510 and diffuses, spreads out, or scatters light from the LED array 508 to deliver a more uniform distribution of light towards the LCD 150. Each of the optical components 518 and 520, such as brightness-enhancement films (BEFs) that are positioned in tandem in front of the diffuser 516 as viewed by the observer 115, reduces a spatial angle of LED-emitted light reaching the display 150 by appropriately refracting the light in an optical microstructure of the component. By using two BEFs crossed at 90°, the reduction of the viewing angle can increase the display brightness by up to 60%.

In further reference to FIG. 5A, the LCD 150 may be either a color or a monochromic LCD, which is an electronically-modulated optical device shaped into a thin, flat panel made up of any number of color or monochrome pixels filled with liquid crystal material and arrayed in front of the light source backlight or reflector 510. A front shield 522 and a rear shield 524 may be used to encase the LCD-including sub-assembly 526 to contain or block any RF radiation emitted by the LCD 150. Finally, a support plate 530 may be used to provide a supporting surface for the LCD sub-assembly 526 when in a compressed or assembled condition. In at least one embodiment, the support plate 503 is structurally held up by an associated windshield mounting structure. In another embodiment, the support plate may be structurally supported by an associated housing which, in turn, is structurally supported by an associated windshield mounting structure. Where the support plate is structurally supported by an associated windshield mounting structure, an associated housing may be provided that more closely resembles a cover.

Figure 5B:
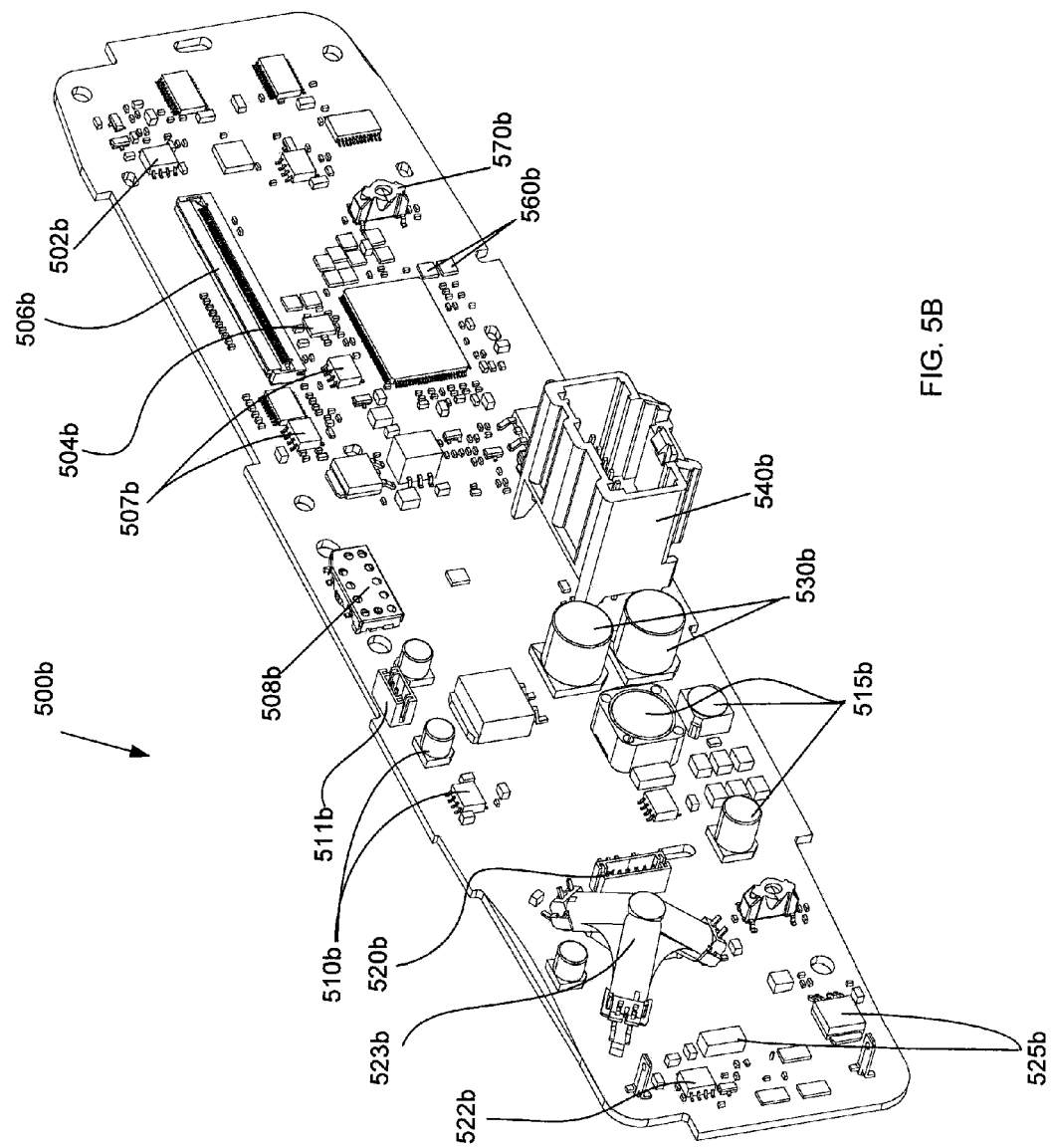
FIG. 5B illustrates a back view of the PCB of FIG. 5A.
Figure 5C:
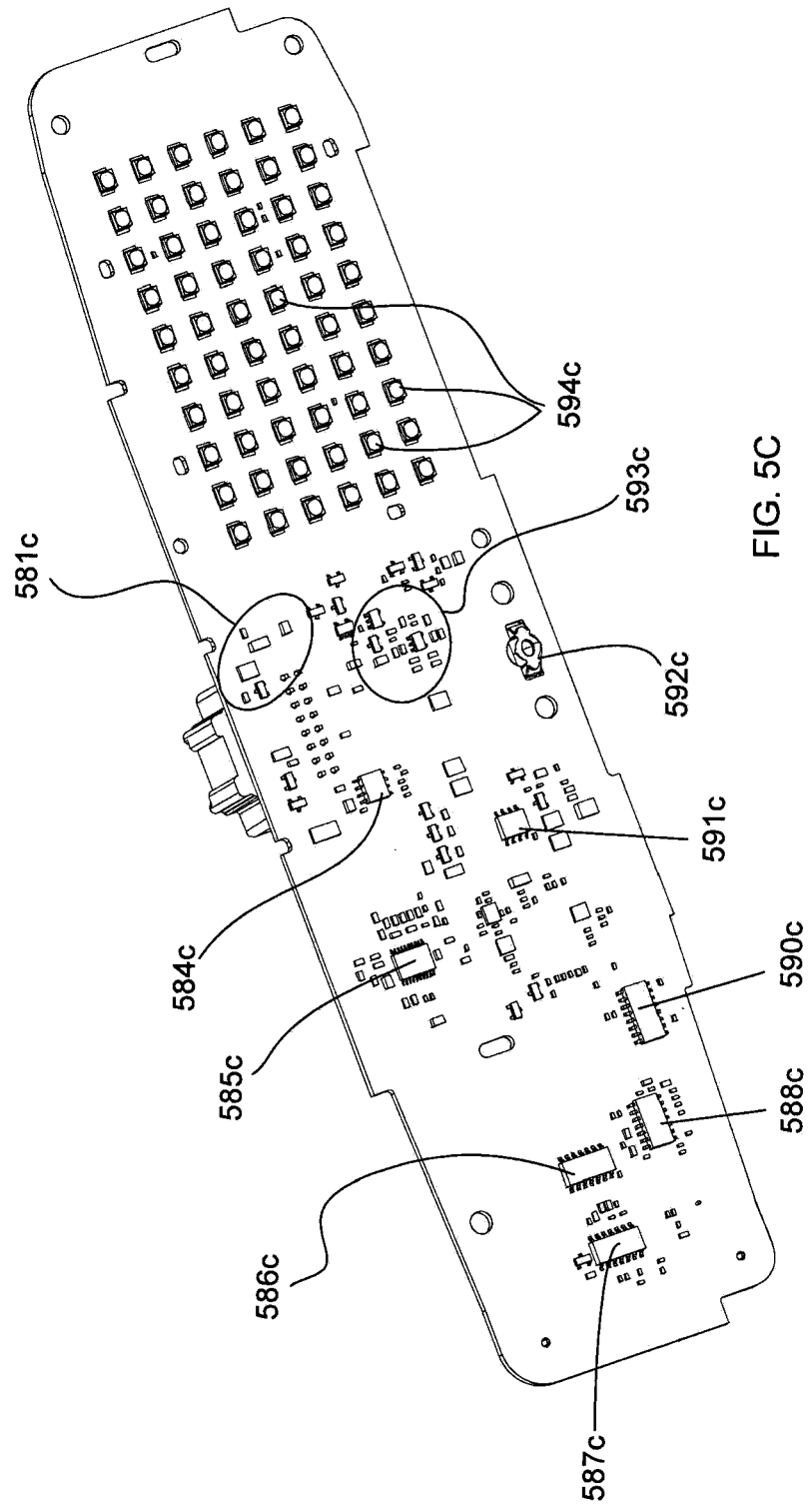
FIG. 5C illustrates a front view of the PCB 502 of FIG. 5A.

Turning to FIGS. 5B and 5C, a front view (front side) 500b and a rear view (rear side) 500c of a printed circuit board are depicted, respectively. In relation to a corresponding rearview assembly for a vehicle, the front view 500b side of the printed circuit board is oriented toward the front of the vehicle, the rear view 500c side of the printed circuit board is oriented toward the interior and rear of the vehicle. In at least one embodiment, the printed circuit board extends nearly the full width and height of a corresponding rearview assembly housing/bezel.

As depicted in FIG. 5B, the front side 500b of the printed circuit board comprises an LCD power monitor 502b, an LCD switchmode power supply 504b, a LCD ribbon connector 506b, a dynamic backlight control 507b and dynamic LED backlight drivers 560b. When combined with the graphic processing unit (GPU) 591c, an LCD driver 593c and an array of LEDs 594c shown in FIG. 5C, the electronic components related to control and backlighting 561b of an associated LCD (not shown) are located on the front side 500b and the rear side 500c of the printed circuit board. This assures an efficient and reliable design for the associated electronics and minimizes electromagnetic emissions.

With further reference to FIG. 5B, the front side 500b further comprises a GPU programming connector 509b, a bottom side of a glare light sensor 508b, a 1.8 V switchmode power supply 510b, a 3.3 V switchmode power supply 515b, a serial video connector 520b, electronic compass circuits 522b, a compass sensor 523b, an electrochromic (EC) element drive circuit 525b, a 12 V unregulated power supply 530b, a vehicle connector (blind mate) 540b, an Ethernet filter 545b, an Ethernet connector 550b and an ambient light sensor 570b.

With further reference to FIG. 5C, the front side 500c further comprises an Ethernet controller 581c, an EEPROM 582c, an ISSI DDR memory 583c, a LIN bus controller 584c, a CAN bus controller 585c, a microprocessor 586c for vehicle interface, an EEPROM 587c, an external camera power supply 588c, a 5 V power supply 589c, a deserializer 590c, and a top side 592c of the glare light sensor 508b. Once again, having electronic components associated with a common function located partially on both sides of the same printed circuit board, such as with the Ethernet circuitry, facilitates efficiency and reliability of the printed circuit board design. It should be understood that many of the individual electronic components are shared between circuits having different functions, such as, circuitry associated with control of an EC element and circuitry associated with control of an LCD. For example, in at least one embodiment, the same glare and/or ambient light sensor may be used to control both the EC element and the LCD contrast and/or backlighting.

Implementations of illuminating systems of an LCD-containing automotive mirror assemblies of the related art are recognized to have notable drawbacks. One of the problems requiring attention is removal of heat generated by such a light source. Depending on requirements to mirror configurations and exploitation conditions, a luminous intensity of light reaching the viewer 115 from light emitters through the mirror assembly is expected to be within an approximate range from about 750 to about 2,000 cd/m$^2$. One of related embodiments, for example, employed fifteen LEDs with power consumption on the order of about 20 W to provide a throughput luminance figure at the center of the LCD panel on the order of 2,000 cd/m$^2$. To effectuate a reasonable heat removal and dissipation in such an embodiment, a metal cladding is required on a circuit board in order to draw the heat from the LEDs. In another related embodiment, a light source 526 of FIG. 5A employed a matrix of eighty LEDs on a single circuit board created luminous intensity of about 3,500 cd/m$^2$ at a center of the LCD 150 but also consumes about 11 W of electrical power, a significant portion of which has to be dissipated.

At least one reason for driving the illuminating LEDs of related systems at high power levels is to overcome optical losses incurred upon propagation of light emitted by the LEDs through multiple optical components towards the viewer 115. The problem of light loss becomes particularly relevant in a mirror assembly containing an EC-element due to a high number of material interfaces. It has been estimated that, in order to deliver required luminous intensity to the viewer, a conventional light source system has to generate, at the output of the LED emitters, a several-fold the intensity delivered to the viewer. Therefore, a light source system providing illumination of an LCD in an automotive rearview assembly may significantly benefit from the reduction of luminous power at the output of an emitter. This can be achieved by a straightforward scaling a number of light emitters in a matrix of LEDs while driving these emitters at generally lower and different power levels to provide for both the reduction of luminous output of a given emitter and for a required dynamic range of the luminous intensity delivered to the viewer. Such "scaling" approach, however, suffers from another drawback. Specifically, an increase in the number of emitters leads to an increase in a footprint of the optical portion of the light source system and an overall increase in both a footprint and volume of electronics supporting the increased number of LEDs. Given stringent limitations on the area and volume reserved for the LCD-related opto-electronic system in a rearview mirror assembly, such scaling approach proves to be both unsatisfactory and costly.

The limitations on area and volume of the LCD-related opto-electronic system become particularly pronounced when a rearview assembly contains a prismatic actuator. Typical prismatic actuators can account for substantial volume within the mirror housing indeed because their construction must accommodate the use of lightweight plastics and application of relatively large torque to adjustment of the mirror due to glare. As a result, the volume inside the prismatic mirror housing which can be used to position the electronic device 140 that contains the LCD 150 is substantially limited.

In accordance with embodiments of the present invention, apparatus and methods are disclosed for a miniaturized light source that operates, in conjunction with a mirror system in a vehicular rearview mirror assembly, at a fraction of electrical power, generates smaller luminous intensity, occupies a fraction of volume, and has a reduced footprint as compared with conventional light sources used for the same purpose. The present invention recognizes that the use of light emitters that are configured to deliver light to a layered light-source structure in a non-transverse fashion allows for a realization of a light source assembly that utilizes a reduced number of printed circuit boards that carry electronic circuitry responsible for driving both the light source and the mirror system of the assembly. The present invention also recognizes that similar "non-transverse illumination" utilization of the light emitters also allows to configure the light-source assembly to unexpectedly occupy only a fraction of volume and have an unexpectedly reduced footprint as compared with light sources of related art systems used for the same purpose. In addition, the present invention also recognizes that the use of a reflective polarizer (RP) such as an APBF (for example, DBEF-Q by 3M, Inc.) as part of an embodiment of the light source of the rearview assembly provides a surprising advantage in that it allows to reduce the power requirements on the emitters and on heat dissipation balance of the overall system. In particular, the presence of a reflective polarizer that contains an anisotropic polymer layer allows for reduction of the number of light emitters in an embodiment of the present invention without a reduction in luminous intensity delivered to the driver from a display through the mirror system. Embodiments of the invention operate at a fraction of electrical power and emit smaller luminous power as compared with light sources of related art. Moreover, embodiments of light sources of the present invention may be mostly advantageously utilized in an assembly employing a mirror system that itself contains an RP such as an APBF.

Light Coupling Embodiments.

In one example, described with reference to FIG. 6A, an exemplary embodiment 600 of a light source of the invention provides a light output $L_{out}$ delivered through the mirror system (not shown) to the viewer 115. The embodiment is configured so as to accept light emitted, by light emitters, non-transversely with respect to the layered structure of the embodiment 600. As shown, at least one light emitter 612 or an array 614 of light emitters such as LEDs (that may be disposed on a separate support, e.g., a printed circuit board, PCB) emits light 616 primarily along the x-axis towards an edge 618 of and generally in the direction of a lightguide 620 that has an extent. The lightguide 620 may be a slab lightguide and is extended in a first direction that, in FIG. 6A, coincides with the x-axis. Generally, the lightguide 620 is structured so as to allow for outcoupling, along the length of the lightguide, of channeled light 622 towards the LCD 150 through a light-guiding surface 624 that faces the LCD 150. In a specific embodiment, however, the lightguide 620 may be configured in such a fashion as to provide for a non-uniform (in terms of power per unit length) outcoupling of the channeled light 622 through a light-guiding surface 624. In other words, in a specific embodiments the rate of light outcoupling or the amount of light power outcoupled from the lightguide per unit length depends on a position along the extent of the lightguide. Various means of non-uniform outcoupling (spatially variable rate of outcoupling) of light from a lightguide along the direction of propagation of light through the lightguide are well known in the art. For example, the outcoupling surface 624 of the lightguide 620 may be configured to contain a diffraction structure spatially chirped in the direction of light propagation. Alternatively, the outcoupling surface 624 may contain microlenslets disposed along the surface with appropriate density. Another known solution may be a lightguide having a thickness that is spatially tailored to provide for required light-outcoupling profile. Example of a lightguide that may be utilized in embodiments of the invention are lightguides manufactured by Global Lighting Technologies, Inc., Cleveland, Ohio, USA. It is understood that a particular way of outcoupling of guided light 622 through the surface 624 of the lightguide 620 does not change the principle of operation of the present invention. A portion 630 of light transferred through a lightguide surface 632 that opposes the surface 624 is reflected back, generally in the direction of the LCD 150 or along the z-axis, by a reflector 636. The reflector 636 may be a metallic reflector, an Enhanced Specular Reflector™ (ESR), or any other appropriate reflector preferably having a reflectivity preferably in excess of 80 percent. A combination of the elements 614, 620, and 630 of FIG. 6A may be herein collectively referred to as light engine 638.

In further reference to FIG. 6A, the light 640, including light outcoupled from the lightguide 620 through the outcoupling surface 624 and light 630 that has traversed a body of the lightguide 620, emanates from the light engine 638 and further propagates generally along z-axis towards the display 150. An optional diffuser 642 may be disposed adjacent to the lightguide 620 so as to intersect light 640 upon its propagation. The diffuser 642 spatially redistributes the light 640 upon its propagation through the diffuser 642 so as to make the distribution of light at the surface 644 of the diffuser 642 more homogenized or uniform. In one embodiment, the diffuser 642 may be an optical slab having two opposing surfaces 642 and 644, the surface 642 facing the lightguide 620. In a specific embodiment, the optical diffuser 642 may be configured as an optical film.

Although the diffuser 642 may increase the uniformity of irradiance of light propagating towards the LCD 150, the diffuser does not necessarily affect the intensity of light in a fashion that is most beneficial to the user 115 observing the LCD 150 through a mirror element or system. Specifically, the brightness of the display 150 perceived by the viewer 115 depends on the spatial angle subtended by light that illuminates the display and propagates through it towards the viewer. To reduce this spatial angle, an appropriate auxiliary optical component or components may be used that increase the intensity of light illuminating the LCD by redistributing this light within a smaller solid angle. As shown in FIG. 6A, for example, two planar components 650 and 652 such as brightness enhancement films (BEFs) may be disposed between the diffuser and the LCD 150 to increase the perceived brightness of the LCD 150. In one embodiment, BEFs 650 and 652 may be conventional diffractive components including microreplicated prismatic structure such as Vikuiti™ T-BEF to control an exit angle of the light. For example, BEFs 650 and 652 may complement each other's control of an angle of light exit towards the LCD by reducing this angle in two orthogonal planes. In one embodiment, BEF 650 may increase the intensity of light, that has traversed the BEF 650, in the yz-plane, for example, while the BEF 652 may increase the intensity of light in the xz-plane.

Figure 6B:
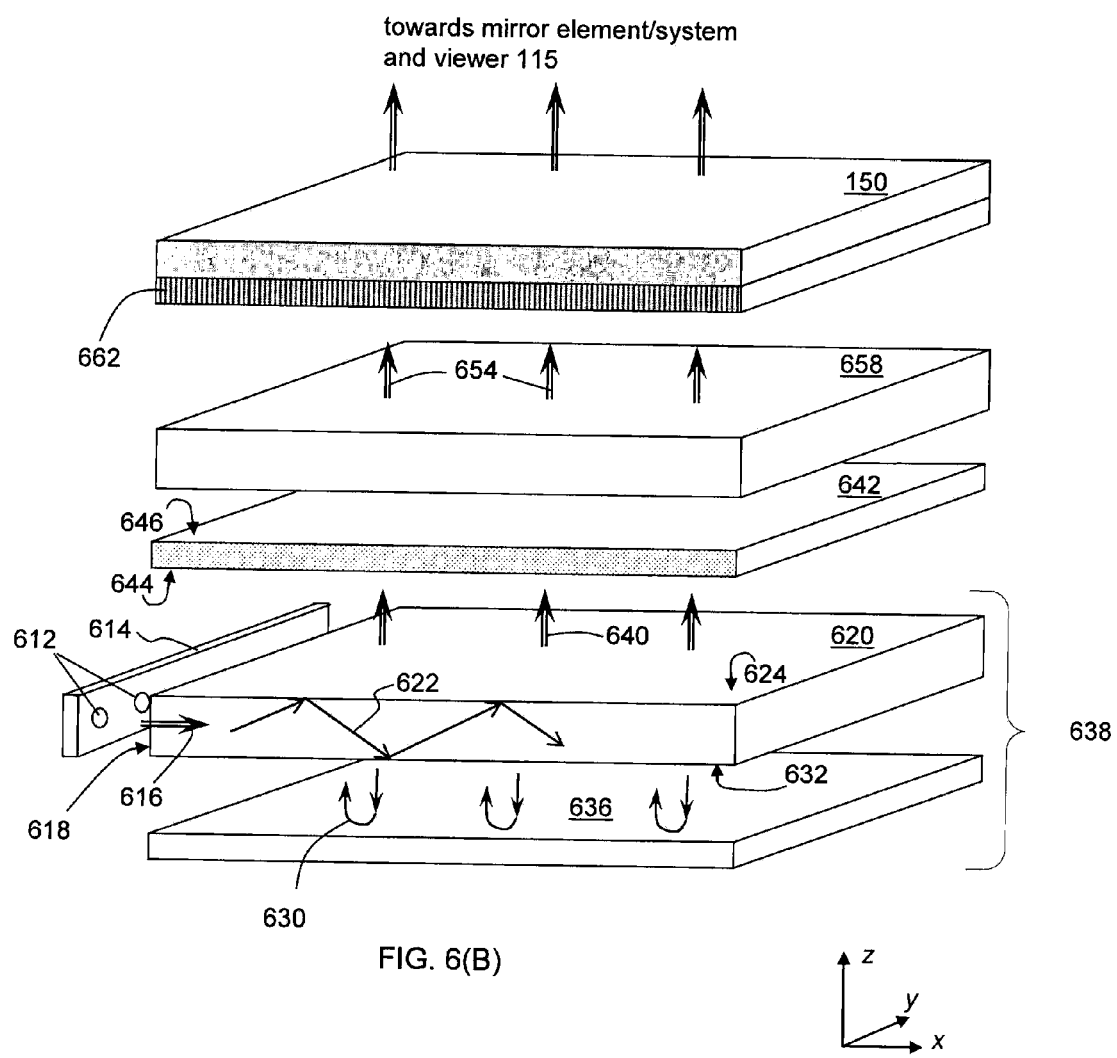
FIG. 6B: an embodiment containing a diffuser and a two-dimensional apodizer.

In a related embodiment shown in FIG. 6B, a single diffractive component 658 may be used instead of the two components 650 and 652 for the same purpose of increasing the intensity of light propagating towards the LCD 150. It will be understood that in this case the light-redistributing diffractive structure of the component 658 may posses, for example, rotational symmetry defined with respect to the axis of light propagation (that corresponds to the z-axis). Furthermore, as shown in FIG. 6C, the light-diffusing and intensity-increasing functions performed respectively by the diffuser 642 and the BEFs 650 and 652 of FIGS. 6A and 6B may be performed by a single diffusing element 660 having a micro-structured surface configured to both homogenize the irradiance and increase the intensity of the light passing through.

Figure 6C:
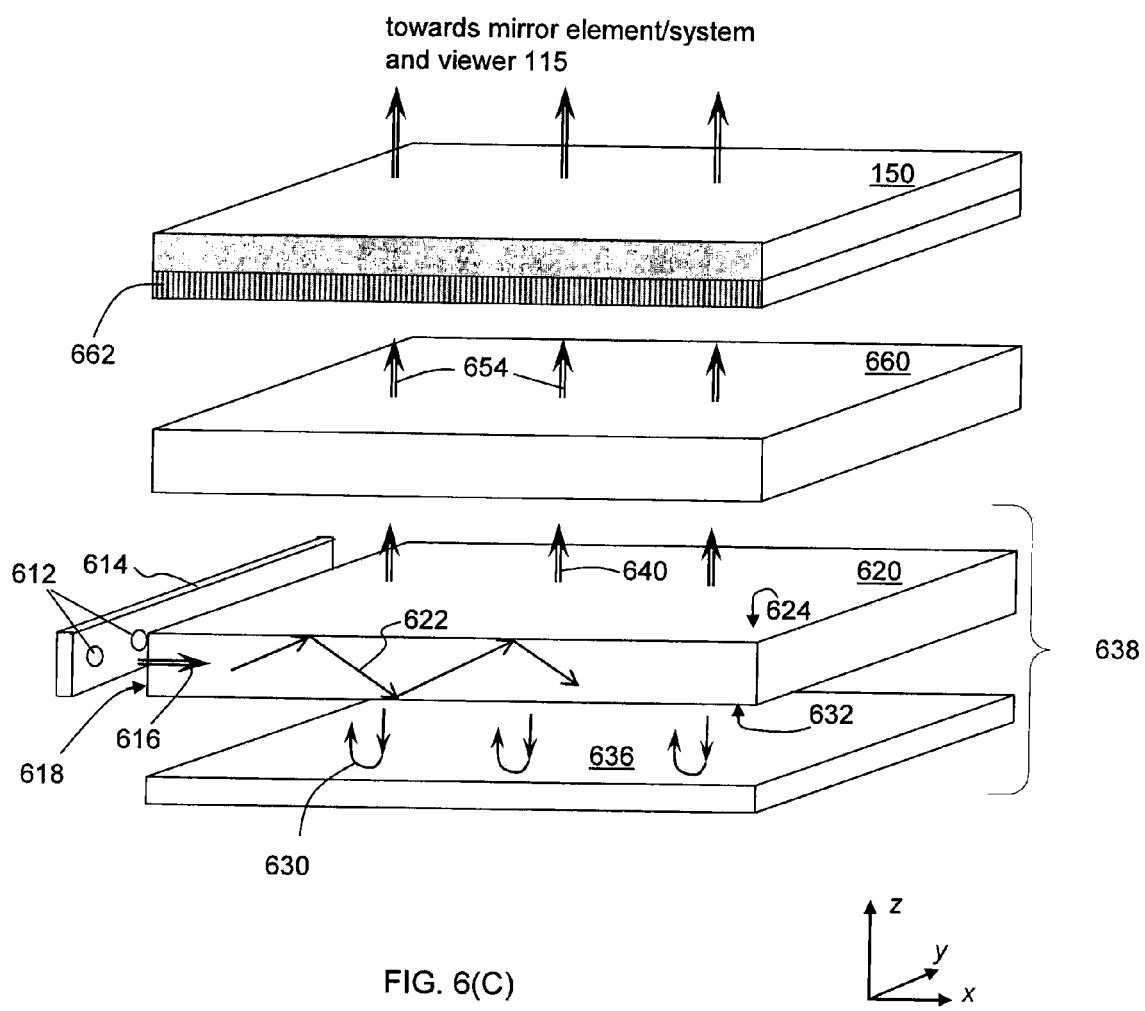
FIG. 6C: an embodiment containing a single component functioning as both an apodizer and a diffuser.

In further reference to FIGS. 6A through 6C, embodiments of the present invention also advantageously facilitate the reduction of radiant power, per unit of luminous power perceived by the viewer 115 through the light source and the mirror system, that the emitters 612 are expected to generate in order to produce a light throughput, towards the front of the rearview assembly, that is similar to that of the related art. Such reduction is achieved by utilizing an RP 662, that transmits light having a first polarization and reflects light having a second polarization that is orthogonal to the first polarization, as part of an embodiment of the light source. The RP 662 may be placed, for example, between the emitters 612 and the LCD 150 in such a fashion as to align polarization of light transmitted from the light emitters through the RP 662 with a direction required for optimal operation of the LCD 150. For example, in a conventional configuration where the liquid crystal (LC) panel or layer of the LCD 150 is sandwiched between the entrance and exit linear polarizers (not shown) of the LCD, the transmission axis of the RP 662 may be appropriately oriented, in xy-plane, to allow for transmission of a portion of light 654 that impinges upon the RP and that is polarized along the transmission axis of the entrance polarizer of the LCD 150. In this case the RP 662 will reflect a portion of light 654 that has a polarization orthogonal to the transmission axis of the LCD. Although the RP 662 is shown in FIGS. 6A through 6C to be affixed (for example, laminated) to the LCD 150, it will be understood that the use of the RP 662 as a stand-alone component does not change the principle of operation of the present invention.

It is appreciated that the appearance of the LCD 150 may be enhanced by extinguishing more light in certain regions of the LCD 150 when switching between driver assist warnings (which may use a portion of the display) and a back-up video (which uses the whole display.) Such operation would allow embodiments of a light source of the present invention to match a multi-zone capability of the displays described, for example, in a commonly assigned U.S. patent application Ser. No. 12/367,143 filed on Feb. 6, 2009, the entire disclosure of which is incorporated herein by reference. To implement such feature, various commercially available technologies for LCDs such as in-plane switching (IPS), vertically aligned (VA) twisted nematic, optically compensated bend (OCB), and the like may be used. In one preferred embodiment, for example, an LCD that employs the Horizontal Electric-field Advanced Display (HEAD) technology, an optimized IPS technology, as is commercially available from Toshiba Mobile Displays Technology Co., Ltd., has been shown to extinguish 99.90% of incoming light in non-selected regions with minimal color shift over angle thus enhancing the appearance of LCD 150 to the viewer 115.

It is also appreciated that the appearance of the LCD may be enhanced further by adding an auto stereoscopic or 3D effect. For example, in reference to FIGS. 6 (A-C), two emitter arrays may be placed on opposite sides of lightguide 620 and operated out-of-phase with one another in a pulsed mode (such as, for example, 60 Hz of alternative phase) resulting in a 120 Hz pulsed emission of light into the lightguide from the opposite ends. A light-directing film such as the Vikuiti 3D Display Film, commercially available from 3M, Inc. may be placed over the lightguide to re-direct the outcoupled light in the generally towards the LCD 150 at an angle that would depend on which side of the lightguide (or, from which emitter array) the channeled light came from. For example, when outcoupled light has been generated by the emitter on the left side of the lightguide, it may be outcoupled at a positive angle, and when the coupled light has been generated by the emitter on the right side of the waveguide, it may be outcoupled at a negative angle. (A sign of an outcoupling angle may be viewed with respect to a line perpendicular to the outcoupling surface of the lightguide.) The LCD used in such an embodiment may employ optically compensated bend (OCB) technology, as is commercially available from Toshiba Mobile Displays Technology Co., Ltd., with a response time of less than 5 ms. In addition, display electronics of the electronic device 140 may be configured to drive the LCD 150 as time-phased and spatially adjusted for 3D viewing. In this configuration, with A being equal to approximately 5° and A' being equal to approximately −5°, the viewer has been shown to perceive a 3D image without the use of specialized glasses or goggles.

In further reference to FIGS. 6A through 6C, a mirror element or a mirror system (not shown) towards which the light is delivered from the LCD 150 may be configured in various ways to achieve the goals of the present invention. For example, the mirror element may be a non-dimming prism mirror element or an EC-mirror element such as those described in reference to FIGS. 4 and 8 of the commonly assigned U.S. patent application Ser. No. 12/496,620. FIG. 9, as discussed below, schematically illustrates exemplary embodiments of non-dimming tilt prism-mirror structures that utilize anisotropic polymer-based films to form mirror systems that are substantially free of extended distortions.

Figure 7A:
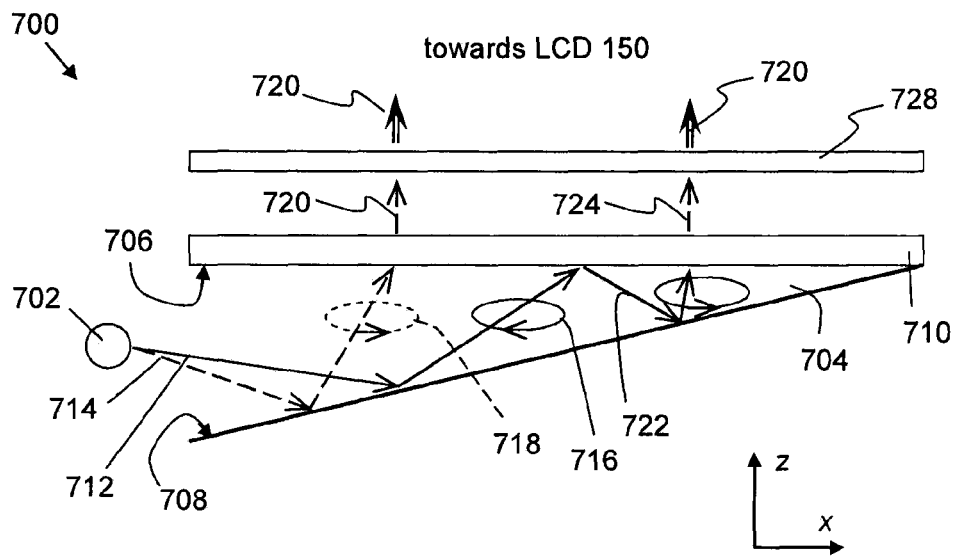
FIG. 7A: a air-filled lightguide utilizing a cholesteric reflector.

An alternative embodiment of a light source of the invention is now discussed that may include a light-engine portion 700 schematically shown in side view of FIG. 7A. Although the operation of the portion 700 is described with reference to circularly polarized light, it shall be understood that the consideration of elliptically polarized light does not change the principle of operation of the invention and is also contemplated. The idea behind the embodiment 700, which delivers linearly polarized illuminating light to the LCD 150, stems from realization that (i) circularly polarized light exhibits chirality and that (ii) the handedness of such light changes upon reflection from metal. As shown, light emitted by an emitter 702 is coupled side-ways (non-transversely with respect to a layered light-source structure comprising a layer of cholesteric reflector, a layer of retarder, and an LCD panel as described below) into a wedge-shaped lightguide 704 formed by two reflecting surfaces 706 and 708. The surface 706 is a surface of a cholesteric reflector 710, while the surface 708 is a metallic surface. Generally, a cholesteric reflector is a partial reflector that operates by reflecting light of one type of the circular polarization and transmitting light of the orthogonal circular polarization. In the following description, the cholesteric polarizer is assumed to transmit left-handed circular polarization and reflect right-handed circular polarization. However, it will be understood that a cholesteric polarizer operating differently does not change the principle of operation of the invention and is also contemplated. The cholesteric reflector 710 may contain a reflective layer of cholesteric crystal known in the art.

In FIGS. 7(A, B), light emitted by the emitter 702 is represented by two light components 712 and 714 that have orthogonal circular polarizations. A portion of light 712 having left-handed circular polarization when emitted is shown in a dashed line, while a portion of light 714 having right-handed circular polarization when emitted is shown in a solid line. Upon the first reflection from the metallic surface 708, both portions of light 712 and 714 change the handedness of their respective polarizations. Specifically, light 712 changes its polarization to a right-handed circular polarization, as shown by a circular arrow 716 while light 714 changes its polarization to a left-handed polarization, as shown by a circular arrow 718. It will be understood that the change of handedness of generally circular polarization of each of the components of light emitted by the emitter 702 will occur upon every reflection of a given component from the metallic surface 708.

In the examples of FIGS. 7(A, B), the cholesteric reflector 710 transmits the portion of emitted light having, upon the reflection from the metallic surface 708, the left-handed polarization 718. The transmission of light by the reflector 710 occurs in a general direction towards the LCD 150, as shown by an arrow 720. At the same time, the portion of emitted light having, upon the reflection from the metallic surface 708, the right-handed polarization 716 will be reflected by the cholesteric reflector 710 back towards the metallic surface 708, as generally shown by arrows 722. A portion of light 722 will be transmitted by the cholesteric reflector 710 after being reflected from the metallic surface 708 once more, as shown by an arrow 724. The throughput of the cholesteric polarizer (i.e., light 720 and 724), therefore, has a left-handed circular polarization. Although it is possible to use light 720, 724 as light directly illuminating the LCD panel 150 (not shown in FIG. 7(A,B)), the efficiency of illumination may be further improved if the circularly polarized light 720, 724 is converted into linearly polarized light 726. Such conversion can be achieved, for example, by transmitting the light throughput of the cholesteric reflector 710 through a quarter-wave optical retarder 728 positioned to intercept the light on its way to the LCD panel 150.

Figure 7B:
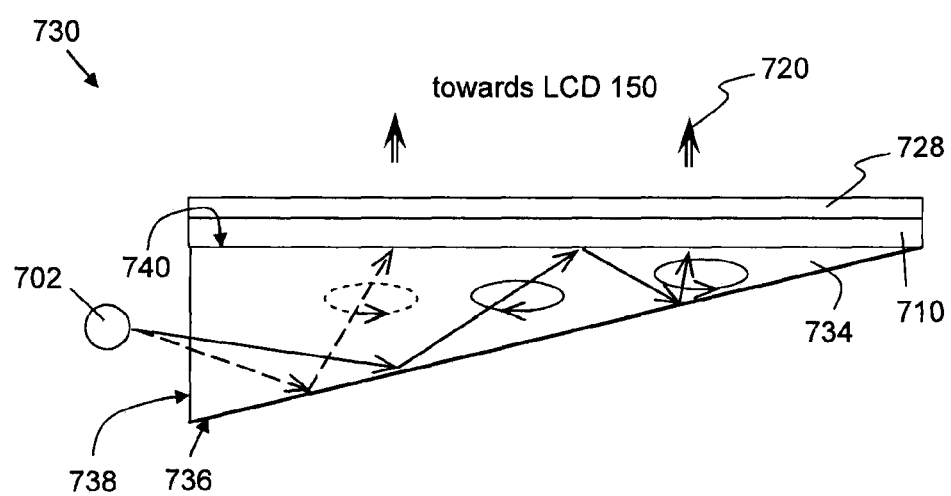
FIG. 7B: a solid lightguide utilizing a cholesteric reflector.

In reference to FIG. 7A, the retarder 728 is spaced apart from the cholesteric reflector 710 and the lightguide 704 is air-filled. It is understood that the embodiment 700 may be appropriately modified without changing the principle of operation of the embodiment. For example, as shown in FIG. 7B, the lightguide of a light-engine portion 730 may employ by a wedge-shaped dielectric 734 one light-guiding surface of which is metalized to form a metallic reflector 736. The light emitted by the emitter 702 is coupled into the lightguide through the edge facet 738. Although a cholesteric reflector 710 is shown to be in contact with a second light-guiding surface 740 of the lightguide 734, it will be understood that, generally, the reflector 710 may be spaced apart from the lightguide 734. Similarly, in comparison with FIG. 7A, the quarter-wave retarder 728 of FIG. 7B is shown to be abutting the reflector 710, although generally the retarder 728 and the reflector 710 may be spaced apart. In related embodiment, an array of emitters containing more than one emitter 702 may be used. Another related embodiment may utilize a slab light-guide (as compared with a wedge-shaped lightguide of FIGS. 7(A, B)) that has a metalized light-guiding surface and an outcoupling surface through which the outcoupled light is delivered to the cholesteric polarizer in a fashion similar to that described in reference to FIGS. 7(A, B).

Figure 7C:
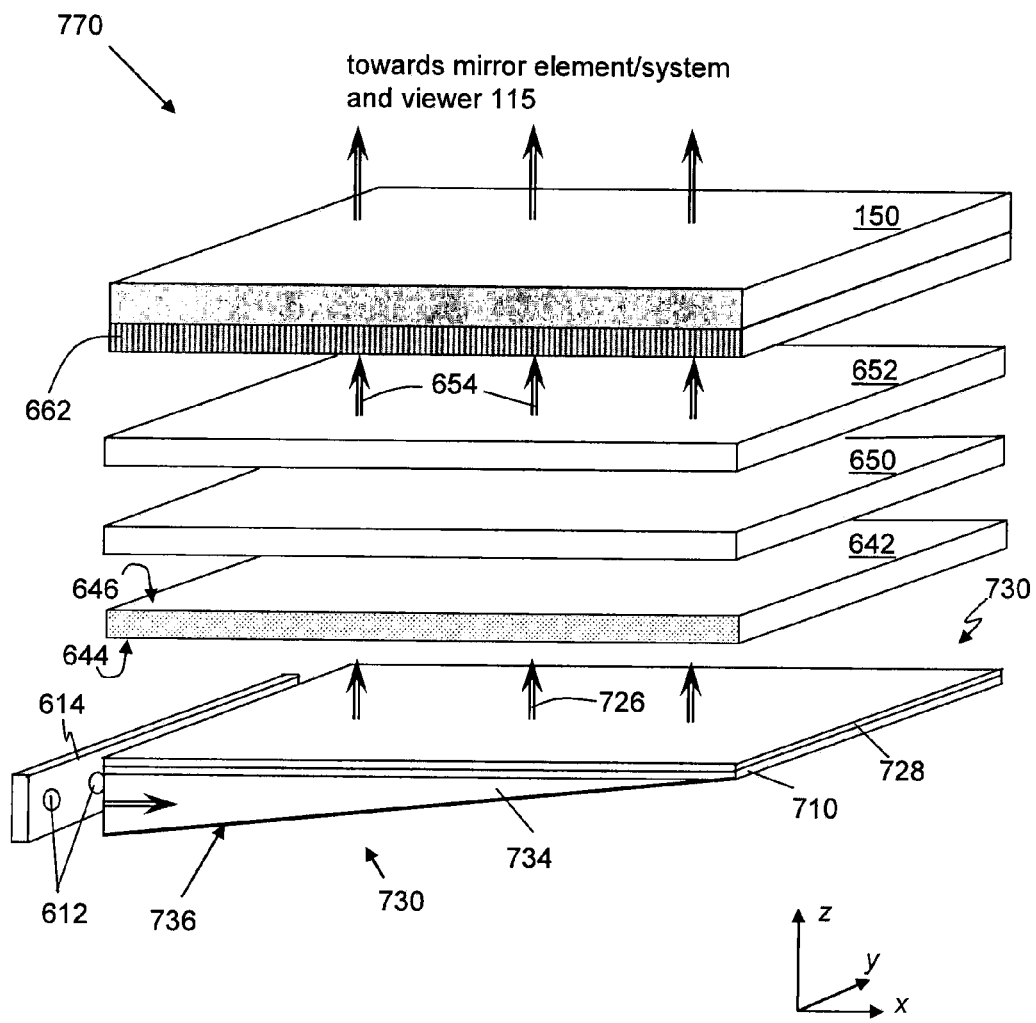
FIG. 7C: an exploded view of a light source utilizing the embodiment of FIG. 7B.

FIG. 7C schematically illustrates an embodiment 770 of a light source of the invention that is configured similarly to the embodiment of FIG. 6A but employs the light-engine portion 730 of FIG. 7B. As shown, the metalized surface 736 of the lightguide 734 performs a function of the reflector 636 of embodiments described in reference to FIGS. 6A through 6C. It shall be realized that, in the embodiment of FIG. 7C, the RP 662 is generally optional depending on a degree to which the linearly polarized light 726 is depolarized upon traversing the elements 642, 650, and 652 upon its propagation towards the LCD 150.

Exemplary Embodiments of Electronic Circuitry.

Figure 8A:
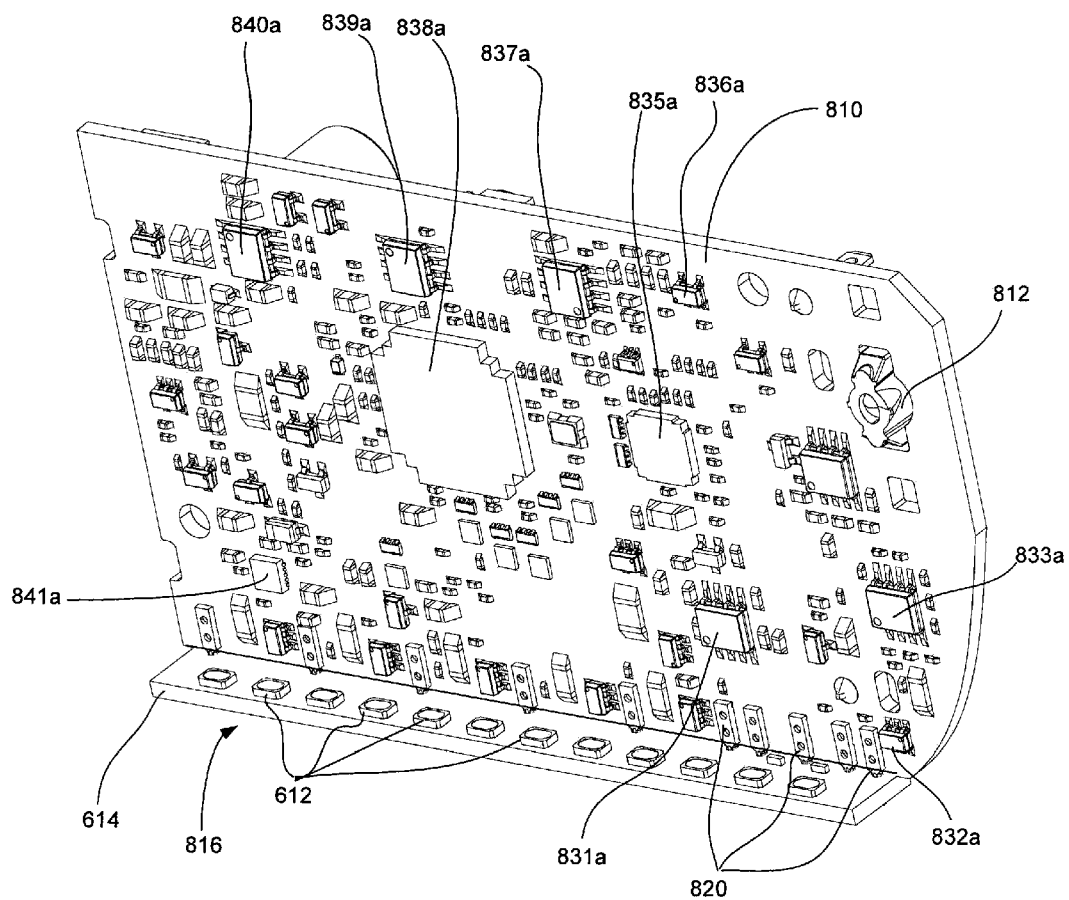
FIG. 8A: a front perspective view of operationally connected printed circuit boards with major electronic components and light emitters.

It is understood that optical components discussed with reference to FIGS. 6 and 7 operate in conjunction with electronic circuitry. In that respect, FIG. 8A schematically illustrates examples of printed circuits boards (PCB) that may be used with embodiments of the present invention. As shown, a PCB 810 serves as a platform for various electronic components including various sensors such as a glare light sensor 812 and the electronics driving the array of LEDs 614 located on a separate LED PCB 816 that is operationally connected to the electronic PCB 810. The operational connection between the electronic PCB 810 and the LED PCB 816 includes both a mechanical connection and the electrical connection provided through surface-mount compliant pins 820. The use of the pins 820 in the present invention allows to avoid problems arising in conventional solutions of connecting separate electronic-holding supporting structures through flexible cables and wires. Typical compliant pin assembly requires that the pins be pressed into the one PCB and then pressed into the joining PCB. In embodiments of the present invention, the pins are placed using standard surface-mounted PCB assembly equipment into one PCB and then pressed into the joining PCB, thus eliminating one pressing operation. One type of surface-mounted compliant pins is commercially available from Interplex Industries, Inc. Generally, compliant pins provide advantages over board to board connections, ribbon cable connections and board-to-wire-to-board connections as they take up less space, have increased reliability and are cost-efficient.

Figure 8B:
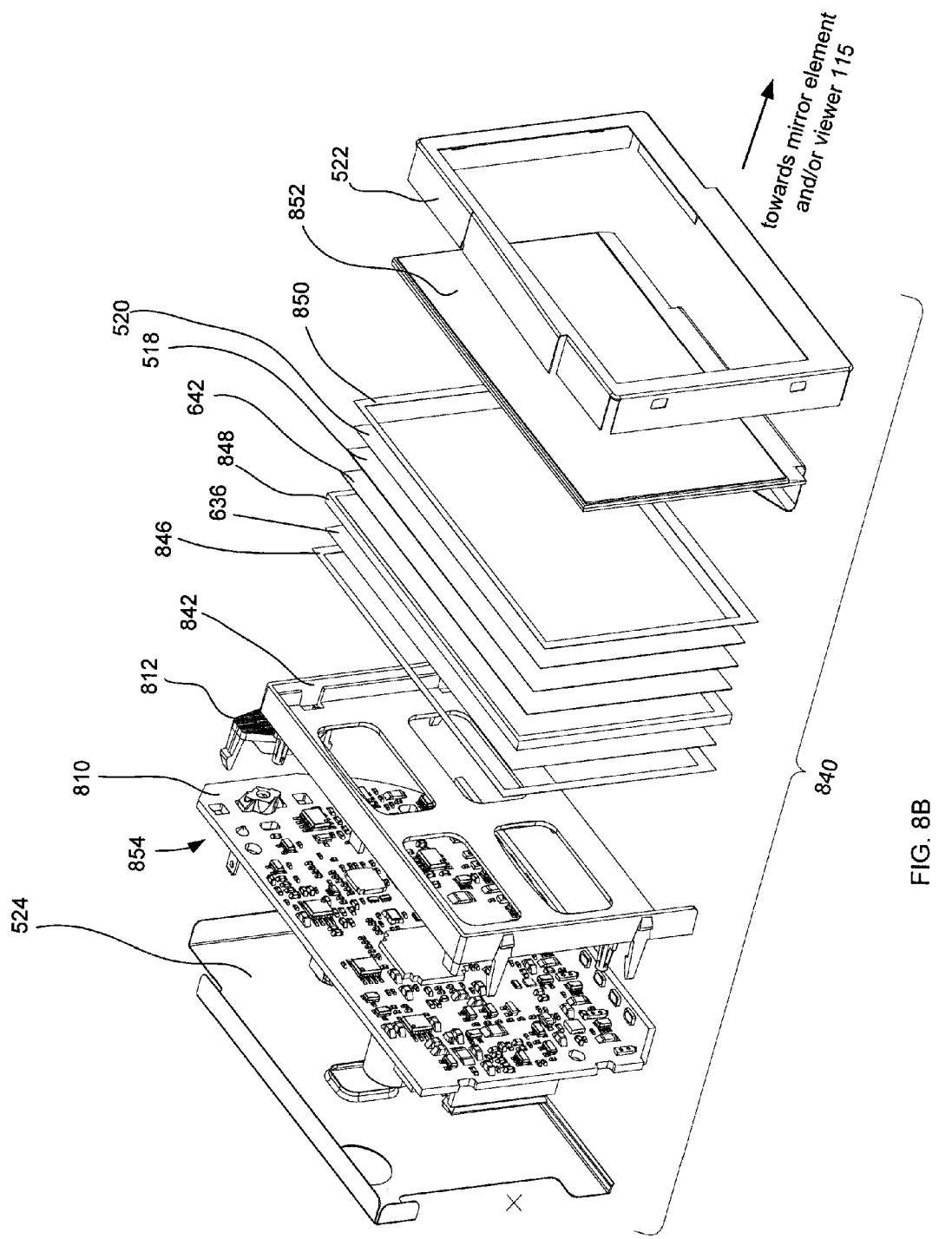
FIG. 8B: an exploded front perspective view of an embodiment of an electronic device of the invention including the embodiments of FIGS. 6A and 8A.
Figure 8C:
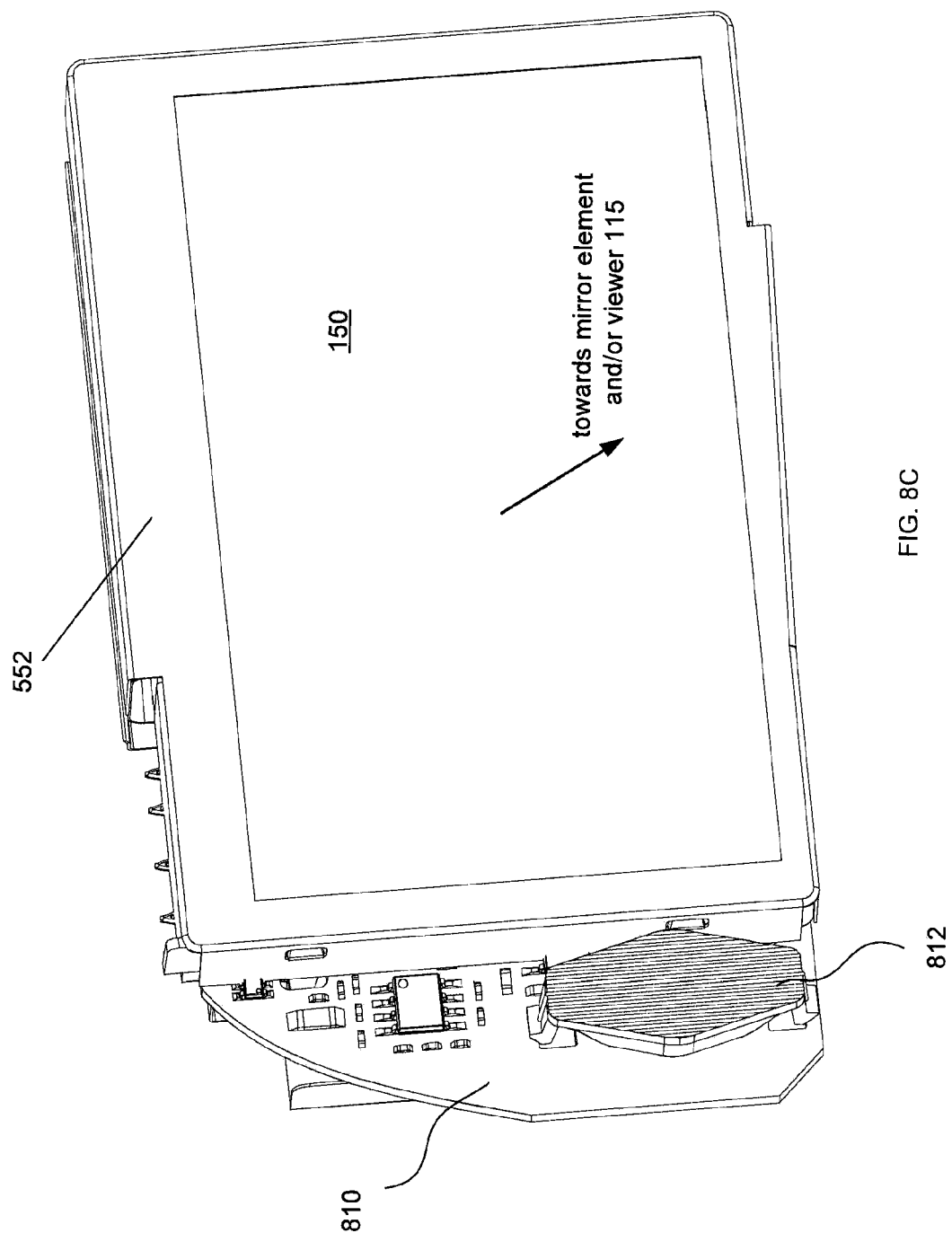
FIG. 8C: a top perspective view of the assembled embodiment of FIG. 8B.
Figure 8D:
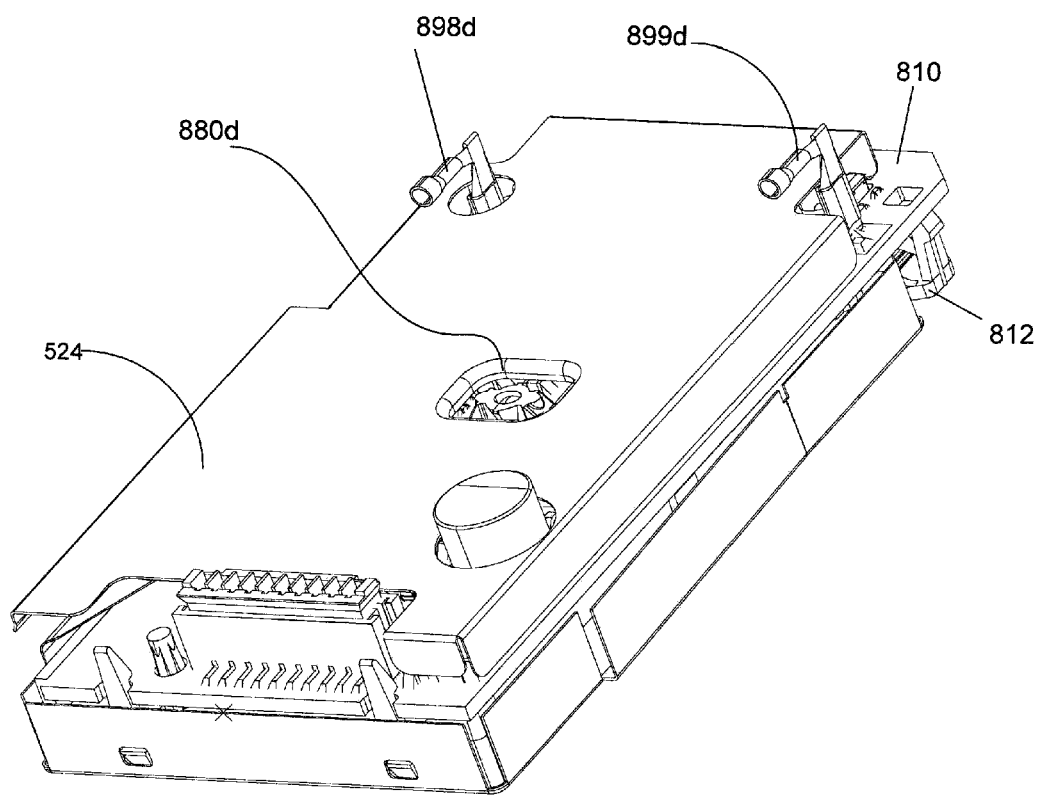
FIG. 8D: a bottom perspective view of the assembled embodiment of FIG. 8B.
Figure 8E:
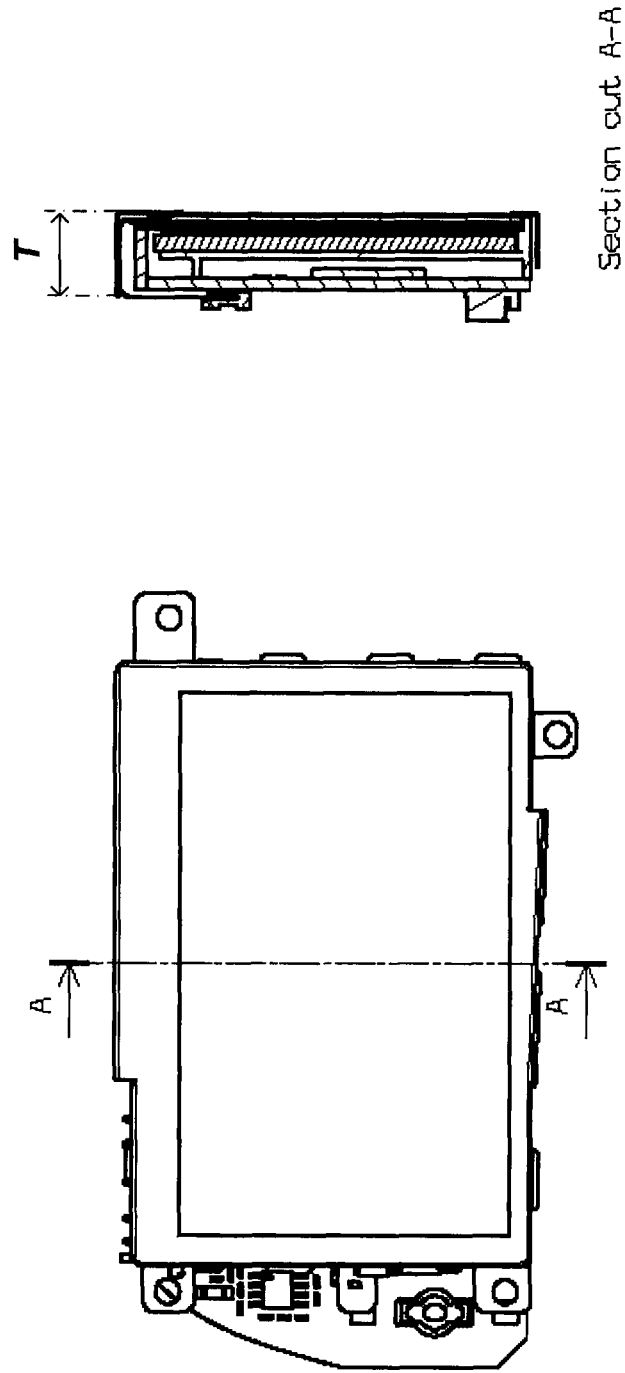
FIG. 8E: front and side views of the assembled embodiment of FIG. 8B.
Figure 8G:
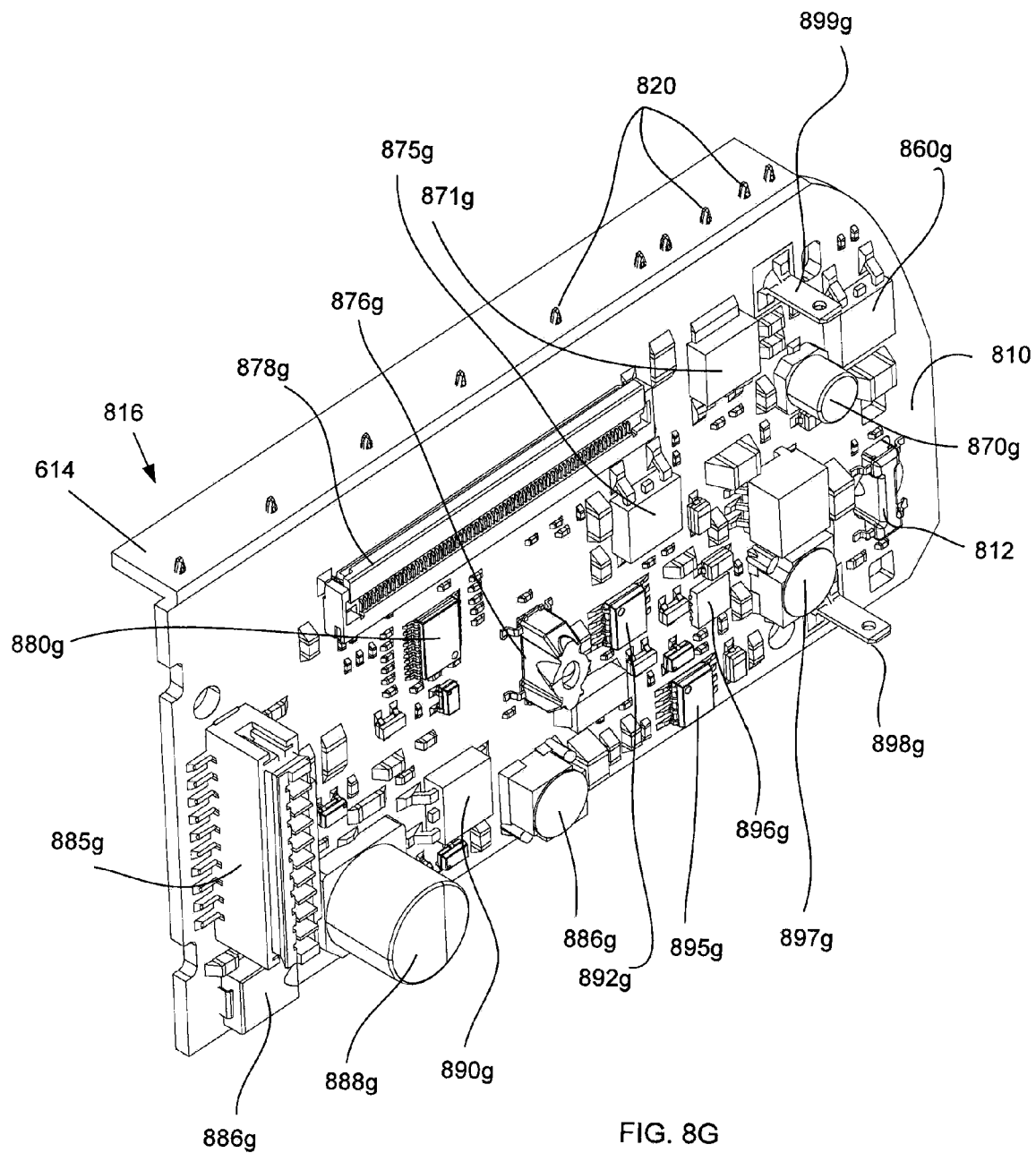
FIG. 8G: a back perspective view of operationally connected printed circuit boards with major electronic components and light emitters of FIG. 8A.

With further reference to FIG. 8A and with reference additionally to FIG. 8G opposite sides of the PCBs 810 and 816 are depicted. The PCB 810 further comprises an LED drive AMP 831*a*, LED current sources 832*a*, an EC drive AMP 833*a*, a fail-safe temperature backup 834*a*, PIC microprocessor 835*a*, a CPU reset 836*a*, an LCD controller 838*a*, flash memory 839*a*, a VCOM driver 840*a*, and a camera power supply 841*a*.

The second sides of each PCB depicted in FIG. 8G shows pins 820 fixed to the PCB 810 that have protruded through corresponding holes in the PCB 816. The second side of the PCB 810 further comprises an EC-element drive circuitry 860*g*, 861*g*, 870*g*; a 3.3 V power supply 871*g*; a 1.8 V power supply 875*g*; an ambient light sensor 876*g*; an LCD connector 878*g*; an LCD driver 880*g*; a main connector 885*g*; an input protection diode 886*g*; a 12 V regulated circuitry 888*g*, 889*g*, 890*g*; a 5 V EC-drive power supply circuitry 891*g*, 892*g*, 893*g*, 895*g*; an LED switchmode power supply circuitry 894*g*, 896*g*, 897*g*; and EC-element electrical connectors 898*g*, 899*g*.

As can be appreciated when viewing the printed circuit boards depicted in FIGS. 5A and 5B along with those of FIGS. 8A and 8G, the area of a circuit board associated with the backlight LEDs of FIGS. 5A and 5B is not required with the edge lit LEDs of FIGS. 8A and 8G. Therefore, the LCD/electronics modules associated with the circuit boards of FIGS. 8A and 8G will fit within an associated rearview assembly housing on either side of an associated mounting mechanism; this concept is fully appreciated when viewing the prism version embodiments described herein. The circuit board of FIGS. 5A and 5B conflicts with the space required for the toggle mechanism of a prism rearview assembly. It should be understood that any of the circuitry depicted on either board may be included on the other. Additionally, it should be understood that with respect to a prism embodiment of a rearview assembly does not require EC element drive circuitry. Therefore, the EC circuitry may be omitted in at least one embodiment of the present invention. In at least one embodiment, at least a portion of the circuitry utilized for EC element control is retained and utilized for control of an associated LCD illumination control.

A more detailed embodiment 840 of the electronic device 140 of the rearview mirror assembly of the present invention is illustrates in exploded view in FIGS. 8B and 8F. The embodiment 840 includes the electronic PCB 810, operationally connected with the LED PCB 816 in such a way as to have the PCBs 810 and 816 extend along diverging planes. As shown, the PCBs 810 and 816 are oriented so have the emitters 612, positioned on the surface of the LED PCB 816, generally emit light along parallel axes that define a light-emitting plane (not shown) parallel to the plane of the PCB 810 (that corresponds to the xy-plane of FIG. 8B). The housing frame 842, which can be made of plastic, is affixed to the PCB 810 (e.g., by snapping tooth-connectors of the frame into corresponding notches of the PCB 810) in such a fashion as to provide for a niche that cradles a stack 844 of sequentially disposed optical components. As shown in FIG. 8(B), the stack 844 contains a bottom mask 846, the reflector 636, a lightguide 848, the diffuser 642, the BEFs 518 and 520, an the top mask 850 and is situated into the niche defined by side-walls of the housing 842. The frame 842 is appropriately dimensioned so as to provide for positioning of the lightguide 848 in the light-emitting plane when the embodiment 840 is fully assembled. In particular, in a fully assembled state, the stack 844 may be configured to have the lightguide 848 oriented, with respect to the array of the LEDs 612, in such a fashion as to allow for coupling of at least a portion of light emitted by the LEDs 612 into the lightguide 848. As shown in FIG. 8(B), the light emitted by the LEDs 612 is coupled into the lightguide along the x-axis that coincides with one of the extensional of the lightguide 848. In this configuration, as seen in the yz-plane, the plane of the reflector 636 lies below the light-emitting plane and the plane of the optical diffuser 642 lies above the light-emitting plane.

In one embodiment, the coupling of light may be accomplished by butt-coupling as known in the art, i.e. directly, without the use of additional optics and through an appropriate gap between the LEDs 612 and the edge 618 (not shown in FIG. 8B) of the lightguide 848. In another embodiment, an end of lightguide 848 that is proximal to the emitters 612 may contain an optical taper. Coupling of light from the emitters 612 to the lightguide 848 through a coupling optics is also contemplated by the invention. A specific implementation of the lightguide 848 may generally differ. For example, the lightguide 848 may be configured as a slab lightguide 620 having appropriate outcoupling lightguiding surface 624, discussed in reference to FIGS. 6(A-C). Alternatively, the lightguide 848 may be a wedge-shaped lightguide where the outcoupling of light towards the LCD 150 is provided through a cholesteric reflector 710, as discussed in reference to FIGS. 7(A-C). During the assembly of the embodiment 840, the LCD 150 is further disposed on top of the stack 844. As shown, the LCD 150 may employ a flexible cable 850 that establishes an electrical communication between the LCD 150 and a rear surface 854 of the PCB 810. An LCD-containing assembly is further encased between the front and rear shield 522, 524 to at least reduce and preferably prevent the leakage of any RF radiation emitted by the LCD 150.

Perspective views of the fully assembled embodiment 840 are depicted in FIGS. 8(C, D). FIG. 8C illustrates a front perspective view of the embodiment 840, while FIG. 8D illustrates a back perspective view of the embodiment. FIGS. 8(A-D) are simplified in that embodiments of a mirror element or system of the invention, housing, and auxiliary components of the invention that are of little consequence to the above discussion are omitted from these Figures.

As shown in FIGS. 8(C, D), a foot-print of the electronic PCB 810 of the embodiment of the present invention is substantially reduced as compared with a foot-print of the PCB 502 of the related implementation 500. In a specific embodiment of the invention, the PCB 810 and the LCD 150 are appropriately dimensioned so as to have their corresponding foot-prints differ by less than about 50%, preferably less than about 30% For example, as shown in FIGS. 8(C,D), a small portion of the PCB 820 may extend outside of the boundaries of a foot-print of the LCD 150 to support the glare sensor 812 in order to keep the glare-sensor unobstructed by the PCB 820. In comparison among the parameters of functional PCBs of related light-source systems with that of an embodiment of the present invention, generally configured as shown in FIG. 8(A, E), it can be seen that in a configuration where light is emitted in a direction non-collinear with that towards the display both the foot-print of the electronic PCB (such as PCB 812) and the overall thickness T of an embodiment of the light source assembly are significantly reduced. In one embodiment of the present invention, the usable area per side of the electronic PCB 820 is about 4,650 mm$^2$ and the area of the used side of the LED PCB 816 is about 620 mm$^2$, with the total usable area of the PCBs of about 9,900 mm$^2$.

Auxiliary Light-Coupling Embodiments.

Figure 16:
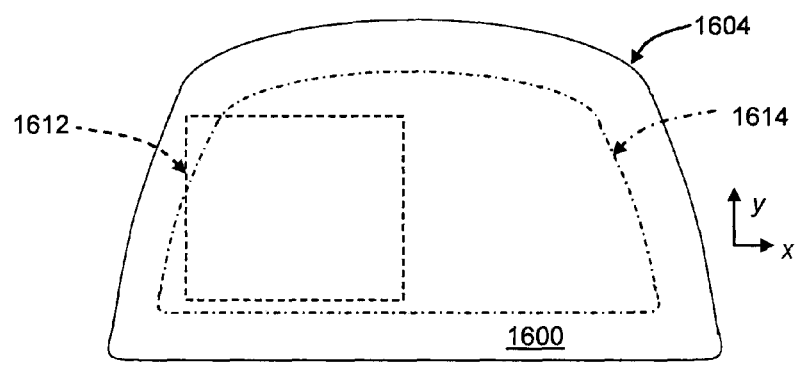
FIG. 16 shows an embodiment with a non-rectangularly shaped perimeter.

Embodiments of a generally "layered" light-source structure utilizing light emitters that are non-transversely configured with respect to the layers of the light-source structure, as discussed above in reference to FIGS. 6 and 7, may be appropriately modified to address additional requirements arising in automotive industry. One such requirement is caused by the fact that a display panel may be required to be shaped generally non-rectangularly in order to better geometrically conform to the edge boundary of the mirror element of the assembly. This configuration may arise, for example, when it is desired to have a display panel to be enlarged and extended in order to cover as much of the field-of-view (FOV) of the mirror element of the assembly as possible. Such situation is schematically illustrated in FIG. 16, where the embodiment 1600 of the rearview assembly is shown in front view, with an arbitrarily non-rectangularly shaped perimeter 1604. Here, the rectangular boundary 1610 of a conventional display panel that would be positioned behind the front surface 1612 of the embodiment is shown together with a boundary 1614 of the desired extended and enlarged display panel. In order to properly and uniformly illuminate such a complex-shaped display panel, the corresponding lightguide (e.g., 620 of FIG. 6(A-C) or 734 of FIG. 7B) should be similarly transversely extended and will have, therefore, a curved, non-straight, coupling edge surface (such as the surface 618 of FIG. 6(A-C) or 738 of FIG. 7B). The geometric mismatch between such a curved coupling edge surface of the lightguide and the linear or plane-like array (for example, 614 or 702) of light emitters would cause significant reduction in efficiency of light coupling from the emitters to the lightguide. While "bending" the array of light emitters along a curve similar to that of the coupling edge may address the problem to some extent, such bending is not technologically preferred for it is associated with increased complexity of fabrication of the PCBs, microalignment and encapsulation of optoelectronic components and the like.

Figure 17A:
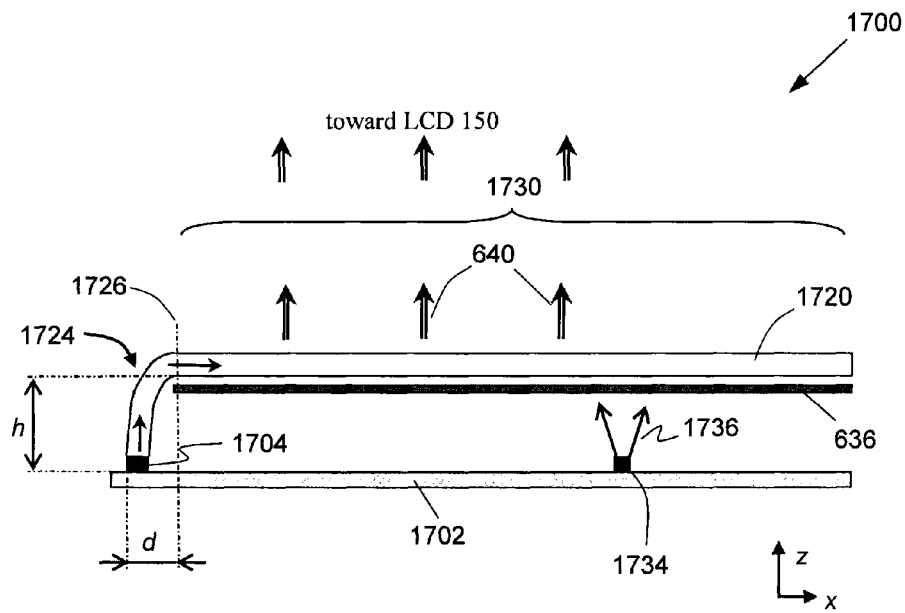
FIGS. 17(A, B) show light-coupling configurations for use with a display panel of a rearview assembly.

One embodiment illustrating a light-coupling configuration for use with a complex-shaped display panel of the rearview assembly is shown in FIG. 17A. In comparison with FIG. 6A, for example, the embodiment 1700 of FIG. 17A includes a PCB 1702 carrying a linear array 1704 of light emitters extending in y-direction and emitting light L in a direction transverse to the a lightguide 1720 and the LCD panel 150 (not shown). While the fashion in which the embodiment 1700 delivers light to the LCD panel 150 is similar to that described in reference to FIGS. 6(A-C) and/or 7(A, B), the configuration of light coupling from the emitter(s) 1704 to the lightguide 1720 differs to address the geometry of the edge of the lightguide 1720 that is curvilinear when viewed from the LCD panel 150 (i.e., in the yx-plane). To accommodate the bend in a coupling edge surface of the lightguide that is non-rectilinearly formatted in response to a complex shape of the display panel, the embodiment 1700 incorporates a coupling elbow 1724 connecting the array of emitters 1704 with a coupling edge of the lightguide 1720.

The coupling elbow 1724 may be fabricated as a light-pipe made of the same material as that of the lightguide 1720 and appropriately bent according to geometry of an embodiment based at least on the separation h between the back surface 1724b of the lightguide 1724 and the front surface 1702a of the PCB 1702, the dimensions of the array 1704 of light emitters, and the distance d between the array 1704 and the edge of the lightguide shown as line 1726. When fabricated as a stand-alone component that is separate from the lightguide 1720, the coupling elbow 1724 and the guide 1720 are further assembled so as to assure that light 1728 emitted by the emitter(s) 1704 is optimally coupled into the input facet of the elbow 1724 and, upon the propagation through the elbow 1724, into the main, planar portion 1730 of the lightguide 1720. The following propagation of light, including the light outcoupling 640 towards the LCD 150, is similar to that described in reference to FIGS. 6(A-C). In another embodiment, the lightguide 1720 may be fabricated to include both the planar portion 1730 shown to be parallel to the PCB 1704 (i.e., in further reference to FIG. 17A, parallel to the xy-plane) and the coupling-elbow portion 1724 that is integral with the planar portion 1730. To achieve such a configuration, a peripheral portion of the initially slab-like lightguide 1720 may be appropriately molded or bent to form the L-like shaped coupling-elbow region. In either case, the rate at which the coupling elbow 1724 is curved is appropriately determined to optimize the efficiency of light delivery from the emitter(s) 1704 to the lightguide 1720. It is appreciated that the embodiment 1700, regardless if how the lightguiding elements 1720, 1724 are formatted, does not require a separate LED PCB similar to the PCB 816 to support and operate the array of emitters that is transverse to the main, electronic PCB 1702. Indeed, both the emitter(s) 1704 and other electronic components such as components described in reference to the PCB 810 of FIGS. 8(A, G) can be disposed on the same main PCB 1702.

An implementation utilizing, according to an embodiment of the invention, a coupling-elbow arrangement similar to that of FIG. 17A may provide an additional advantage of a flexible and configurable illumination of the display panel 150. Specifically, the embodiment 1700 or the like lends itself to utilizing both an array of emitters 1704, non-transversely delivering light to the light-source through light-piping, and a conventionally disposed emitter(s) 1734 that illuminate the LCD 150 with light 1736 delivered to the light-source in either of a non-transverse fashion from the emitter(s) 1704 and in a conventional fashion, directly with the use of emitter(s) 1734. It is understood that, in the latter case, the reflector 636 should be appropriately configured to allow a portion of light 1736 to be transmitted through the reflector 636 on its way towards the display panel.

Figure 17B:
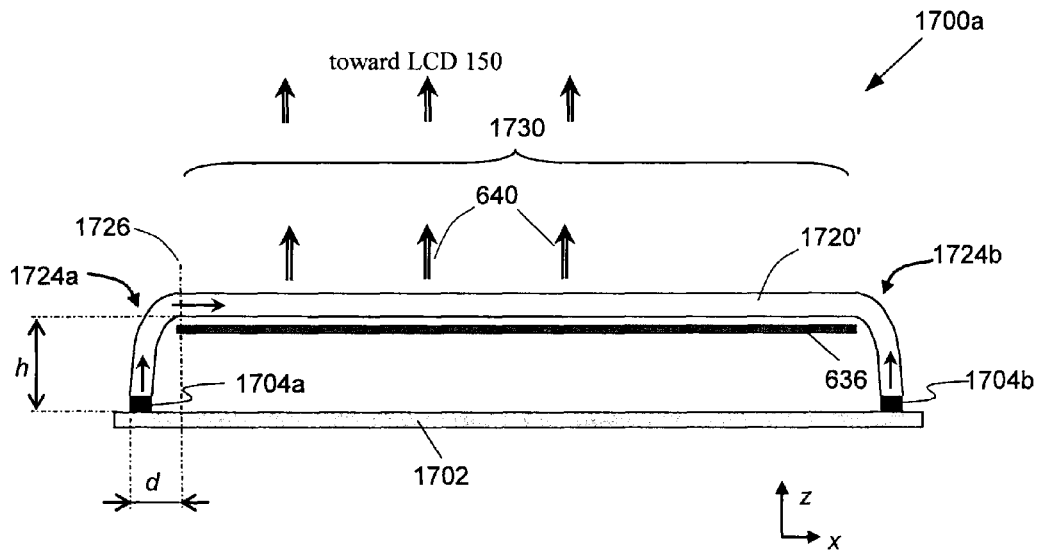

Embodiment 1700a of FIG. 17B illustrates a variation of the embodiment 1700 of FIG. 17A. As shown, the lightguide 1720' includes two elbows, 1724a and 1724b, on the opposite sides of the lightguide 1720', through each of which light is being pumped into the main, planar portion 1730 of the U-like shaped lightguide 1720' from respectively corresponding emitters 1704a, 1704b. The embodiment 1700a is shown without the auxiliary emitter(s) 1734.

Embodiments of the invention described above are intended to be merely exemplary; numerous contemplated variations and modification will be apparent to those skilled in the art. Embodiments of the present invention are preferably configured within a vehicular rearview assembly that contains a mirror element, whether an auto-dimming mirror element such as an electrochromic (EC) mirror element or a prismatic tilt-mirror element, numerous examples of which are described in Our Prior Publications.

Embodiments of a Mirror Element for Use with a Rearview Assembly.

Figure 9A:
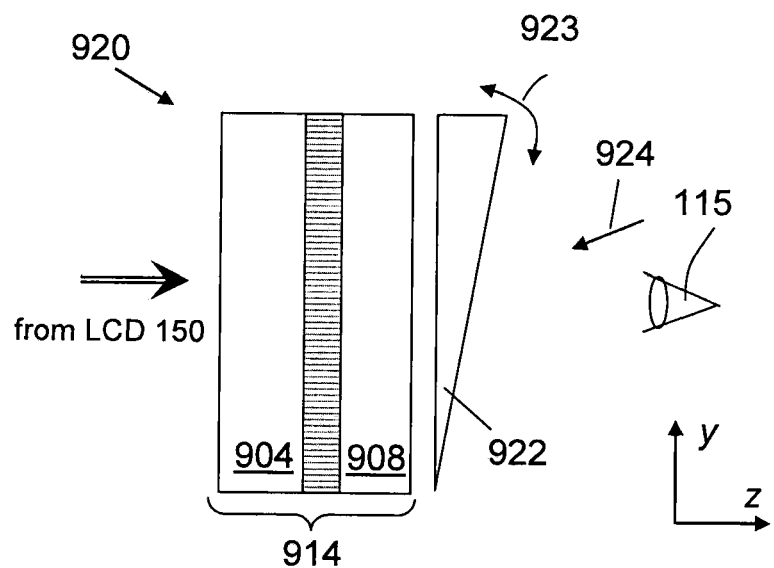
FIG. 9A: an APBF-containing laminate incorporated, as a stand-alone component, into a tilt prism-mirror element.
Figure 9B:
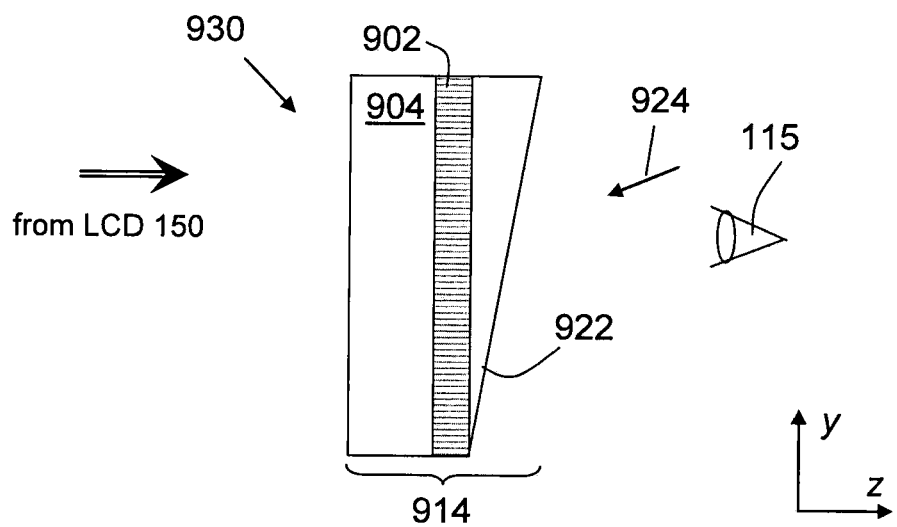
FIG. 9B: an APBF is laminated in a tile prism-mirror element.

One example of a mirror element suitable for use with an embodiment of the present invention is depicted in FIG. 9A. As shown, employs an APBF 902 that is laminated between two supporting bases 904 and 908 to form a stand-alone APBF-laminate-component 914 within a non-dimming tilt prism-mirror structure 920 (including a tilt prism element 922, where the tilt is indicated by than arrow 923) positioned in front of the information display 150. The remaining portions of an illumination system according to embodiments of the invention as described above is not shown for simplicity of the drawing. An arrow 924 indicates light incident on a proximal, as observed by the viewer 115, side of the mirror structure 920. Alternatively, a tilt prism element structure 930 may incorporate an RP (APBF) element 902 that is laminated to one of the components of the tilt-mirror itself, as shown in FIG. 9B. As shown in an embodiment 940 of FIG. 9C, a liquid crystal cell or device 942 capable of modulating light, such as a Twisted Nematic (TN) cell, a Super Twisted Nematic (STN) cell, a guest host or phase change LC device incorporating a dichroic dye, a Ferroelectric LC device, a Distortion of Aligned Phases (DAP) LC device or other LC-cells known in the LC art can be placed in front of the RP (APBF) element 902, as observed by the viewer 115, to modulate (i) the ambient light 924 incident upon the proximal side 944 of and reflected by the mirror system 940 and/or (ii) the light transmitted through the system 420 from an embodiment of the light source of the invention disposed behind the distal, with respect to the observer, side 946 of the system 420 and described in reference to FIG. 6 through 8. In an alternative embodiment, a wire-grid polarizing element may be used instead of an APBF.

Figure 9C:
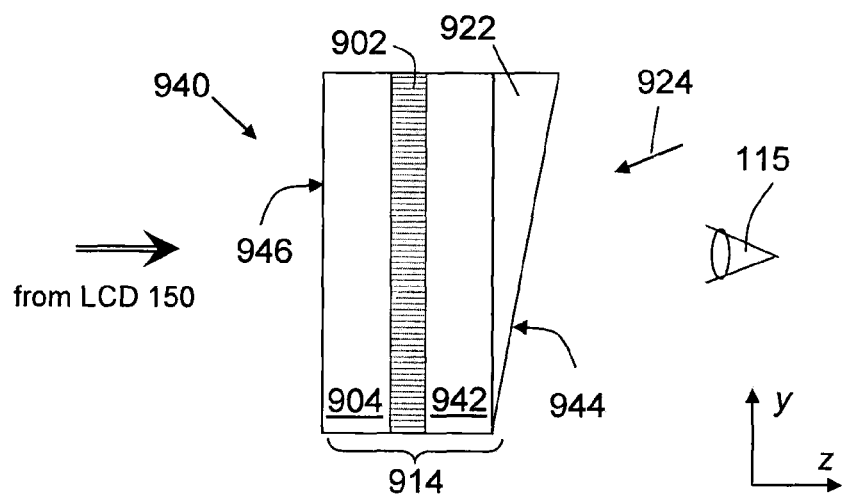
FIG. 9C: an APBF-laminate is integrated with a prism element.
Figure 9D:
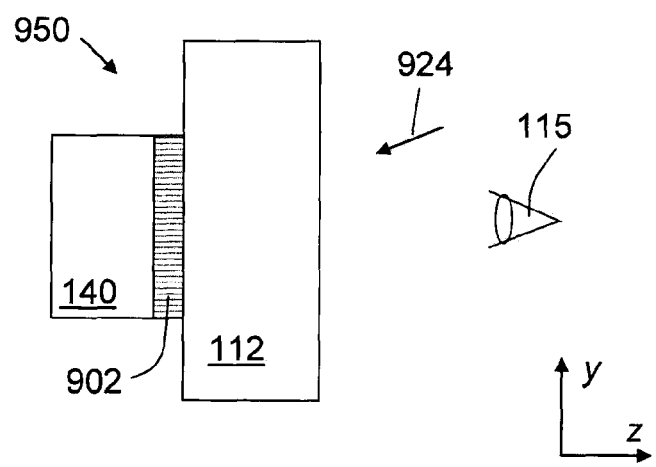
FIG. 9D: a display and a mirror element operate as substrates for a laminate containing an APBF.

It will be appreciated that, although the embodiments of FIGS. 9A through 9C are shown as employing a prismatic mirror element, similar embodiments may employ dimming mirror structures such as those containing electrochromic elements. In that context, as shown in FIG. 9D, and in further reference to FIG. 1, the APBF 902 may be laminated between the LCD subassembly 140 or some components of the LCD subassembly and the mirror element 130 (which may include a prismatic optical element or an electrochromic element) so as to optimize the number of optical interfaces and improve the overall reflectance and transmittance properties of the rearview mirror system 950. In addition, in an embodiment related to that of FIG. 9D, it may be useful to include an additional layer of pressure-sensitive adhesive (PSA) containing a UV-blocking agent, or a UV-blocking polymer film in front of the APBF 902, as seen by the observer. The addition of such UV attenuating agents or blockers may prevent visual degradation of the APBF and/or degradation of the integrity of the APBF-containing laminate. In embodiments where the APBF is located behind the electro-optic cell such as an EC-element or a cholesteric element, it is possible to dispose the UV-attenuating agents within the electro-optic cell. Cholesteric devices and EC-elements including these agents are taught, respectively, in a commonly assigned U.S. Pat. No. 5,798,057 and in commonly assigned U.S. Pat. No. 5,336,448 and U.S. Pat. No. 6,614,578, each of which is incorporated herein in its entirety.

Figure 9E:
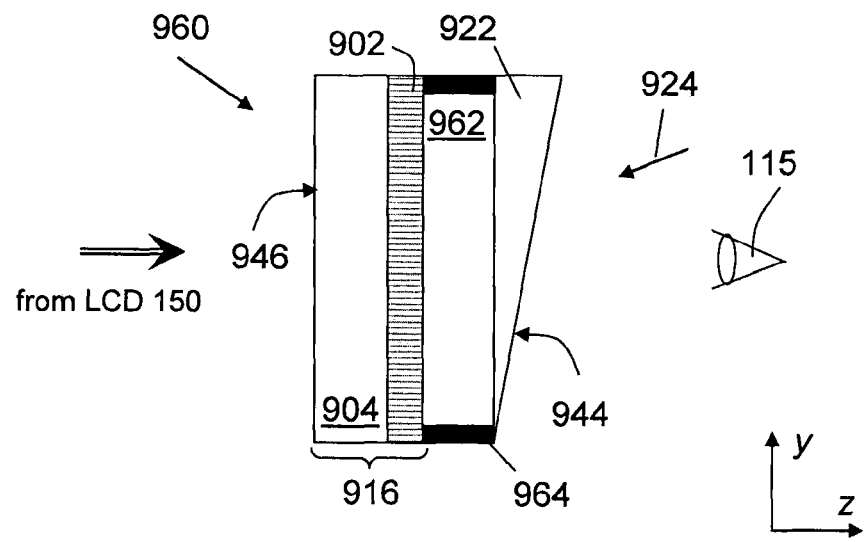
FIGS. 9(A-G) schematically illustrate APBF-containing embodiment of mirror elements of a rearview mirror assembly of the invention.
FIG. 9G: an APBF-containing laminate is integrated in a mirror element containing a wedge-shaped gap.
Figure 9F:
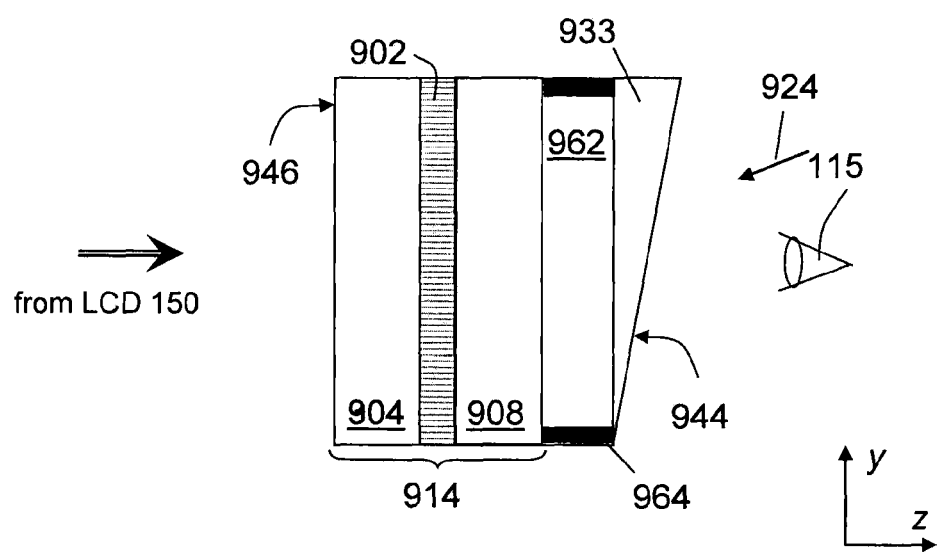
Figure 9G:
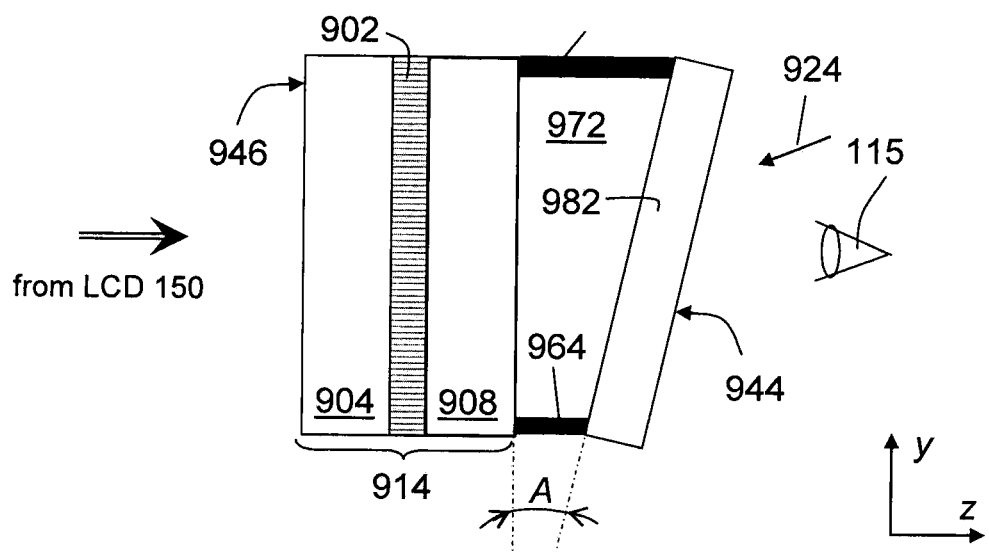
Figure 10:
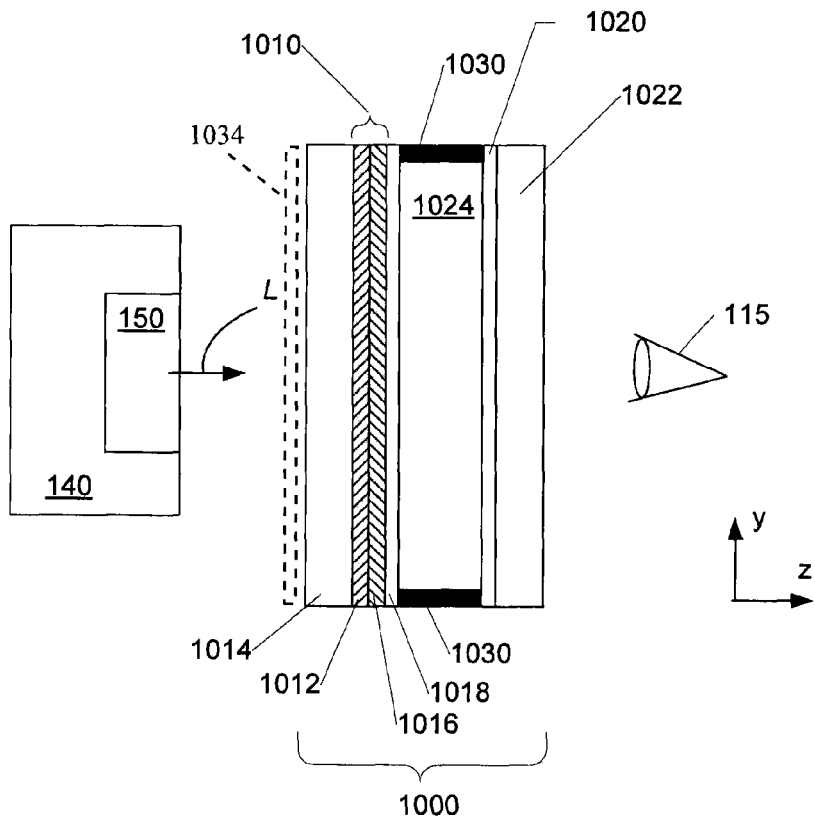
FIG. 10 schematically shows, in side view, an embodiment of a rearview mirror assembly employing a single-zone transflective EC-mirror element and an APBF element.

Referring again to FIGS. 9(A-G), a mirror system employed in an embodiment of the rearview mirror assembly of the invention may contain an air gap or cavity that may be sealed with a perimeter seal to avoid entrapment and/or condensation of vapors and dust. For example, a mirror system may include constructions such as [G/RP/air/G] or [G/RP/G/air/G/ITO/EC/ITO/G]. Here, the components or media are listed starting with the one farthest from the viewer, the "air" denotes a cavity or a gap that may be defined by the perimeter seal and/or spacer disposed between the adjacent components separated from one another, "RP" refers to a layer of reflective polarizer such as APBF, for example, and "G" denotes a lite of glass or other suitable substrate material. FIGS. 9E through 9G, schematically showing embodiments of a mirror assembly employing a prismatic mirror element, provide several non-limiting examples of the above-mentioned construction sequences. In particular, FIG. 9E illustrates a prism-based embodiment 960, of the mirror element 130 of FIG. 1, that provides a modification to the embodiment 930 of FIG. 9B. As compared to the embodiment 930, in the embodiment 960 the prism 922 is spatially separated from a laminate 916 containing the APBF 902 and the glass substrate 904 by an air-filled cavity 962 formed with the use of a perimeter seal and/or spacer 964 placed between the prism 922 and the RP 902. The corresponding construction sequence may be described as [G/RP/air/prism]. FIG. 9F illustrates a related embodiment 970 including the air-gap 962, in which the laminate 914 is formed by sandwiching the RP 902 between two lites of glass 904, 908, as previously discussed. The corresponding construction sequence may be described as [G/RP/G/air/prism]. Shaping the air cavity 972 as a wedge, as shown in a related embodiment 980 of FIG. 9(G), provides an additional benefit of constructing an embodiment 980 of the mirror assembly with the use of only standard, off-the-shelf glass plates (904, 908, and 982). The sequence of components and media corresponding to the embodiment of FIG. 9(G) may be listed as [G/RP/G/prism-shaped air/G]. The wedge-shaped cavity 972 may be formed, for example, by disposing the laminate 914 and the plate 982 at an appropriate angle A and sealing the non-uniform peripheral gap along the edge of the plates 904 and 982 with a perimeter seal 964. It would be appreciated that any air-gap (including the wedge-shaped air-gap), once formed, may be filled with a clear adhesive material (such as urethane, silicone, epoxy, acrylic, PVB or equivalent materials), liquid (such as mineral oil, glycol, glycerin, plasticizer, propylene carbonate or the like), or gel, if desired. In constructing such prismatic mirror structures, supplemental transparent layer and opaque reflectance-enhancement layers can be applied to any substrate surface other than the surface closest to the viewer. Enhancement of reflectance characteristics of the embodiments of the invention is discussed below. The air cavity may be formed in other locations as desired, e.g., between the flattened reflective polarizer and a substrate element. In a related embodiment, the optically anisotropic film used in a laminate may be cast, coated or fabricated directly onto the optically flat substrate or glass and may not require further processing to achieve optical characteristics desired for use as a high quality mirror such as an automotive rear-view mirror. Any component used as a substrate or a superstrate for the APBF must possess optical quality to pass all optical requirements corresponding to the intended use of the final product.

Embodiments of the present invention may also be used, in a rearview mirror assembly, in conjunction with a single- or a multi-zone mirror element or system. For example, one embodiment of a rearview mirror assembly, schematically shown in FIG. 10, may include a basic transflective embodiment of the EC-mirror element that requires an opacifying layer (not shown) to hide certain portions of the electronic device 140 positioned behind the mirror element. As shown, surface III of mirror element 1000 contains a base bi-layer 1010, including an approximately 45 nm thick layer 1012 of $TiO_2$ deposited on a 1.6 mm thick glass substrate 1014 and a 22 nm thick layer 1016 of ITO that overcoats the layer 1012, and a reflecting layer 1018 that includes an approximately 23.5 nm thick uniform Ag- or Ag-alloy layer. The thickness of an ITO layer 1020, deposited on surface II of a 1.6 mm thick glass substrate 1022, is about 145 nm, and a layer 1024 of the electrochromic medium is about 135 micron thick. A seal sealably bonding the substrates 104 and 1022 to form a cavity filled with the EC-medium 1024 is schematically shown as an element 1030. Specific dimensions and geometric extent of the seal 1030 is described elsewhere and does not change the principle of operation of the present invention. The reflectance and color distribution characteristics of this embodiment, as perceived by the viewer 115, are shown in Table 1. An APBF 1034 is shown in a dashed line indicating that the APBF component may be configured as either a stand-along component or a component laminated between an embodiment of the electronic device 140 such as a light source of the invention (or its sub-component, e.g., the display 150) and the mirror element 1000.

TABLE 1

| Transmittance, % | Reflectance, % | a* (in reflection) | b* (in reflection) |
|---|---|---|---|
| 23.6 | 63.1 | −3.1 | 3.4 |

Figure 11:
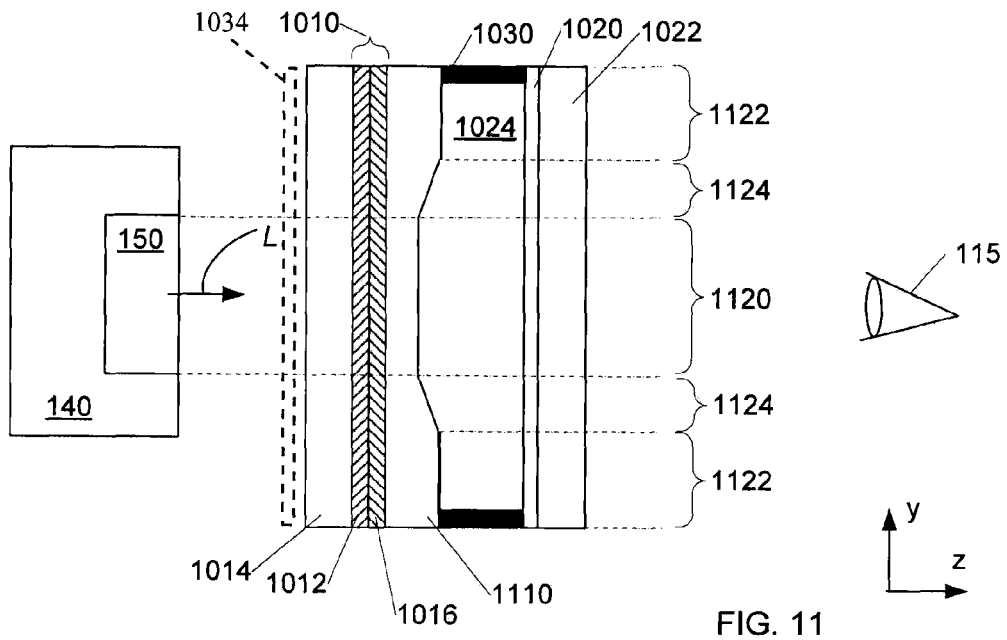
FIG. 11 shows, in side view, an embodiment of a rearview mirror assembly employing a multi-zone EC-mirror element and an APBF element.

A specific embodiment of an EC-mirror element 1100 that may be configured in conjunction with an embodiment of the light source of the present invention within a rearview mirror assembly is shown in side view in FIG. 11. As shown, and in further reference to FIG. 1, a single continuous reflective Ag-coating 1110 deposited on a base bi-layer 1010 has a gradient of thickness in the transflective area 1120 corresponding to a display 150. This mirror element includes an appropriate opacifying layer (not shown) added onto the substrate 1014 to make portion(s) of the mirror element that are labeled as zone(s) 1122 appear substantially opaque to the viewer 115. A portion of the reflective layer 1110 disposed in the opaque zone(s) 1122 is about 24.6 nm, while a portion of the reflective layer 1110 within the transflective zone 1120 is about 18.8 nm and provides for a required amount of light transmission from the light source 140 containing the display 150 through the zone 1120 towards the viewer 115. The transition zone 1124, separating the transflective display zone 1120 from the opaque zone(s) 1122 is defined by a gradual change in thickness of the reflective coating 1110. The rest of the structural parameters of the element 1100 are the same as discussed in reference to FIG. 10. The optical characteristics of the element 1100 are listed in Table 2. The optional APBF 1034 is shown in a dashed line indicating that the APBF component may be either a stand-along component or a component laminated between the electronic device 140 (or its component, e.g., the display 150) and the mirror element 1100.

TABLE 2

| | Transmittance, % | Reflectance, % | a* (in reflectance) | b* (in reflectance) |
|---|---|---|---|---|
| Opaque zone, 1122 | 21.6 | 64.9 | −3.1 | 3.5 |
| Transflective zone, 1120 | 32.4 | 54.9 | −3.1 | 2.3 |

Alternatively, any other embodiment of a multi-zone mirror element described in the Multi-Zone Mirror Application—be it an embodiment utilizing an abrupt transition between the opaque and transflective zones of the mirror element, such as, e.g., one of the embodiments described in reference to FIG. 5 through FIG. 8 of the Multi-Zone Mirror Application, or an embodiment utilizing a gradual transition between the opaque and transflective zones of the mirror element, such as, e.g. one of the embodiments described in reference to FIG. 9 through FIG. 15 of the Multi-Zone Mirror Application—may be configured as part of the rearview mirror assembly according to the general principle of FIG. 1 of the present application. Particularly, in such a case the mirror element 120 of FIG. 1 would be configured as a multi-zone mirror element.

Figure 12:
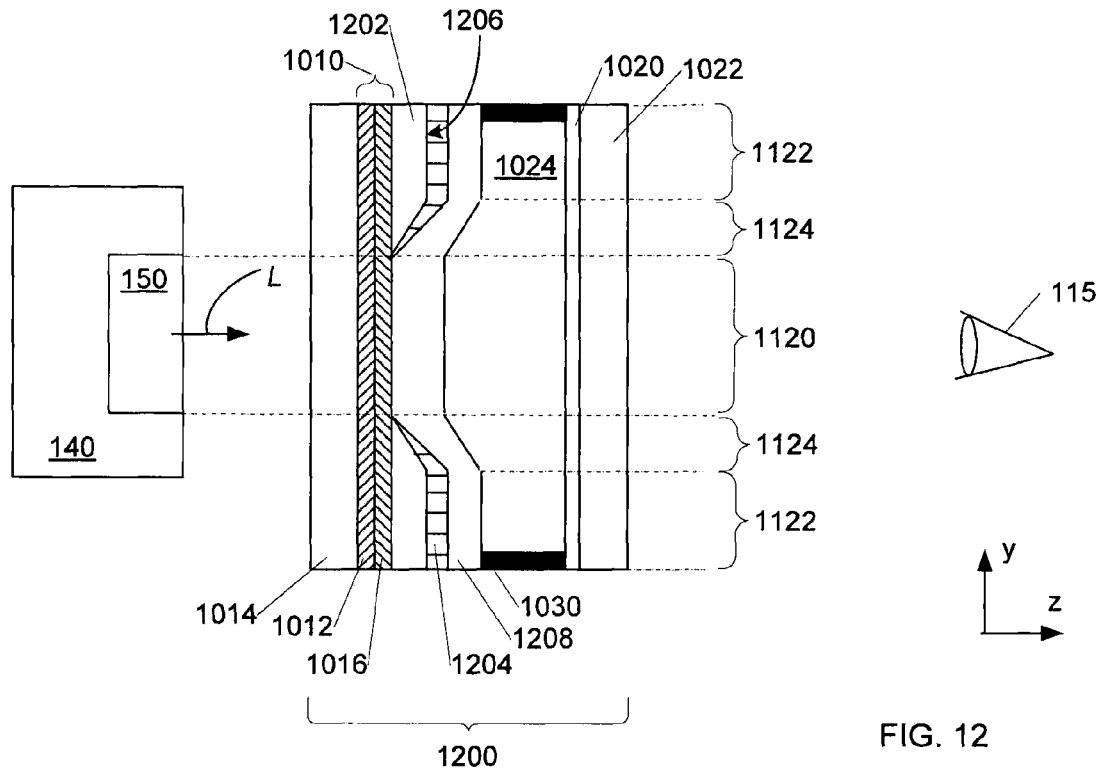
FIG. 12 shows, in side view, another embodiment of a rearview mirror assembly employing a multi-zone EC-mirror element and an APBF element.

For example, another embodiment 1200 of a multi-zone mirror element that may be used in conjunction with embodiments of a light source of the present invention is presented in FIG. 12. As compared to the embodiment 1100 of FIG. 11, the embodiment 1200 has an opacifying chromium layer 1202 that overlays the base bi-layer 1010. The layer 1202 is approximately 50 nm thick in the opaque zone(s) 1122, and the thickness of the layer 1202 is gradually reduced through the transition zone 1124 to zero at the transflective zone 1120. An additional flash graded opacifying layer 1204 of Ruthenium is disposed on the surface 1206 of the chromium opacifying layer 1202 prior to the deposition of a reflecting metallic layer 1208. In general, the geometry of the additional flash graded opacifying layer 1204 follows that of the layer 1202. In particular, the flash layer 1204 has its thickness gradually reduced, in the transition region 1124 between the opaque and transflective zones 1122 and 1120, from the full value of 5.0 nm down to zero at the edge of the transflective zone 1120.

In embodiment 1200 of FIG. 12, the layer 1204 is substantially spatially coextensive with the layer 1202 in that both the layer 1202 and the layer 1204 are projected onto the substantially the same portion of the third surface of the embodiment 1200. In this case, bounds of both layers 1202 and 1204 identify substantially the same transflective area 3020. (In a specific embodiment, however, the layer 1204 may be deposited slightly beyond the extent of the layer 1202 (not shown)

into the transflective area 1120 of the embodiment 1200.) The thick (50.0 nm) graded chromium opacifying layer 1202 serves to reduce most of the transmittance in the opaque area 1122. The thin, flash graded opacifying layer 1204 of ruthenium reduces the transmittance further and, in combination with chromium layer 1202, advantageously compensates the yellow color excursion, in the graded transition region, otherwise attributable to the presence of a single-metal opacifying layer and discussed above. Yet another advantage of adding the flash graded layer 1204 of ruthenium to the graded opacifying layer 1202 of chromium is significant improvement in mechanical stability of the top reflecting layer 1208 of silver or silver alloy, which is now in physical contact with ruthenium and not chromium. The thickness of the layer 1208 is graded from about 18.8 nm in the transflective zone to about 9.2 nm in the opaque zone. As shown, both the chromium layer 1202 and the Ruthenium flash layer 1204 are graded at the same rate, each layer reaching both its full and minimum thicknesses at substantially the same spatial positions. However, the layers 1202 and 1204 may be generally graded at different rates. Moreover, in order to assure that direct contact between the layer 1208 with the chromium layer 1202 is minimized, in a specific embodiment the gradually thinned Ruthenium layer 1204 can be extended (not shown) into the transflective area 1120 slightly beyond the limit of the chromium layer 1202. Other material parameters characterizing the embodiment 1200 are as follows: the base bi-layer 1010 includes a 45 nm layer of $TiO_2$ and a 22 nm layer of ITO, deposited in that order on surface III of the embodiment (i.e., on the front surface of the glass substrate 1014); the EC-medium 1024 is 135 micron thick; a 145 nm thick layer 1020 of ITO is deposited on surface II (i.e., on the rare surface of 1.6 mm thick front glass substrate 1022). The optical characteristics of the opaque and the transflective areas, 1122 and 1120, are summarized in Table 3. The optional APBF 1024 is shown in a dashed line indicating that the APBF component may be either a stand-alone component or a component laminated between the electronic device 140 (including the display 150) and the mirror element 1200.

TABLE 3

| | Transmittance, % | Reflectance, % | a* (in reflection) | b* (in reflection) |
|---|---|---|---|---|
| Opaque Zone, 1122 | 0.1 | 65.5 | −3.4 | 1.7 |
| Transflective Zone, 1120 | 32.4 | 54.9 | −3.1 | 2.3 |

An example related to that of FIG. 12 is described in Tables 4 and 5. Table 4 lists alternative structural parameters of the embodiment of FIG. 12 chosen so as to provide for a reflectance match between the transflective zone 1120, the transition zone 1124, and the opaque zone 1122 of the mirror element 1200. Here, thickness of any graded layer is considered to be graded within the transition zone 1124 between the values corresponding to that in the opaque zone 1122 and the transflective zone 1120. A resulting value of reflectance is effectively even across the mirror element 1200, as perceived by the viewer 115, while the resulting transmittance value is gradually changing. Optical characteristics of the embodiment 1200 having characteristics noted in Table 4 are summarized in Table 5.

TABLE 4

| | Thickness, nm (unless indicated otherwise) | |
|---|---|---|
| Element of embodiment 3100 of FIG. 31 | Opaque Zone, 3022 | Transflective Zone, 3020 |
| Glass substrate, 610 | 1.6 mm | 1.6 mm |
| Base bi-layer, 2910: | | |
| layer 2912, $TiO_2$ | 45 | 45 |
| layer 2914, ITO | 22 | 22 |
| Opacifying layer 3102, Cr | 60 | 0 |
| Flash opacifying layer 3104, Ru | 5.0 | 0 |
| Reflective layer 3108, Ag-alloy | 9.2 | 24.6 |
| EC medium, 614 | Approximately 135 microns | Approximately 135 microns |
| Layer 2918, ITO | 145 | 145 |
| Glass substrate, 635 | 1.6 mm | 1.6 mm |

TABLE 5

| | Transmittance, % | Reflectance, % | a* (in reflection) | b* (in reflection) |
|---|---|---|---|---|
| Opaque Zone, 1122 | 0.1 | 65.5 | −3.4 | 1.7 |
| Transflective Zone, 1120 | 21.6 | 64.9 | −3.1 | 3.5 |

Furthermore, embodiments of a light source of the present invention may be advantageously utilized with a mirror element or a mirror system that includes an APBF (whether as a stand-alone component or as laminated to a component of the mirror system), as described, e.g., in the commonly assigned U.S. patent application Ser. No. 12/629,757.

Figure 13:
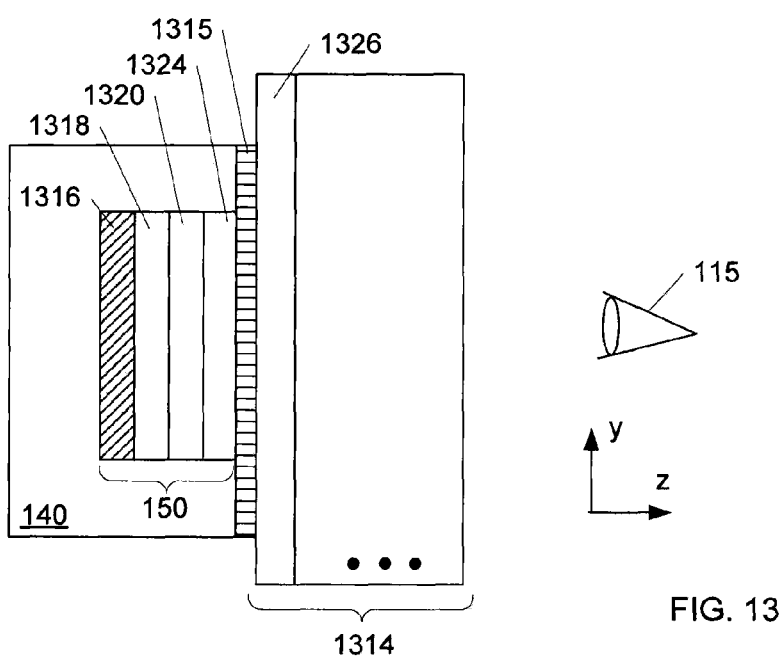
FIG. 13 schematically shows, in side view, an embodiment employing an APBF laminated between an electronic device containing a light source of the invention and a mirror system.
Figure 14A:
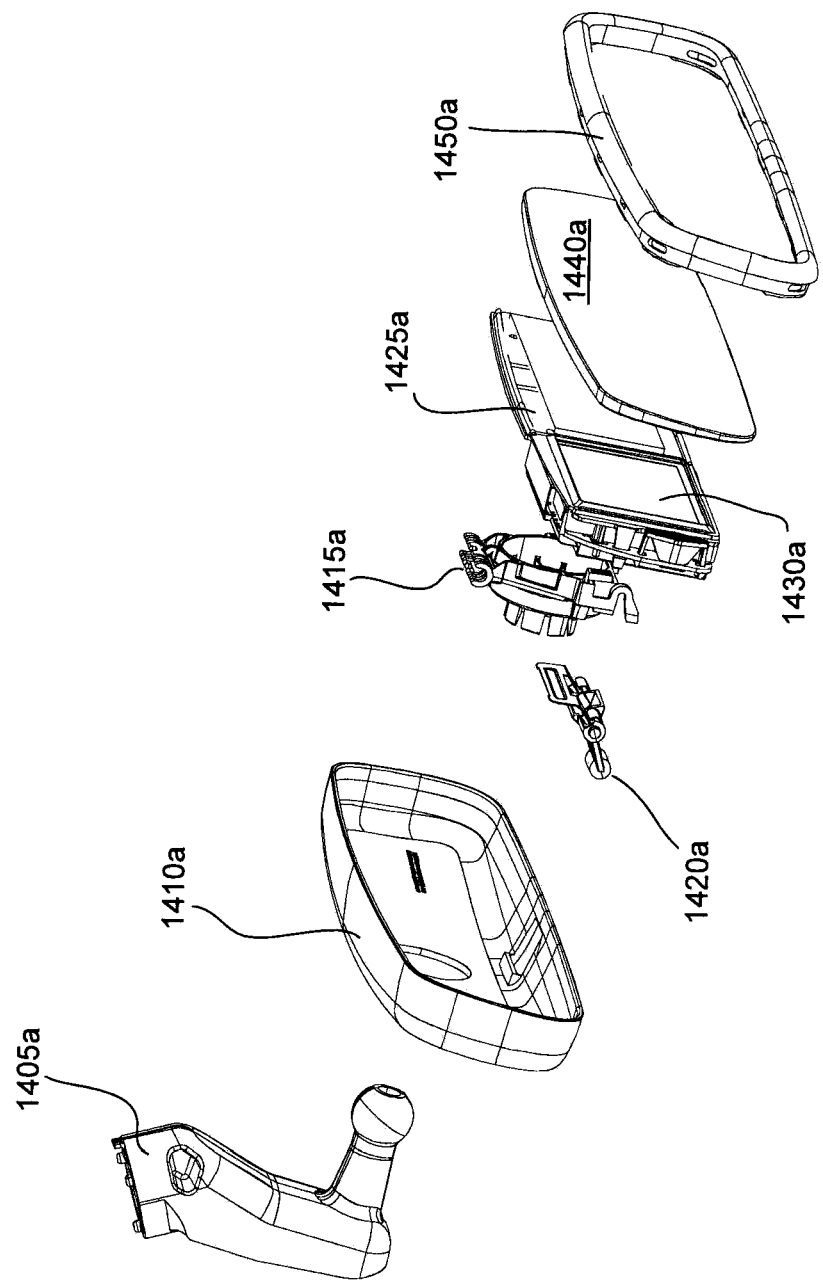
FIGS. 14 (A-E) show various views an embodiment of a rearview mirror assembly incorporating a light source and an electronic device of the present invention and a prismatic element.
Figure 14B:
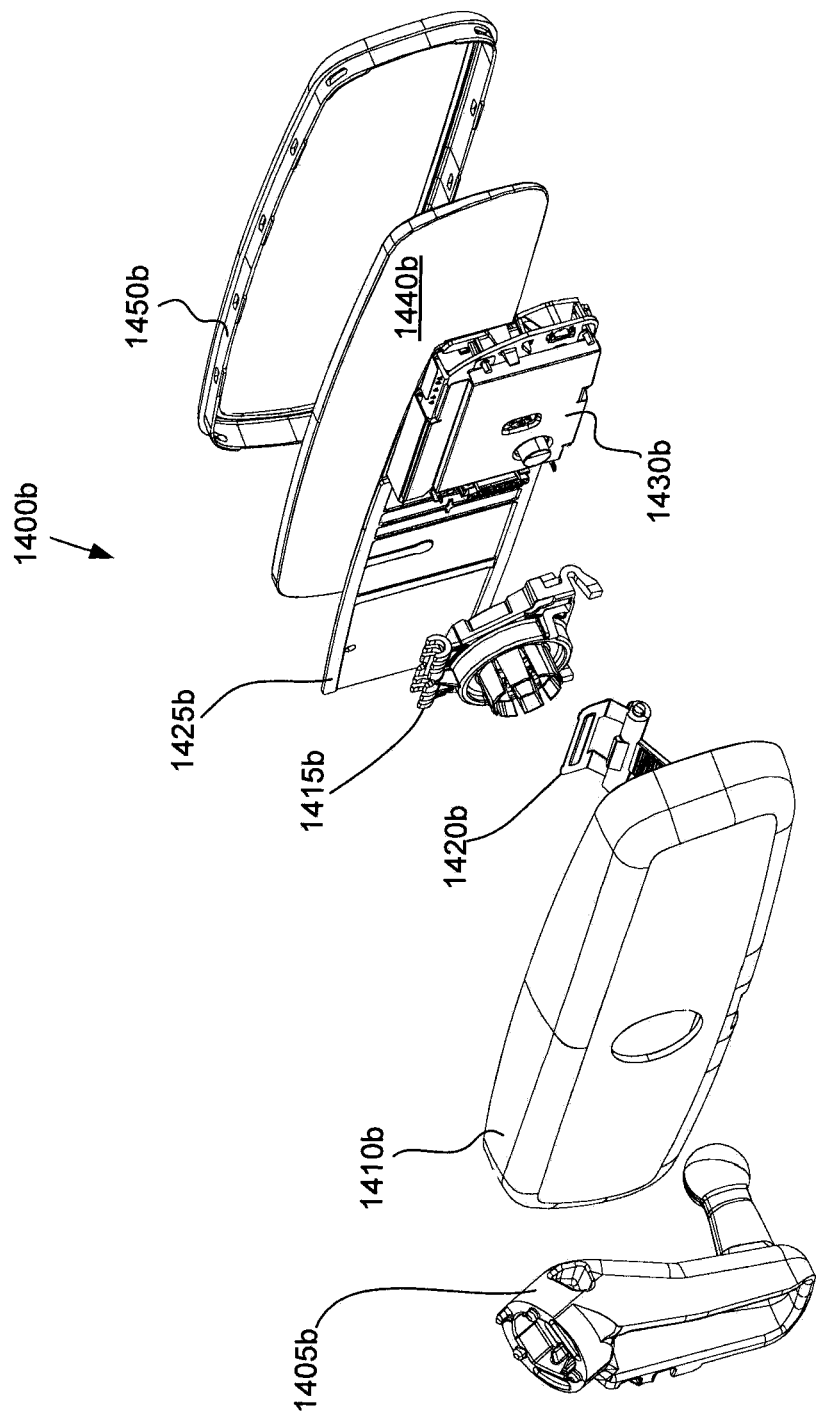
Figure 14C:
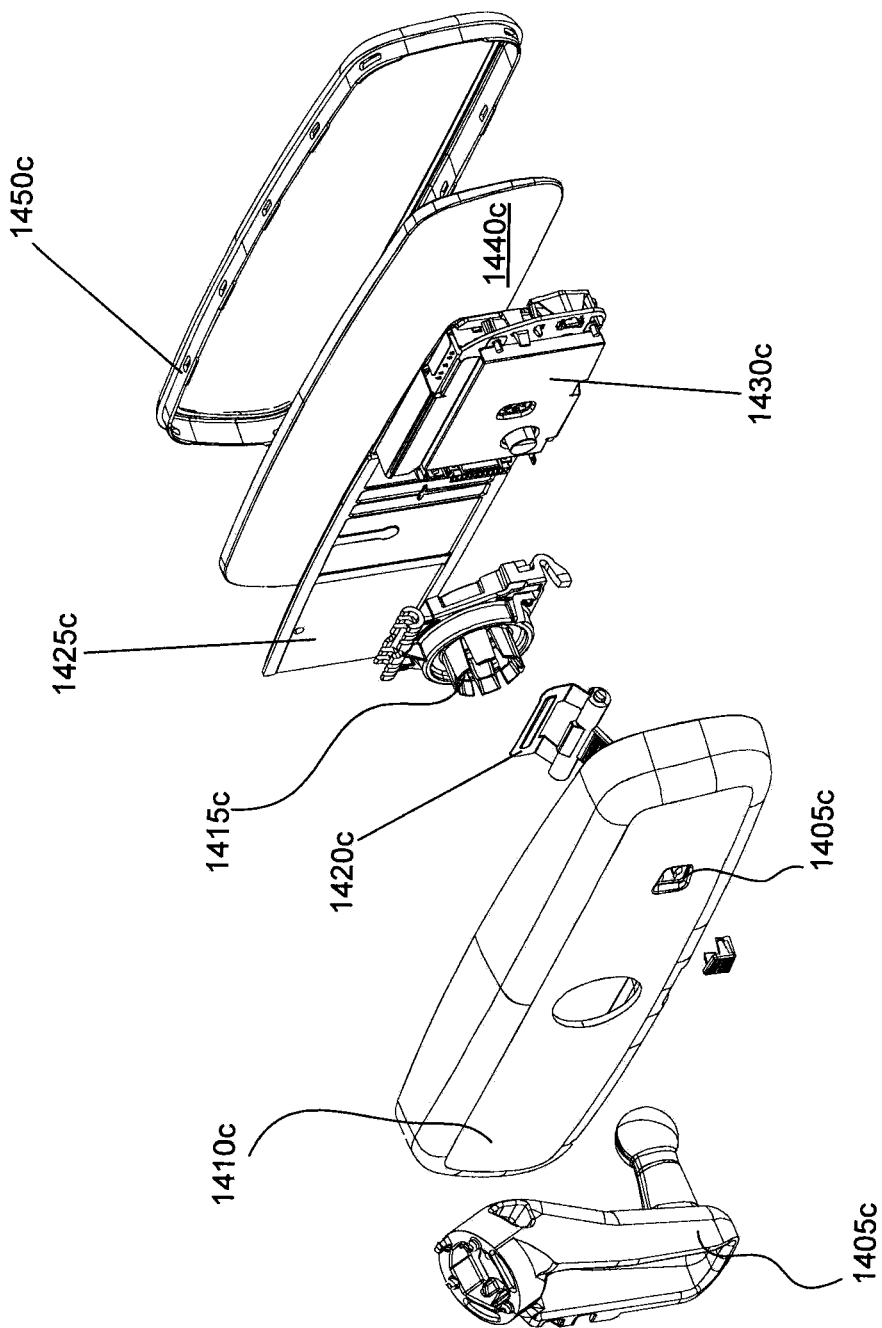
Figure 14D:
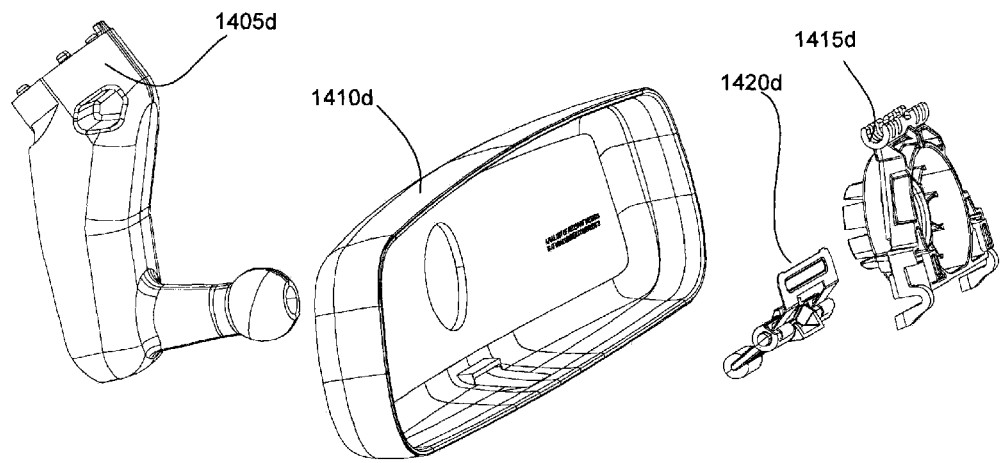
Figure 14E:
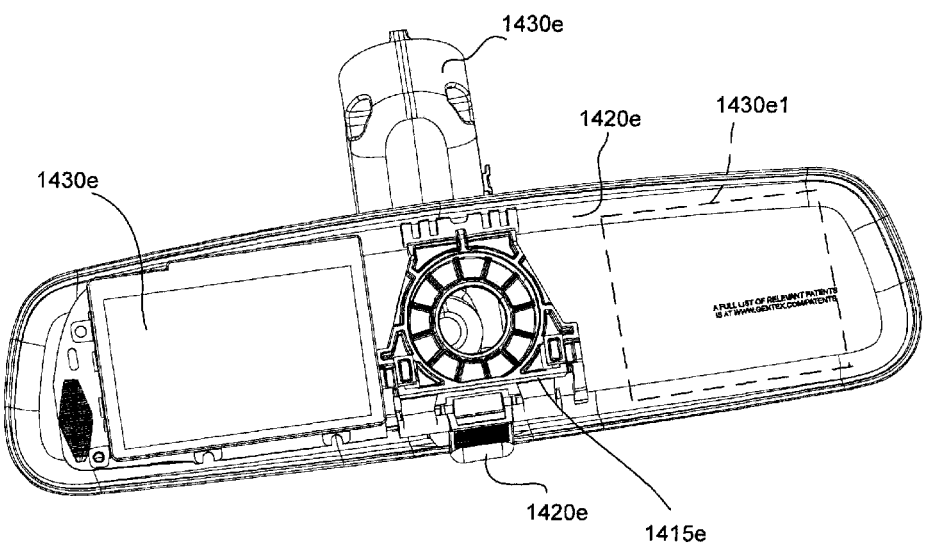

It is understood that, when used in combinations with various mirror elements mentioned herein, an embodiment of the light source of the invention may utilize the APBF as part of the light source or may be devoid of such APBF. Moreover, in some instances the LCD of an embodiment of the present invention may have one of its polarizers (that sandwich the LC-medium of the LCD, for example, either an exit polarizer or an entrance polarizer, which are denoted as such with respect to light propagating from the emitters through the LCD) removed, in order to obtain particular operational characteristics. In a first specific example, if an entrance polarizer of the LCD 150 (of the embodiment 600 containing the APBF 662) is removed, the brightness of the LCD 150 will not be substantially changed while its extinction ratio will be reduced by approximately an order of magnitude. In a second specific example, where the LCD 150 of the embodiment 600 has both of its polarizers but the APBF 662 is removed, the extinction ratio of the display will remain substantially unchanged while its brightness will be lowered. In a third specific example, where an embodiment 600 of FIG. 6 is used in conjunction with an EC-element such as that element 1200 of FIG. 12, a high extinction ratio of the display 150 can be obtained. Another situation arises in a fourth specific example where the LCD 150 of an embodiment of the invention does not have an exit polarizer 1310 and is used in conjunction with an EC-element-based mirror system 1314 that includes an APBF 1315. As shown in FIG. 13, the display 150 includes an entrance polarizer 1316, a back plate 1318, a LC-layer 1320, and a front plate 1324. In this case, the APBF 1315 may be, for example, laminated between the front plate 1324 of the LCD 150 and the back lite of glass 1326 of the system 1314. For simplicity of illustration, remaining components of the system 1314 are not shown. It is understood that, in comparison with the first example, in the second example the brightness (as measured at the output of the display) is increased, while the extinction ratio of the display is reduced.

Turning now to FIGS. 14(A-E), there are various views of two different embodiments of a prism version of a rearview assembly 1400a, 1400b, 1400c. In the first prism version embodiment (best depicted in FIG. 14B) the LCD/electronics module 1430b does not include an ambient light sensor, therefore, the corresponding housing 1410b does not include an aperture corresponding to aperture 1411c. The second prism embodiment (best depicted in FIG. 14C) includes an ambient light sensor, therefore, the corresponding housing 1410c comprises an aperture 1411c. In either embodiment, the assembly comprises a mount 1405a, 1405b, 1405c, 1405d, 1405e; a housing 1410a, 1410b, 1410c, 1410d, 1410e; a toggle mechanism mount 1415a, 1415b, 1415c, 1415d, 1415e; a toggle mechanism lever 1420a, 1420b, 1420c, 1420d, 1420e; a support plate 1425a, 1425b, 1425c; an LCD/electronics module 1430a, 1430b, 1430c, 1430e, 1430e1; a prismatic mirror element 1440a, 1440b, 1440c; and a bezel 1450a, 1450b, 1450c. As depicted in FIG. 14E, the LCD/electronics module 1430e may be located on either side of the toggle mechanism 1415e/1420e. It should be understood that the toggle mechanism mount 1415a, 1415b, 1415c, 1415d, 1415e may be configured to attach the support plate 1425a, 1425b, 1425c to the mount 1405a, 1405b, 1405c, 1405d, 1405e or the toggle mechanism may be configured to attach the housing 1410a, 1410b, 1410c, 1410d, 1410e to the mount 1405a, 1405b, 1405c, 1405d, 1405e. When the toggle mechanism is configured to attach the support plate to the mount, the housing may be configured to be a cover with little or no structural support. In at least one embodiment, at least a portion prismatic element comprises an area in front of the LCD/electronics module that has increased transmissivity as described elsewhere herein for improving the transmission of light emanating from the LCD. It should be understood that other areas of the element may have areas with increased transmissivity for either other displays or light sensors.

Figure 15B:
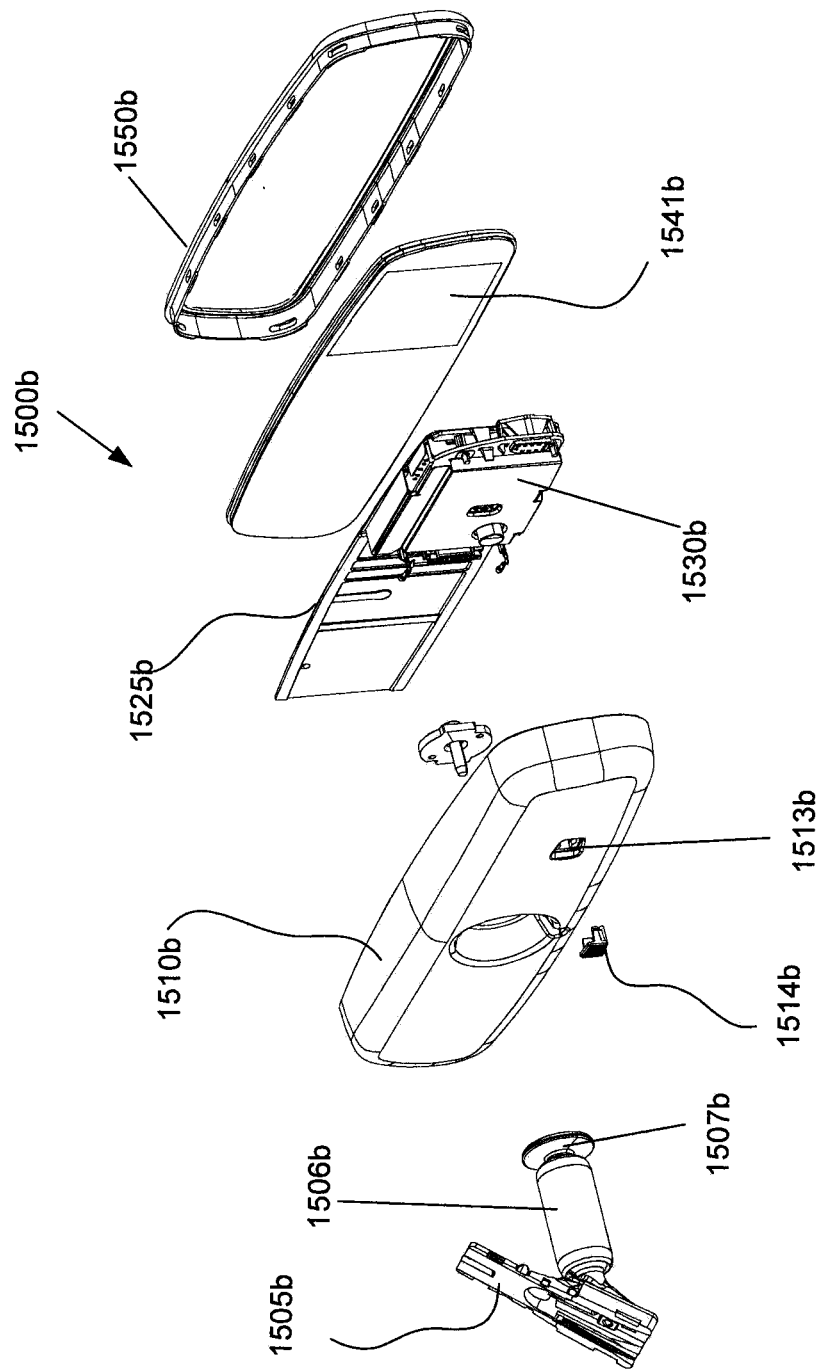

Turning now to FIGS. 15(A-B) there is shown an electro-optic version of a rearview assembly 1500a, 1500b. The assembly comprises a windshield mount 1505a, 1505b; a stem 1506a, 1506b; and a housing mount 1507a/1508a, 1507b. The assembly further comprises a housing 1510a, 1510b with an aperture 1513b having a secondary optic element 1514a, 1514b. The secondary optic element is configured to at least partially define the field of view of an associated ambient light sensor (not shown). The housing 1510a, 1510b further comprises snap elements 1512a for securing a bezel 1550a, 1550b. The assembly further comprises a support plate 1525a, 1525b configured to secure an LCD/electronics module 1530a, 1530b and/or an EC-element 1540a, 1540b. In at least one embodiment, at least a portion 1541a, 1541b of the EC element comprises an area in front of the LCD/electronics module that has increased transmissivity, as described elsewhere herein, for improving the transmission of light emanating from the LCD. It should be understood that other areas of the element may have areas with increased transmissivity for either other displays or light sensors.

Embodiments Employing Segmented Configurations.

Operation of the embodiments described in reference to FIGS. 6 and 7 results in illuminating essentially the whole area of the display panel (such as panel 150). To assure that only a chosen portion of the display is illuminated when required (which may be the case, for example, when only a limited number of characters, spatially-limited indicia, or icons such as a compass readings has to be displayed to the user), measures may be taken to configure the light-source in a segmented fashion. Embodiments employing such segmented configurations are further discussed in reference to FIGS. 18 through 23.

Figure 18:
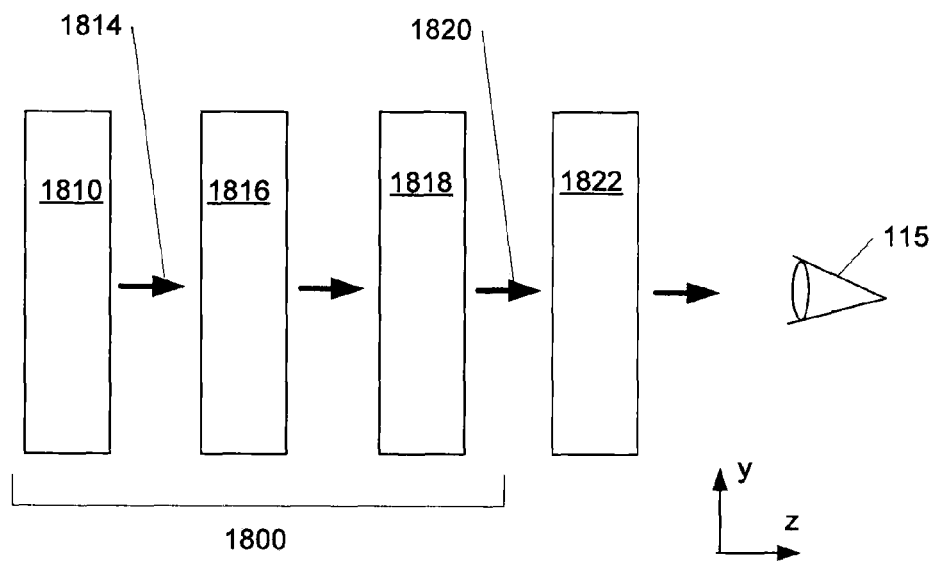
FIG. 18 schematically illustrates a light-source embodiment of a vehicular rearview assembly.

Segmenting a light source may involve, in one embodiment, the use of an auxiliary segmented LC-cell such as a TN-cell. FIG. 18 schematically illustrates a light-source embodiment 1800 of a vehicular rearview assembly including a light-engine 1810 (such as the light-engine 638 of FIG. 6(A-C) or 700 of FIG. 7A, or 730 of FIG. 7B) that generates light 1814 propagating towards and through the LCD 1816, and a segmented LC-cell device 1818 positioned in front of the LCD 1816. Light 1820 emerging from the segmented LC-cell device 1818 further traverses a mirror element 1822 (such as any of the mirror elements discussed in reference to FIGS. 9 through 13) on its way to the field-of-view (FOV) at the front of the rearview assembly, to be viewed by the user 115. For simplicity of illustration, several elements such as the diffuser 642 and BEFs 650, and 652 of FIGS. 6(A-C) that may be present in the system are not shown in FIG. 18.

Figure 19A:
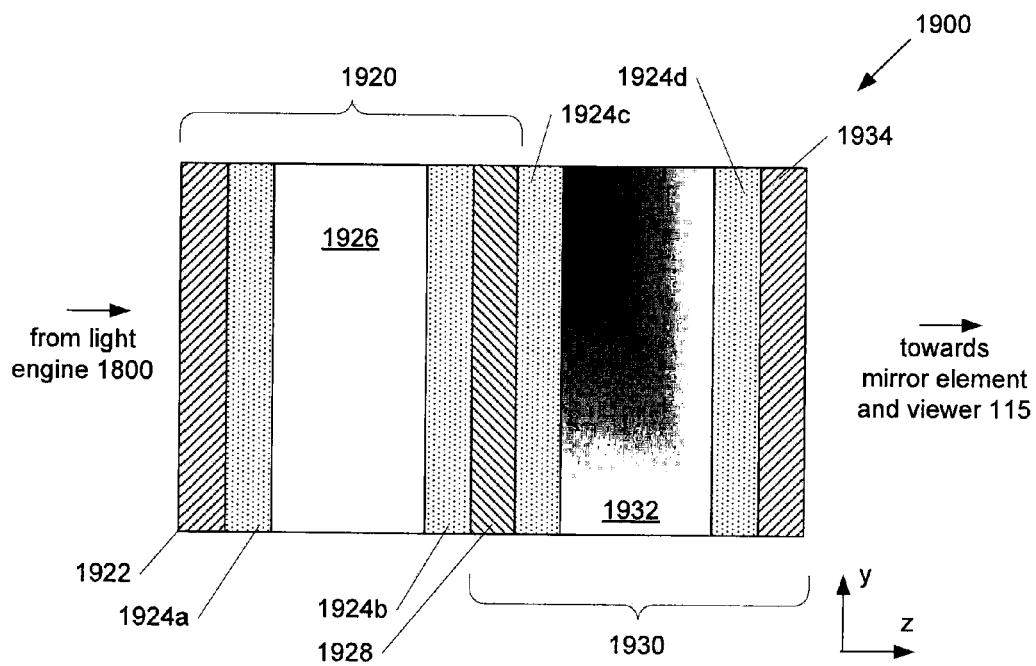
FIGS. 19A and 19B illustrate embodiments of sub-systems including a segmented LC cell and a LCD.

FIGS. 19(A, B) illustrate, in side view, two sub-systems 1900 and 1910, each combination including an LCD (such as the LCD 1816 of FIG. 18) and a segmented LC-cell device (such as the device 1818 of FIG. 18, or an active TFT LCD device). The sub-systems 1900 and 1910 differ in the way they employ optical polarizing components. As shown in FIG. 19A, the LCD 1920 includes a first polarizing component 1922 serving as a rear polarizer of the LCD 1920, a first wide-view film 1924a, a LC-cell 1926 conventionally comprising a layer of LC-material disposed within a cell formed by two substrates, a second wide-view film 1924b, and a second polarizing component 1928 serving as a front polarizer of the LCD 1920. The segmented LC-device 1930 incorporates the second polarizing component 1928 serving as a rear polarizer of the segmented LC-device 1930, a third wide-view film 1924c, a segmented LC-cell 1932, a fourth wide-view film 1924d, and a third polarizing component 1934 serving as a front polarizer of the segmented LC-device 1930. In the embodiment 1900, the polarizing components 1922, 1928, and 1934 are linear absorptive polarizers. Because the LCD 1920 and the segmented LC-cell device 1930 share the second polarizing component 1928, the overall losses of light passing through the embodiment from the light engine 1800 towards the front of the rearview assembly and the viewer 115 are reduced. It is appreciated that in an embodiment employing the LC-cell 1926 that is configured to be transmissive in absence of any applied voltage, the polarizing components 1922 and 1934 are oriented so as to transmit light having the same linear polarization, while the polarizing component 1928 is appropriately oriented so as to block such light. Stated differently, the transmission axes of the polarizers 1922 and 1934 are mutually parallel and both of these axes are perpendicular to the transmission axis of the polarizer 1928. It is appreciated, however, that an alternative configuration including co-oriented polarizers can be chosen, in which a differently operated LCD cell shall be utilized, as known in the art. Implementations of wide-view films referred to in this disclosure may vary and some of them have been described in related art, for example in U.S. Pat. No. 6,034,756.

Figure 20:
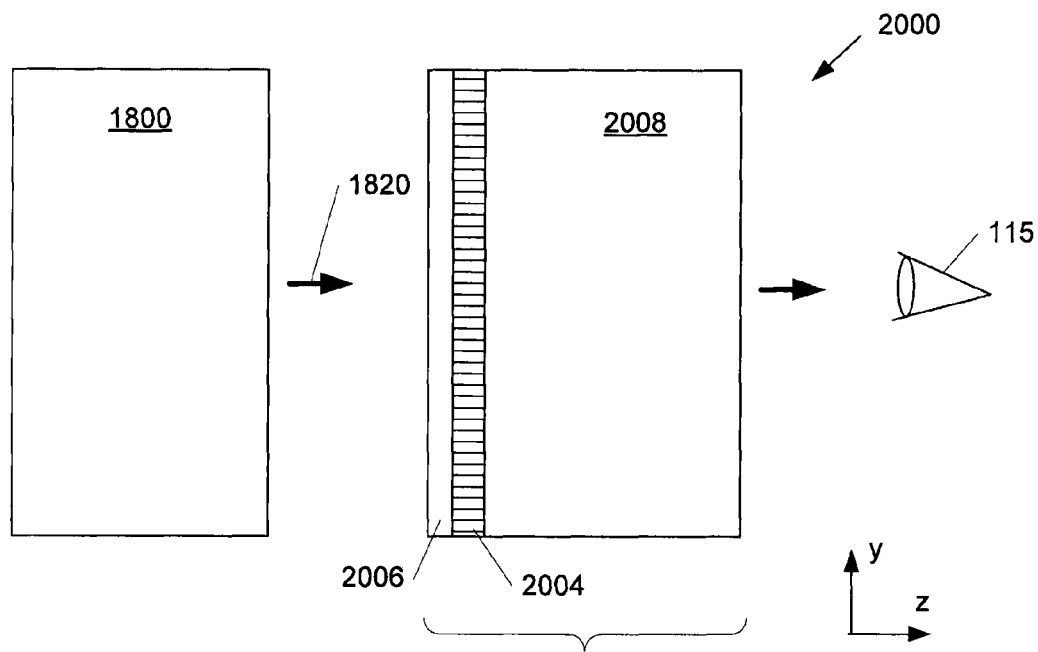
FIG. 20 shows an embodiment employing a reflective polarizer.
Figure 19B:
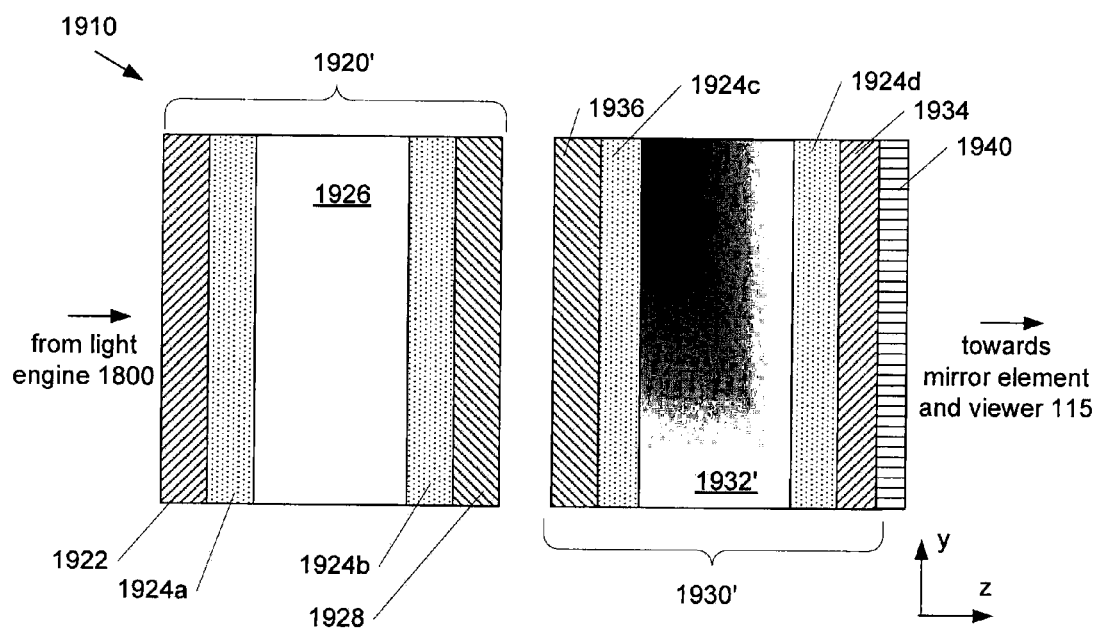
Figure 22B:
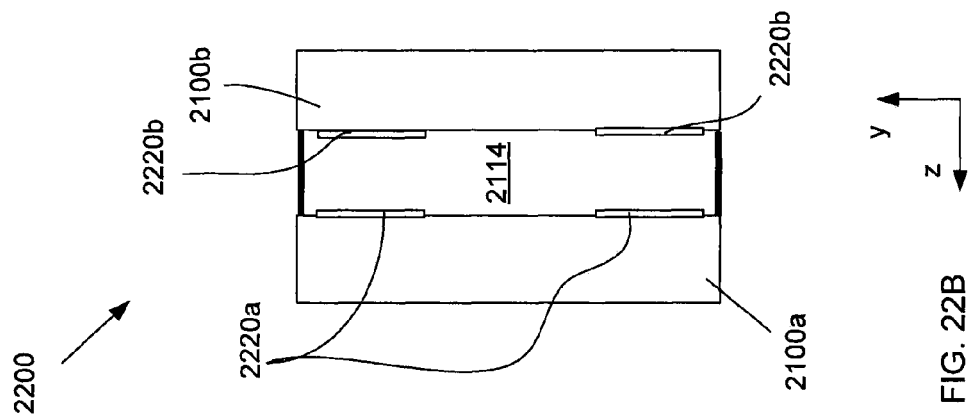
FIGS. 22(A, B) illustrate a segmented LC-cell for use with a light-source in accordance with another embodiment of the present invention.
Figure 22A:
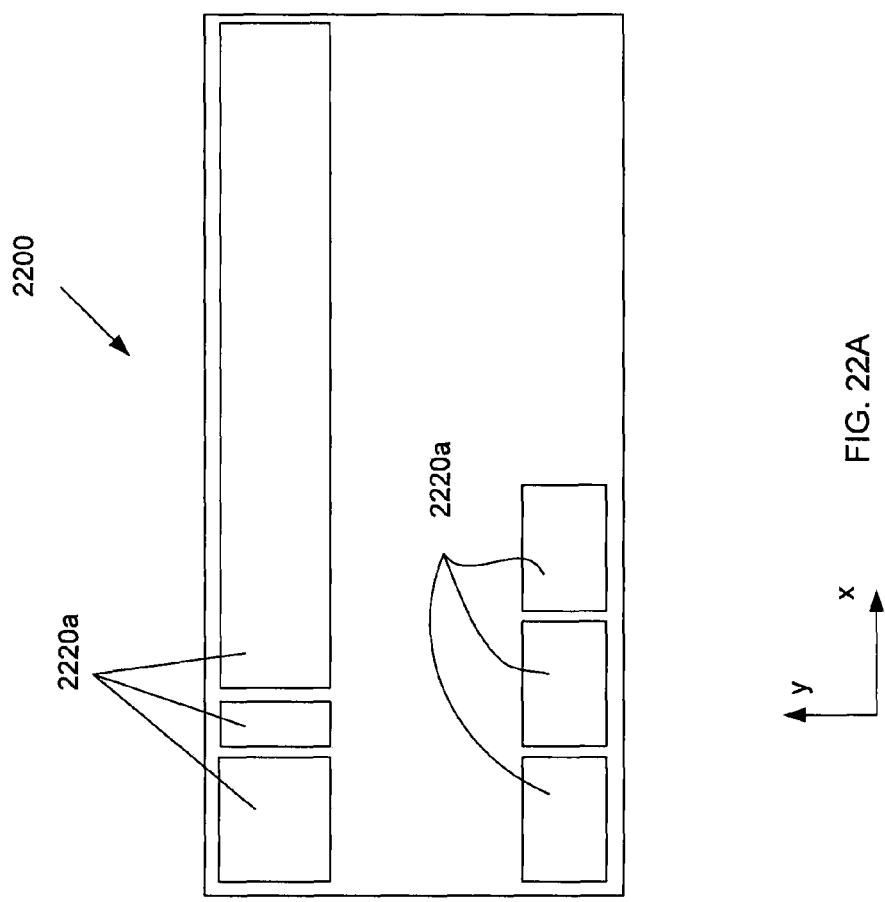

The embodiment 1910 of FIG. 19B illustrates a configuration in which the LCD device 1920' and the segmented LC-cell device 1930' do not share a polarizing component disposed therebetween, but rather employ separate respectively corresponding polarizing components 1928 and 1936. The embodiment 1910 additionally illustrates the use of a reflective polarizer (RP) 1940 such as an APBF (or, in a related embodiment, a wire-grid polarizer), disposed in front of the combination of the LCD 1920' and the segmented LC-cell 1930' to facilitate re-circulation of light between the RP 1940 and the reflector at the back of the light-engine (such as the reflector 636 of FIG. 6C, for example). FIG. 20 illustrates a related embodiment 2000 where a sub-system 2002 additionally includes an RP 2004 is laminated between an auxiliary substrate 2006 and a mirror system 2008. It is appreciated, that generally the use of an RP within an embodiment of the light-source does not require such RP to be laminated to any of the components of the light-source. The RP may be employed as a stand-alone element appropriately positioned within the system to facilitate recirculation of a correspondingly polarized portion of light reaching the RP from the light-engine. Discussing the embodiments of the invention further, FIGS. 21(A, B) and 22(A, B) schematically illustrate two respective implementations 2100 and 2200 of a segmented LC-cell for use with a light-source according to embodiments of the present invention, both in plan and side views. Either of the embodiments 2100 and 2200 includes a LC-cell comprising appropriately spaced-apart substrates 2110*a* and 2110*b* and a seal 2112 that together define an LC-cell chamber 2114. To configure a clear aperture of either of the LC-cells 2100 and 2200 into a group of segmented areas, the electrode layers conventionally disposed on internal, with respect to an LC-cell, surfaces of the substrates 2110*a*, 2110*b* are appropriately patterned and electrically connected to an appropriate power source in such a fashion as to form independently operated and controlled LC-cell segments shown as 2120(*a,b*) and 2220(*a,b*). It is appreciated that the segments 2120(*a,b*) and 2220(*a,b*) can generally have different shapes and/or dimensions, subject to pattern boundaries 2122 and 2222 formed in the corresponding electrode layers. The pattern boundaries 2122 and 2222 defining the extent of any given segment in an electrode layer may be formed using various known techniques such as masking of the layer during its deposition or post-deposition removal of the layer within the prescribed geometrical limits using laser treatment. As an example, a clear aperture of the embodiment 2100 as viewed from the front of the rearview assembly may be about 43-by-72 mm$^2$, with individual segments 2120(*a,b*) dimensioned approximately 4-by-7 mm$^2$ and separated by electrically-nonconductive boundaries 2122 having width of about 0.1 mm. It is understood that, in order to optimize performance of each given segment of a corresponding LC-cell, patterns of segmentation of electrode layers on both of internal surfaces of each of the embodiments 2100 and 2200 preferably spatially conform to each other, are spatially aligned and arranged in a similar fashion along the corresponding internal surfaces that carry these layers. Put differently, patterns of segmentation and individual segments of electrode layers in a segmented LC-cell are co-extensive as seen from the front of the rearview assembly.

Figure 23:
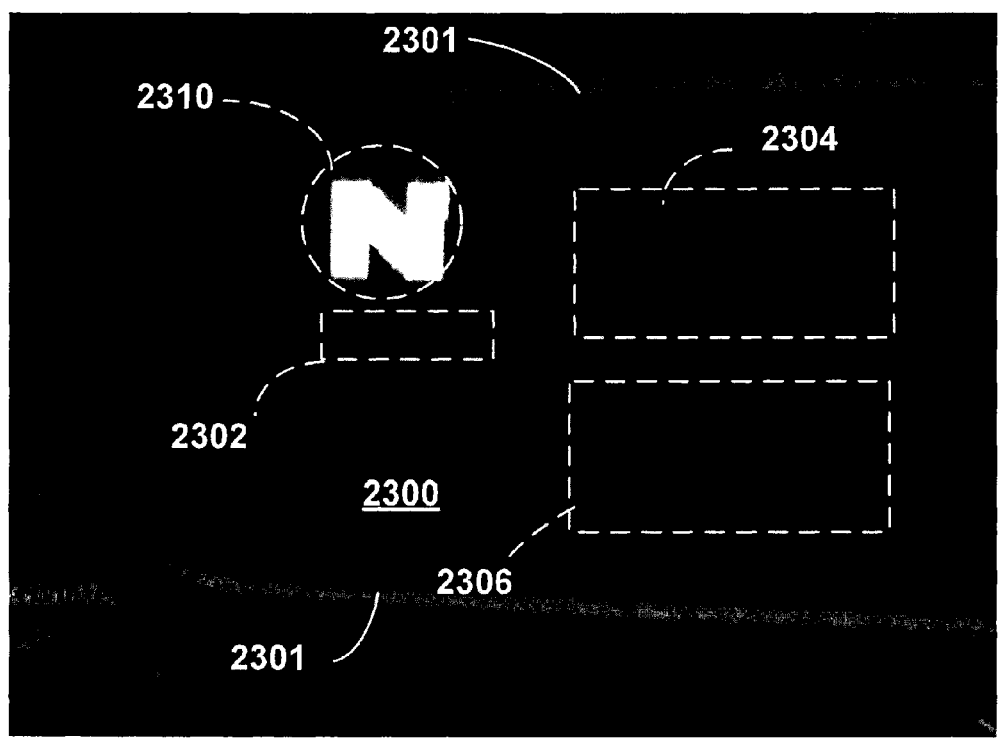
FIG. 23 illustrates improvement in optical performance of a display panel configured to be used in conjunction with a segmented LC-cell of an embodiment of the invention.

The use of segmented LC-cells results in certain advantages appreciated by the user of the resulting rearview assembly. Specifically, patterning of the clear aperture of the light-source allows to confine the light illuminating a particular portion of the clear aperture to within the extent of a given segment. As a result, the amount of light cross-talk among the different portions of the screen is minimized and the brightness of a given portion of the display delivering the visually perceivable information to the user at any given time is effectively increased. FIG. 23 and Table 6 illustrate such increase in brightness. FIG. 23 shows a display panel 2300 used with a segmented light-source of the invention configured in accordance with embodiment of FIG. 17A that defines three areas 2302, 2304, and 2306 in the vicinity of the active portion 2310 of the panel 2300. The active portion 2310 of the panel 2300 delivers information (shown as an indicia "N") visually perceivable by the user. As summarized in Table 6, when the segmented LC-cell of the light-source was not activated, the measurement of luminance associated with these display areas indicated the presence of light cross-talk between the active portion 2310 of the panel leading to leakage of light from the indicia "N" to the areas 2302, 2304, and 2306. With activation of the segmented LC-cell, however, the areas of the display panel surrounding the lit indicia demonstrated lower luminance and, therefore, appeared to be darker from the front of the assembly, to the observer.

TABLE 6

| Area/Location | Light-source with coupling embodiment 600 or 1700 and non-activated segmented LC-cell. Luminance [cd/m$^2$] | Light-source with coupling embodiment 600 or 1700 and activated segmented LC-cell. Luminance [cd/m$^2$] |
|---|---|---|
| 2302 | 3.24 | 2.59 |
| 2304 | 1.826 | 0.1166 |
| 2306 | 2.178 | 0.1210 |

The following examples provide comparison of light throughput values for several embodiments and additional insight into their operational advantages. In all examples, the light source is similar to that the embodiment of FIG. 6A (with the structure of the LCD 150 that resembles that of the component 1920 of FIG. 19A). In addition in all examples, the amount of light power generated by corresponding light emitters 612 and, therefore, the light output from the light source are the same. In further reference to FIGS. 19(A,B), in Example 1, the light output from the light source is passed through the linear reflective polarizer 1940 such as an APBF. In Example 2, the same light output is passed through a sequential combination of the segmented LC-cell 1932 and the linear reflective polarizer 1940 such as an APBF. In Example 3, the same light output is passed through a sequential combination of the segmented LC-cell 1932, the linear absorptive polarizer 1934, and the linear reflective polarizer 1940 such as an APBF. The comparison of the resulting luminance outputs is shown in Table 7.

TABLE 7

| Example # | Luminance Output, cd/m$^2$ |
|---|---|
| 1 | 2133 |
| 2 | 1983 |
| 3 | 1651 |

It is appreciated that, in a typical embodiment, the loss of light traversing an embodiment of the segmented LC cell, such as the cell 1932 of FIG. 19A, is about 7%. The advantages of adding, to the segmented LC cell, a combination of the linear absorptive polarizer and a linear reflective polarizer (such as 1934, 1940) allow to recover the losses of light incurred upon the traversal of the segmented LC-cell and the linear absorptive polarizer by re-circulating the light between the linear reflective polarizer 1940 and an internal component of the light source (such as, for example, one of the reflectors 636, 662). As a result of combining the linear absorptive polarizer and a linear reflective polarizer, an embodiment of the invention simultaneously benefits from a better extinction ratio. Specifically, such an embodiment has improvements of performance in a dark state as compared to an embodiment that would employ only a linear reflective polarizer and not a linear absorptive polarizer.

Operation of embodiments of the invention preferably involves the use of a processor controlled by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, embodiments of the invention may be configured within a vehicular rearview assembly including at least one additional device such as, without limitation, an interior illumination assembly, a voice activated system, a trainable transceiver, a microphone, a compass system, a digital sound processing system, a highway toll booth interface, a telemetry system, a moisture sensor, a global positioning system, a vehicle vision system, a wireless communication interface, a camera, a transflective reflector, a navigation system, a turn signal, and an adaptive cruise control system. In another modification, embodiments of the present invention may include embodiments of switchable mirror systems as described, for example, in U.S. patent application Ser. No. 12/629,757 filed on Dec. 2, 2009 and now published as U.S. 2010/0110553, and Ser. No. 12/774,721 filed on May 5, 2010 and now published as U.S. 2010/0277786.

What is claimed is:

1. An automotive rearview assembly having a front, the assembly comprising:
  a housing;
  a transflective electrochromic (EC) mirror element disposed within the housing; and
  a light source disposed within the housing behind the mirror element with respect to the front, the light source including:
    a first light emitter adapted to emit light along a first axis;
    a lightguide having an extent, a planar portion, and first and second light-guiding surfaces, the lightguide being in optical communication with the first light emitter and configured to outcouple light channeled by the lightguide through the first light-guiding surface, the first and second light-guiding surfaces forming a curve configured to communicate light along a second axis; a second light emitter operable to transmit light through the first and second light guiding surfaces of the planar portion of the lightguide; and
    a liquid-crystal display (LCD) disposed between the first light-guiding surface and the EC mirror element, the LCD having a liquid-crystal (LC) layer oriented to be substantially parallel to the first light-guiding surface,
  wherein the light source further includes a segmented LC-cell in optical communication with the LCD, the segmented LC-cell being disposed between the LCD and the EC mirror element.

2. An assembly according to claim 1, wherein the lightguide is further configured to outcouple the channeled light at a rate that is substantially independent of a location along the extent.

3. An assembly according to claim 1, wherein the EC mirror element comprises an optically anisotropic layer.

4. An assembly according to claim 1, wherein the light source further includes a first reflective polarizer layer disposed within the light source adjacent to the LCD, the first reflective polarizer transmitting light having a first polarization and reflecting light having a second polarization, the first and second polarizations being orthogonal.

5. An assembly according to claim 4, further comprising a second reflective polarizer placed between the light source and the EC mirror element.

6. An assembly according to claim 5, wherein at least one of the first and second reflective polarizers includes an optically anisotropic plastic layer.

7. An assembly according to claim 4, wherein a transmission axis of the first reflective polarizer layer is aligned with a vector of polarization of light traversing the LCD.

8. An assembly according to claim 1, further comprising at least one of an interior illumination assembly, a voice activated system, a trainable transceiver, a microphone, a compass system, a digital sound processing system, a highway toll booth interface, a telemetry system, a moisture sensor, a global positioning system, a vehicle vision system, a wireless communication interface, a camera, a transflective reflector, a navigation system, a turn signal, and an adaptive cruise control system.

9. An assembly according to claim 1, wherein the first axis is substantially parallel to the first light-guiding surface proximate to the first light emitter.

10. An assembly according to claim 1, wherein the curve forms an elbow configured to accept light emitted by the first light emitter.

11. An assembly according to claim 1, wherein the second axis extends in a direction different from the first axis.

12. An automotive rearview assembly having a front, the assembly comprising:
  a housing;
  a mirror element disposed within the housing;
  a light source disposed within the housing behind the mirror element with respect to the front, the light source including:
    a plurality of light emitters configured to form an array of emitters, the plurality of light emitters adapted to emit light along corresponding parallel axes that define a light-emitting plane;
    a lightguide having an extent, a planar portion, and first and second light-guiding surfaces, the lightguide being in optical communication with the array of emitters and configured to outcouple light channeled by the lightguide through the first light-guiding surface, the first and second light-guiding surfaces forming a curve configured to direct the light in a direction perpendicular to the light emitting plane, wherein at least one of the plurality of light emitters is configured to transmit light through the first and second light guiding surfaces of the planar portion of the lightguide; and a liquid-crystal display (LCD) having a liquid-crystal (LC) layer disposed between the lightguide and the mirror element and parallel to the light-emitting plane; and a light-source electronic circuitry adapted to provide power to and control an operation of the light emitters and the LCD, the light-source electronic circuitry disposed on an electronic printed circuit board (PCB) that is positioned on the side of the second light-guiding surface such that an area of projection of the electronic PCB onto the light-emitting plane does not differ from an area of projection of the LCD onto the light-emitting plane by more than about 50 percent, wherein the light source further includes a segmented LC-cell in optical communication with the LCD, the segmented LC-cell being disposed between the LCD and the mirror element.

13. An assembly according to claim 12, wherein the lightguide is further configured to outcouple the channeled light at a rate that is substantially independent of a location along the extent.

14. An assembly according to claim 12, further comprising a mirror element circuitry adapted to provide power to and control an operation of the mirror element, the mirror element circuitry disposed on the electronic PCB.

15. An assembly according to claim 12, wherein the array of emitters is disposed on an emitter PCB, the emitter PCB being operationally connected and transverse to the electronic PCB.

16. An assembly according to claim 12, wherein the curve forms an elbow adapted to accept light emitted by the array of emitters and direct the light in the direction perpendicular to the light emitting plane.

17. An assembly of claim 12, wherein the mirror element includes an electrochromic (EC) element.

18. An assembly according to claim 12, wherein the lightguide further comprises a planar portion configured to transmit the light along the light emitting plane and normal to the light emitting plane.

19. An automotive rearview assembly having a front, the assembly comprising:
a housing;
an EC mirror element disposed within the housing;
a light source disposed within the housing behind the mirror element with respect to the front, the light source including:
a plurality of light emitters configured to form an array of emitters and further configured to emit light along corresponding axes that define a light-emitting plane;
a coupling elbow in optical communication with a portion of the array of emitters and operable to channel the light in a direction transverse to the light-emitting plane;
a lightguide having an extent, a planar portion, and first and second light-guiding surfaces, the lightguide being in optical communication with coupling elbow and adapted to outcouple light channeled by the lightguide through the first light-guiding surface, wherein at least one of the plurality of light emitters is configured to transmit light through the first and second light guiding surfaces of the planar portion of the lightguide; and a liquid-crystal display (LCD) having a liquid-crystal (LC) layer disposed between the lightguide and the EC mirror element in parallel to the light-emitting plane;

a reflector positioned adjacent to a second light-guiding surface; and a reflective polarizer disposed between the lightguide and the EC mirror element, the reflective polarizer being in optical communication with the reflector, wherein the light source further includes a segmented LC-cell in optical communication with the LCD, the segmented LC-cell being disposed between the LCD and the mirror element.

20. An assembly according to claim 19, wherein the coupling elbow comprises an input facet coupled to the plurality of light emitters to communicate light through the coupling elbow.

21. An automotive rearview assembly having a front, the assembly comprising:
a housing;
a mirror element secured within the housing; and
a light source disposed within the housing behind the mirror element with respect to the front, the light source including:
a first light emitter configured to emit light along a first axis;
a second light emitter configured to emit light along a second axis parallel to the first axis;
a lightguide having a planar portion and first and second light-guiding surfaces, the lightguide being in optical communication with the first light emitter and the second light emitter and configured to outcouple light channeled by the lightguide through the first light-guiding surface a third light emitter operable to transmit light through the first and second light guiding surfaces of the planar portion of the lightguide; and
a liquid-crystal display (LCD) disposed between the first light-guiding surface and the mirror element, the LCD having a liquid-crystal (LC) layer oriented parallel to the first light-guiding surface,
wherein the light source further includes a segmented LC-cell in optical communication with the LCD, the segmented LC-cell being disposed between the LCD and the mirror element.

22. An assembly according to claim 21, wherein the light source further comprises a reflector positioned adjacent to a second light-guiding surface, the reflector being in optical communication with the LCD.

23. An assembly according to claim 21, wherein the lightguide further comprises a first elbow adapted to accept light emitted by at least one of the first and second emitters.

24. An assembly according to claim 23, further comprising a second elbow, wherein the first elbow is in communication with the first emitter and the second elbow is in communication with the second emitter.

* * * * *